(12) United States Patent
Kawasaki et al.

(10) Patent No.: US 8,900,080 B2
(45) Date of Patent: Dec. 2, 2014

(54) VEHICLE POWER TRANSMISSION DEVICE

(75) Inventors: Koji Kawasaki, Anjo (JP); Takenori Matsue, Anjo (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 385 days.

(21) Appl. No.: 13/194,082

(22) Filed: Jul. 29, 2011

(65) Prior Publication Data

US 2012/0028749 A1 Feb. 2, 2012

(30) Foreign Application Priority Data

Jul. 30, 2010 (JP) .................................. 2010-172529
Sep. 28, 2010 (JP) .................................. 2010-216464
Sep. 28, 2010 (JP) .................................. 2010-216465

(51) Int. Cl.
*F16H 3/72* (2006.01)
*F16H 37/02* (2006.01)
*F16H 37/06* (2006.01)
*B60K 6/543* (2007.10)
*B60K 6/48* (2007.10)

(52) U.S. Cl.
CPC .............. *B60K 6/543* (2013.01); *Y02T 10/6256* (2013.01); *F16H 3/725* (2013.01); *B60K 6/48* (2013.01); *Y02T 10/6221* (2013.01); *B60K 2006/4816* (2013.01); *Y10S 903/918* (2013.01)
USPC ..................... 475/5; 475/210; 475/8; 903/918

(58) Field of Classification Search
USPC ..................................................... 475/5, 210
See application file for complete search history.

(56) References Cited

U.S. PATENT DOCUMENTS

| 5,112,283 A | 5/1992 | Miyata et al. |
| 2004/0065520 A1 | 4/2004 | Murray |
| 2004/0124021 A1 | 7/2004 | Shirai et al. |
| 2010/0120579 A1* | 5/2010 | Kawasaki .................. 477/3 |

(Continued)

FOREIGN PATENT DOCUMENTS

| JP | H03-092656 | 4/1991 |
| JP | 2001-108073 | 4/2001 |

(Continued)

OTHER PUBLICATIONS

Japanese Office Action dated Apr. 10, 2012, issued in corresponding Japanese Application No. 2010-172529, with English Translation.
Japanese Official Action dated Sep. 11, 2012 issued in corresponding Japanese Application No. 2010-216464, with English translation.

*Primary Examiner* — Troy Chambers
*Assistant Examiner* — Lillian Nguyen
(74) *Attorney, Agent, or Firm* — Nixon & Vanderhye P.C.

(57) ABSTRACT

A power transmission apparatus for a vehicle is provided which is equipped with a power split device and a speed variator. The power transmission device is designed to set a speed ratio of speed of rotation of an output of a power source to speed of rotation of a driven wheel in a power circulation mode of a power split device to lie within one of a positive range in which a sign of the speed ratio is positive and a negative range in which a sign of the speed ratio is negative. This results in a decrease in degree of torque acting on the speed variator such as a continuously variable transmission, thus permitting a required degree of durability of the speed variator to be reduced.

16 Claims, 48 Drawing Sheets

(56) References Cited

U.S. PATENT DOCUMENTS

2010/0273605 A1* 10/2010 Kawasaki et al. ............... 477/20
2011/0028260 A1* 2/2011 Kawasaki et al. ............. 475/220
2011/0118077 A1* 5/2011 Kawasaki et al. ................ 477/3

FOREIGN PATENT DOCUMENTS

| JP | 2004-514103 | 5/2004 |
| JP | P2004-175320 A | 6/2004 |
| JP | 2006-308039 | 11/2006 |

* cited by examiner

FIG.2(a)
MG START IN 1ST OPERATION MODE
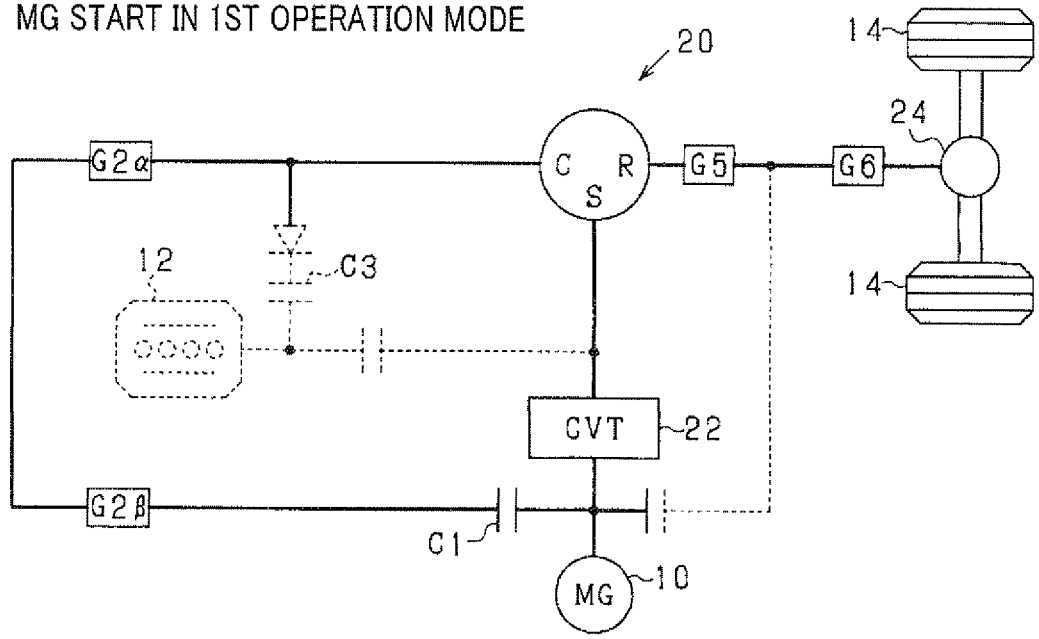
FIG.2(b)
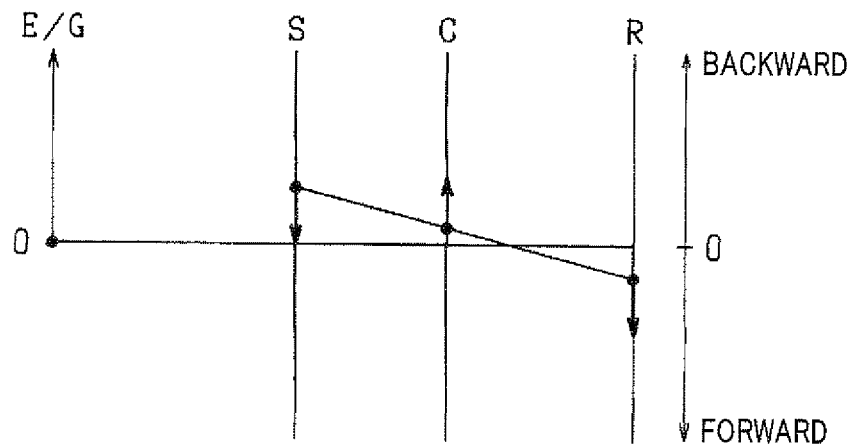
FIG.2(c)
| ROTATIONAL SPEED | | | TORQUE | | | POWER | | |
|---|---|---|---|---|---|---|---|---|
| S | C | R | S | C | R | S | C | R |
| + | + | − | − | + | − | − | + | + |

EV TRAVEL IN 2ND OPERATION MODE

FIG.4(a)
ENGINE START IN 2ND OPERATION MODE
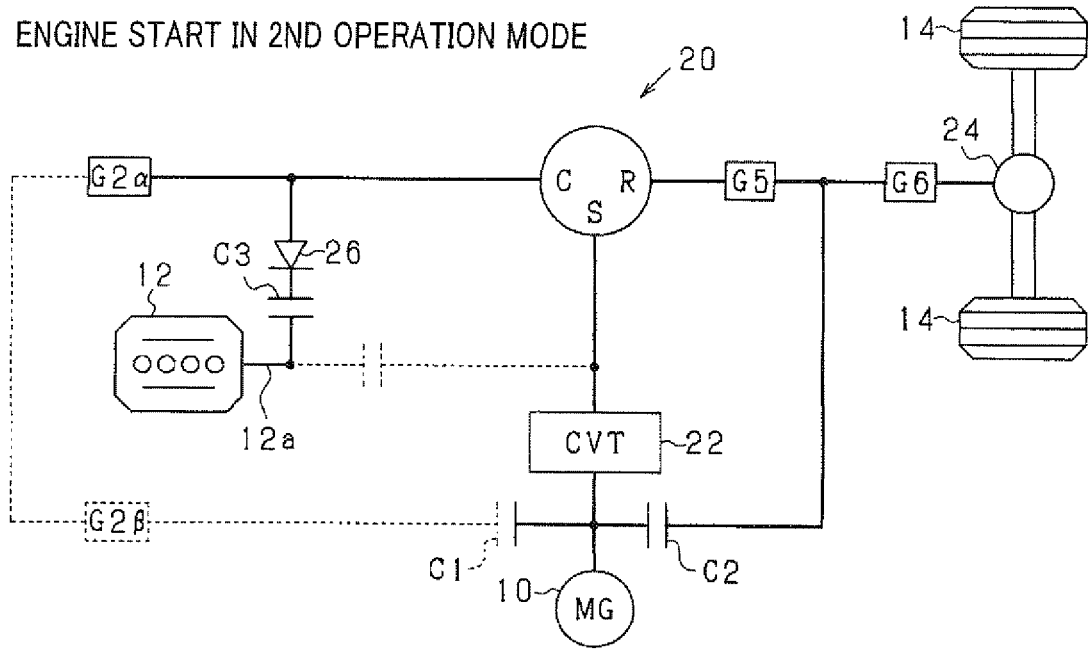
FIG.4(b)
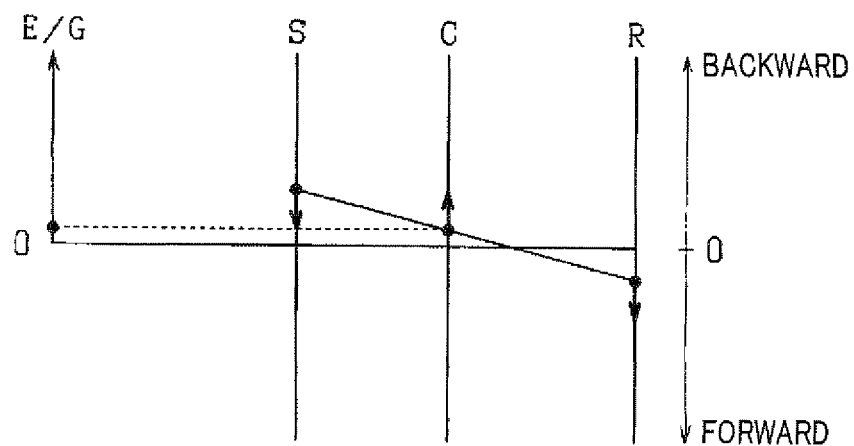
FIG.4(c)
| ROTATIONAL SPEED | | | TORQUE | | | POWER | | |
|---|---|---|---|---|---|---|---|---|
| S | C | R | S | C | R | S | C | R |
| − | − | + | + | − | + | − | + | + |

ENGINE TRAVEL IN 2ND OPERATION MODE

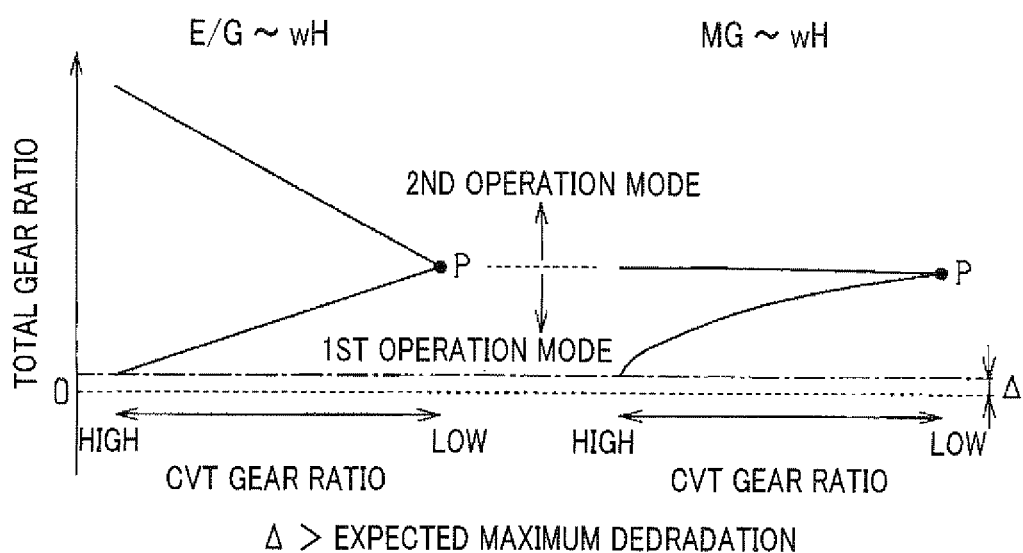
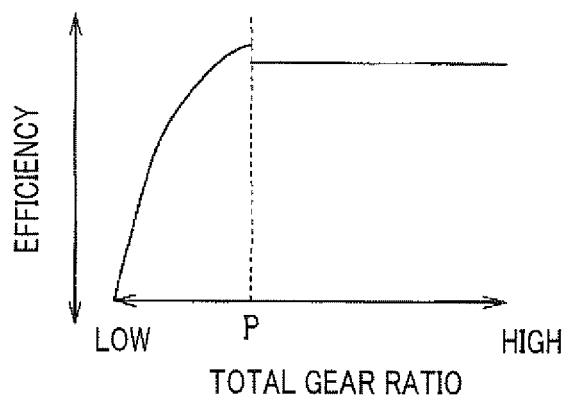

BACKWARD IN 1ST OPERATION MODE

STROKE LIMIT

STROKE LIMIT

LOW GEAR RATIO

HIGH GEAR RATIO n = 1, 2, 4 ~ 6 wGna, wGnb : Speed
wR, wS · wC : Speed
$\rho wS - (1+\rho) wC + wR = 0$ rn = (wGnb) / (wGna)
$\rho$ = (Teeth S) / (Teeth R)

FIG.23(a)
MG START IN 1ST OPERATION MODE
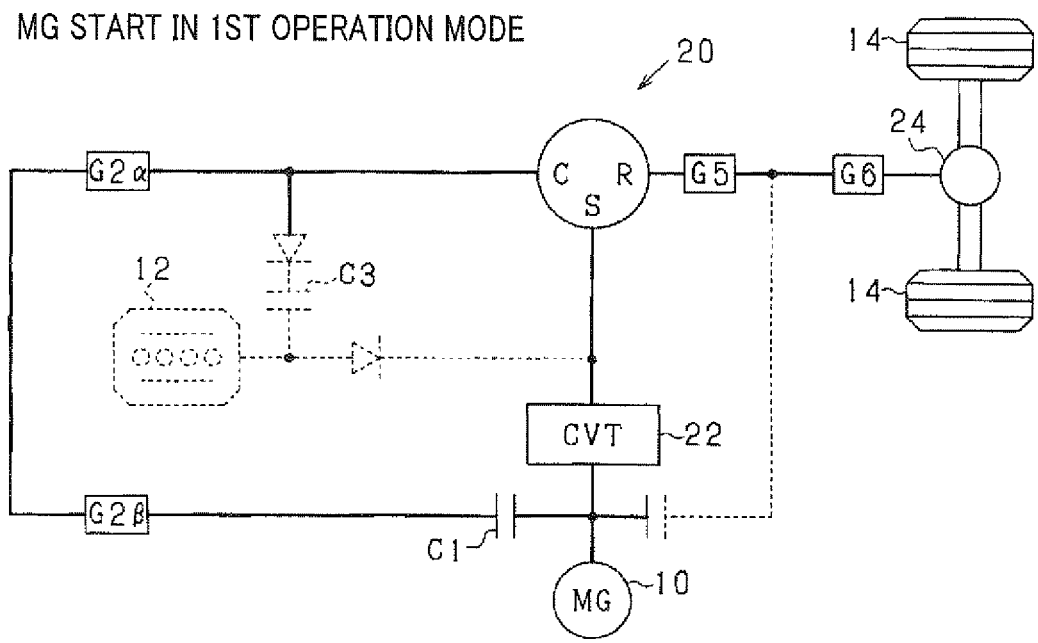
FIG.23(b)
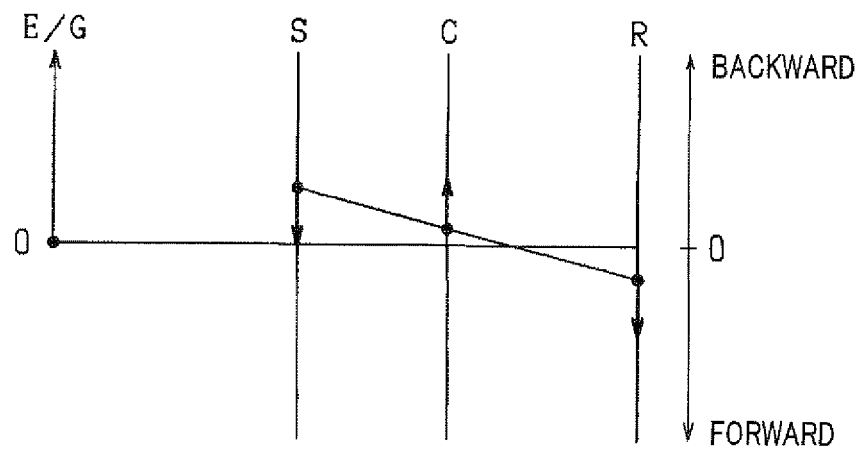
FIG.23(c)
| ROTATIONAL SPEED | | | TORQUE | | | POWER | | |
|---|---|---|---|---|---|---|---|---|
| S | C | R | S | C | R | S | C | R |
| + | + | − | − | + | − | − | + | + |

EV TRAVEL IN 2ND OPERATION MODE

FIG.25(a)
ENGINE START IN 2ND OPERATION MODE
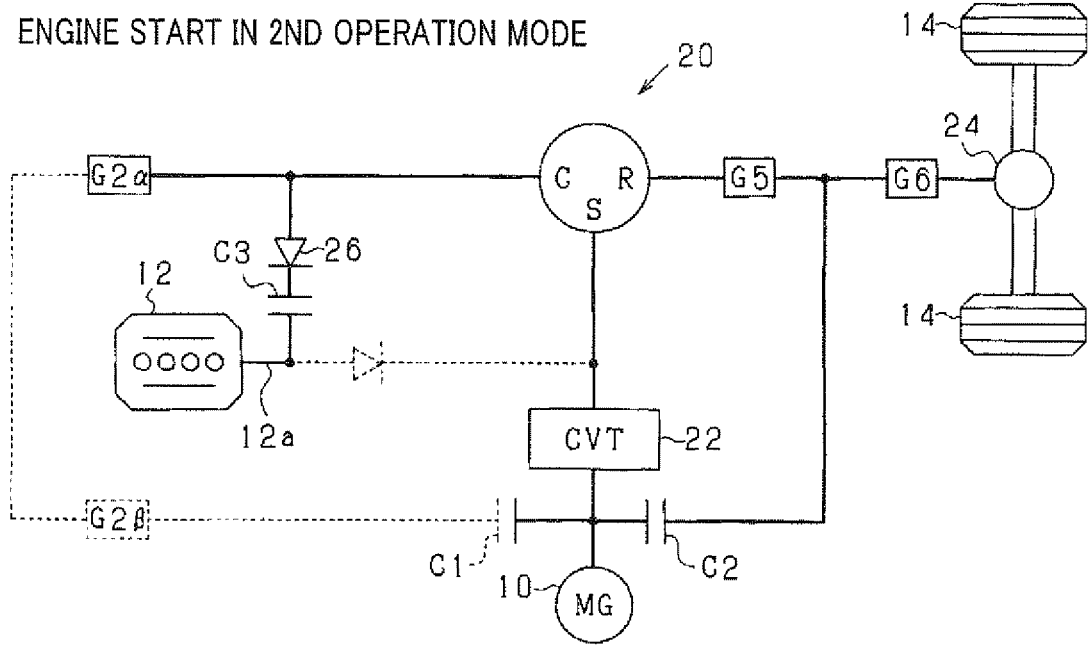
FIG.25(b)
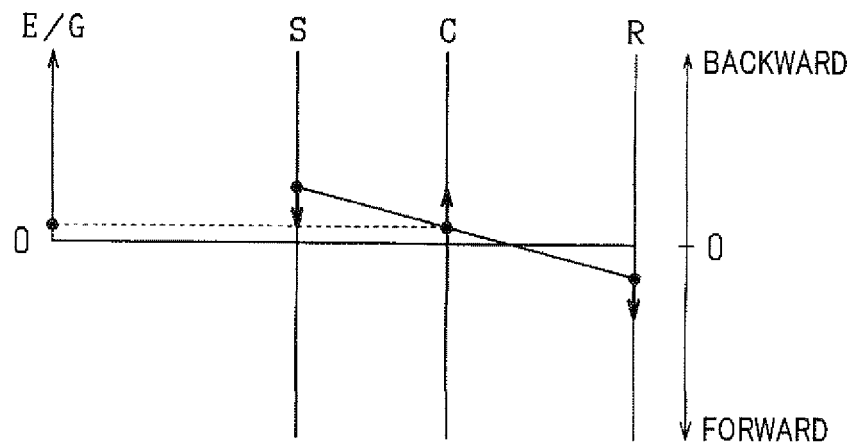
FIG.25(c)
| ROTATIONAL SPEED | | | TORQUE | | | POWER | | |
|---|---|---|---|---|---|---|---|---|
| S | C | R | S | C | R | S | C | R |
| − | − | + | + | − | + | − | + | + |

ENGINE TRAVEL IN 2ND OPERATION MODE

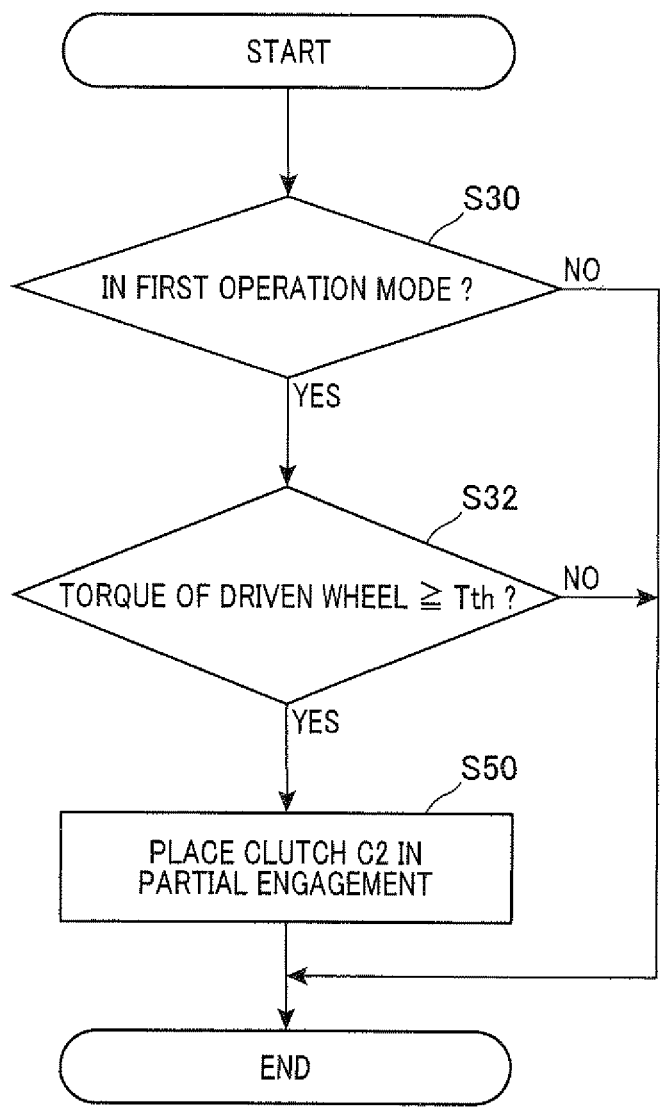

FIG.36(a)
MG START IN 1ST OPERATION MODE
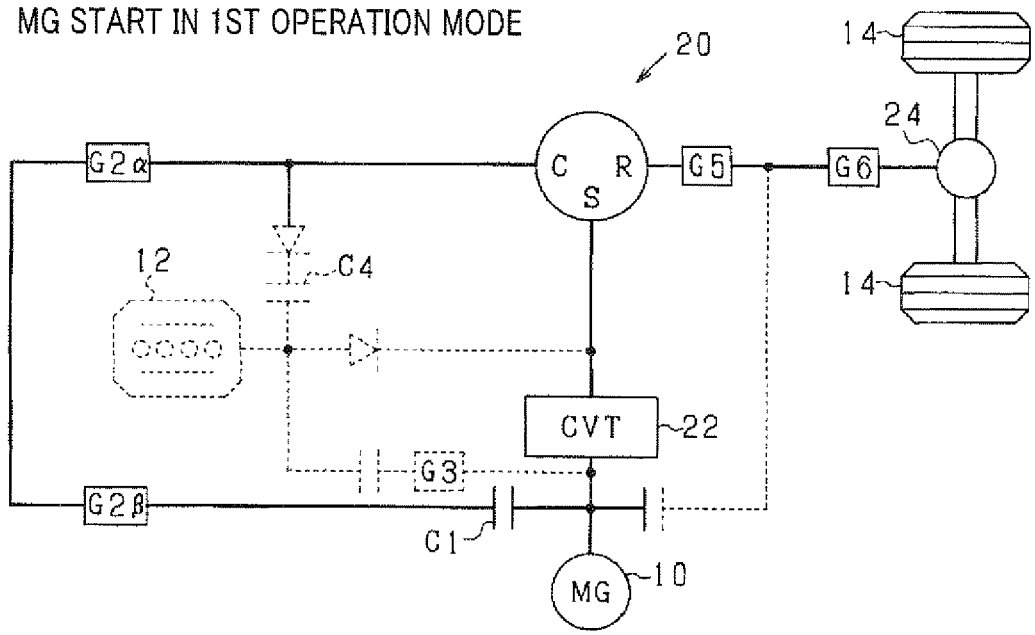
FIG.36(b)
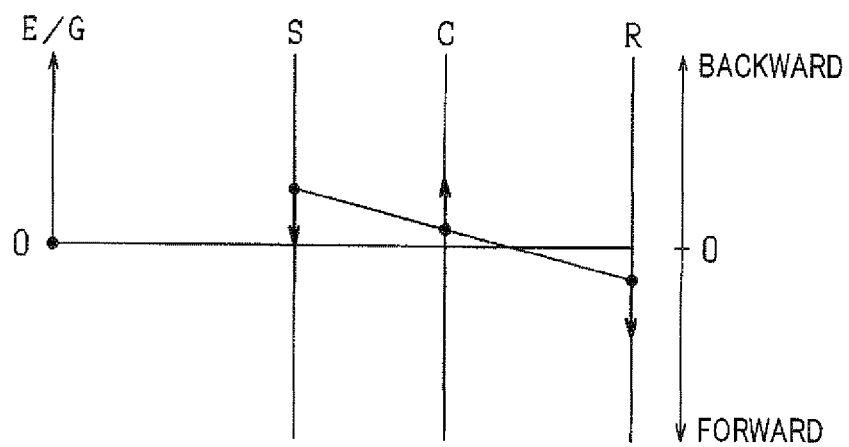
FIG.36(c)
| ROTATIONAL SPEED | | | TORQUE | | | POWER | | |
|---|---|---|---|---|---|---|---|---|
| S | C | R | S | C | R | S | C | R |
| + | + | − | − | + | − | − | + | + |

EV TRAVEL IN 2ND OPERATION MODE (DIRECT POWERED BY MG)

FIG.38(a)
ENGINE START IN 2ND OPERATION MODE
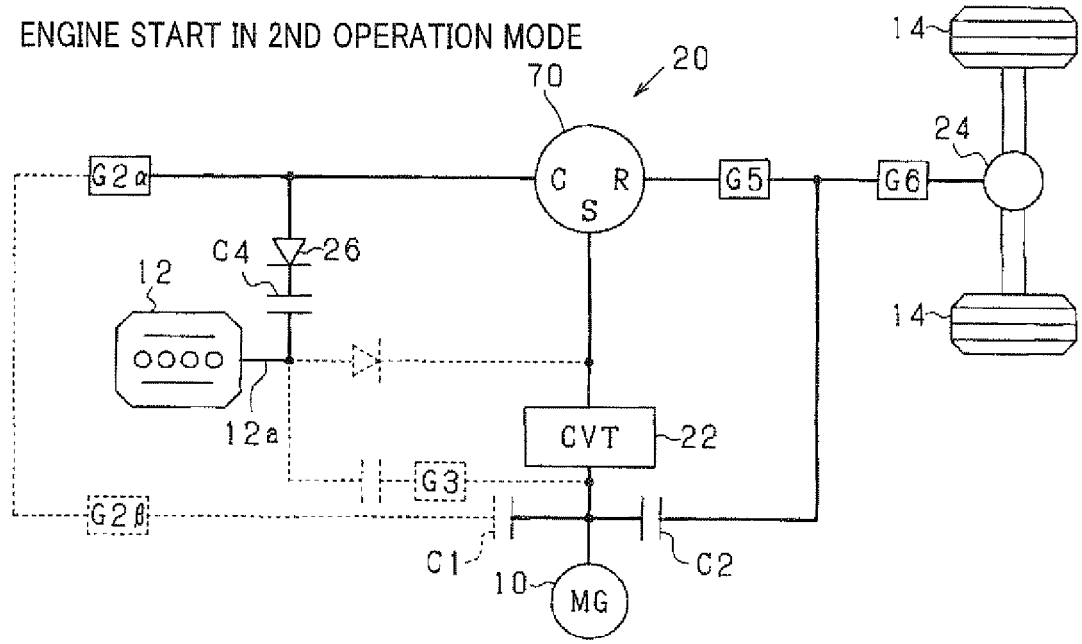
FIG.38(b)
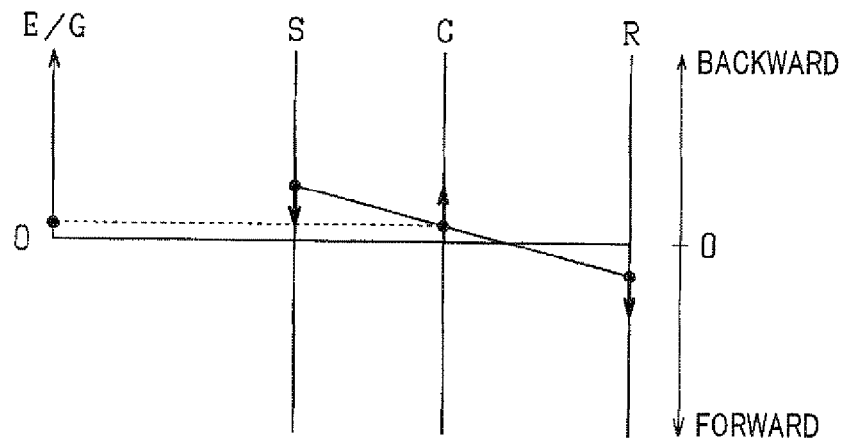
FIG.38(c)
| ROTATIONAL SPEED | | | TORQUE | | | POWER | | |
|---|---|---|---|---|---|---|---|---|
| S | C | R | S | C | R | S | C | R |
| − | − | + | + | − | + | − | + | + |

ENGINE TRAVEL IN 2ND OPERATION MODE

3RD OPERATION MODE(DIRECT POWERED BY ENGINE)

POWER GENERATION IN NUETRAL MODE

1ST FAIL-SAFE MODE

2ND FAIL-SAFE MODE

3RD FAIL-SAFE MODE

4TH FAIL-SAFE MODE

VEHICLE POWER TRANSMISSION DEVICE

CROSS REFERENCE TO RELATED DOCUMENT

The present application claims the benefits of Japanese Patent Application No. 2010-172529 filed on Jul. 30, 2010 and Japanese Patent Application Nos. 2010-216464 and 2010-216465 filed Sep. 28, 2010, disclosures of which are incorporated herein by reference.

BACKGROUND

1. Technical Field

The present invention relates generally to a vehicle power transmission device equipped with a power split device made up of a plurality of power split rotors which interlock with each other to split output power or torque between a power source and a driven wheel and a speed variator coupled to the power split device.

2. Background Art

Japanese Patent First Publication No. 2006-308039 teaches a power transmission device made of a combination of two planetary gear sets and a continuously variable transmission (CVT). The power transmission device is equipped with a low-speed clutch and a high-speed clutch for use in switching between mechanical coupling modes between the planetary gear sets. When the power transmission device is required to run at a low speed, the low-speed clutch is engaged, while the high-speed clutch is disengaged, thereby creating circulation of power in the power transmission device to achieve the so-called geared neutral which places the speed of an output shaft of the power transmission device at zero (0) while keeping an input shaft thereof rotating. The power transmission device also works to regulate a gear ratio (also called a CVT ratio) of the continuously variable transmission to change the rotation of the output shaft from a normal direction to a reverse direction and vice verse across the geared neutral.

Usually, when an automotive vehicle runs at a low speed, for example, it starts on an uphill, the vehicle needs a great deal of torque, thus causing the torque exerted on the continuously variable transmission to be increased. The continuously variable transmission is, therefore, required to have an increased degree of durability. We have found that the greater a change in total gear ratio in a power transmission line between a power source and a driven wheel of the vehicle which arises from changing of the gear ratio of the continuously variable transmission, the greater the degree of torque acting on the continuously variable transmission. It is, therefore, difficult to achieve a good balance between establishment of a desired total gear ratio in the power transmission line and the durability of the continuously variable transmission.

SUMMARY

It is, therefore, an object to provide a power transmission apparatus with a speed variator which is designed to permit a required degree of durability of the speed variator to be minimized.

It is another object to provide a power transmission apparatus with a continuously variable transmission which is designed to improve the efficiency in transmission of power therethrough.

According to one aspect of an embodiment, there is provided a power transmission apparatus for a vehicle which comprises: (a) a power split device which includes a first, a second, and a third rotor which rotate in conjunction with each other to split power among the first, second, and third rotors, the third rotor being coupled mechanically to a driven wheel of a vehicle; and (b) a speed variator joined mechanically to the power split device.

The power split device is placed in a power transmission mode in which power, as produced by the power source, is transmitted to the third rotor through the second rotor and then to the driven wheel as torque.

In the power transmission mode, the power split device is also placed in a power circulation mode wherein the power is circulated between the first and second rotors.

A speed ratio of a speed of rotation of an output of the power source to a speed of rotation of the driven wheel in the power circulation mode is set to lie within one of a positive range in which a sign of the speed ratio is positive and a negative range in which a sign of the speed ratio is negative.

The power circulation mode enables a geared neutral to be established while keeping the direction of rotation of the power source or the driven wheel to be reversed, in other words, the value of the speed ratio to lie both in the positive and negative range. The power transmission apparatus is, however, designed to set the speed ratio to lie within only one of the positive and negative ranges, thus resulting in a decrease in permissible range of the speed ratio. This decreases the degree of torque acting on the speed variator, thus permitting a required degree of durability of the speed variator to be reduced.

In the preferred mode of the embodiment, the power transmission apparatus may further include a controller which controls the speed ratio to lie within one of the positive range and the negative range.

The power source is an electric rotating machine.

The controller works to switch rotation of the electric rotating machine in opposite directions.

The power transmission apparatus also includes a reversing mechanism which changes between mechanical connections of at least one of the power source and the driven wheel to the first, second, and third rotors of the power split device to reverse a sign of the speed ratio.

The controller may keep an absolute value of a minimum value of the speed ratio above zero in the one of the positive and negative ranges.

The speed variator is a continuously variable transmission equipped with pulleys and a belt. The continuously variable transmission is so designed that an absolute value of a minimum value of the speed ratio is kept away from zero in the one of the positive and negative ranges for compensating for a change in the speed ratio arising from aging of the continuously variable transmission.

The absolute value of a minimum value of the speed ratio is so determined as to be away from zero by a given margin which is equivalent to a change in the speed ratio arising from aging of the speed variator.

The power source may be an electric rotating machine. The first rotor is coupled mechanically to an internal combustion engine working as a power source. The power transmission apparatus may further includes a power transmission control mechanism which selectively establishes and blocks transmission of power between the first rotor and the internal combustion engine.

The power transmission control mechanism may include an electronically-controlled breaker which breaks the transmission of power between the third rotor and the internal combustion engine.

The power transmission control mechanism may also include a one-way transmission mechanism which achieves the transmission of power between the first rotor and the internal combustion engine in a condition that a speed of an input of the one-way transmission mechanism which leads to the first rotor is not lower than that of an output of the one-way transmission mechanism which leads to the internal combustion engine.

The power transmission control mechanism which selectively establishes and blocks the transmission of power between the first rotor and the internal combustion engine may function as a first power transmission control mechanism. The power transmission apparatus may also include a second power transmission control mechanism which selectively establishes and blocks transmission of power between the second rotor and the internal combustion.

The power split device includes a planetary gear set equipped with a sun gear, a carrier, and a ring gear which work as the first, second, and third rotors.

The power transmission apparatus may also include a power transmission path in which the speed variator is disposed and through which the first and second rotors are so linked without the third rotor as to rotate in conjunction with each other. The power source is coupled mechanically to the power transmission path.

The power source which are coupled mechanically to the first and second rotors may be an electric rotating machine. An internal combustion engine working as a power source may be joined mechanically to one of the first and second rotors. The power transmission apparatus may also include a first-to-second operation mode switching mechanism which switches between a first operation mode in which the speed varator is connected mechanically to both the first and second rotors and a second operation mode in which the speed variator is connected mechanically to the second and third rotors. A derivative value of a function, in which the speed ratio is expressed by a dependent variable, and a gear ratio of the speed variator is expressed by an independent variable, with respect to the independent variable in the second operation mode is opposite in sign to that in the first operation mode.

According to the second aspect of the embodiment, there is provided a power transmission apparatus for a vehicle which comprises: (a) an electric rotating machine working as a power source; (b) a power split device which includes a first, a second, and a third rotor which rotate in conjunction with each other to split power among the first, second, and third rotors, the third rotor being coupled mechanically to a driven wheel of a vehicle; (c) a speed variator joined mechanically to the power split device; (d) setting means for setting signs of power, as outputted from the first and second rotors, opposite each other to establish a power circulation mode in which the power is circulated between the first and second rotors in a power transmission mode in which power, as produced by the power source, is transmitted to the third rotor through the second rotor and then to the driven wheel; and (e) bidirectional switching means for switching rotation of the electric rotating machine between opposite directions.

The power circulation mode enables a geared neutral to be established while keeping the direction of rotation of the power source or the driven wheel to be reversed, in other words, the value of a speed ratio of a speed of rotation of an output of the power source to a speed of rotation of the driven wheel to lie both in the positive and negative range. The power transmission apparatus is, however, equipped with the bidirectional switching means to reverse the rotation of the electric rotating machine, thereby reversing the driven wheel. This eliminates the need for the speed ratio to lie over the positive and negative ranges, thus permitting a permissible range of the speed ratio to be narrowed. This decreases the degree of torque acting on the speed variator, thus permitting a required degree of durability of the speed variator to be reduced.

In the preferred mode of the embodiment, the power transmission apparatus also includes a controller which controls a speed ratio of a speed of rotation of an output of the power source to a speed of rotation of the driven wheel to lie within one of a positive range in which a sign of the speed ratio is positive and a negative range in which a sign of the speed ratio is negative.

The second rotor becomes rotatable when a speed of the third rotor coupled to the driven wheel is zero, and wherein the second rotor is also coupled to an accessory of the vehicle.

A speed ratio of a speed of rotation of an output of the power source to a speed of rotation of the driven wheel in the power circulation mode is determined to lie within a range extending from a positive range in which a sign of the speed ratio is positive and a negative range in which a sign of the speed ratio is negative across zero (0).

The power source is an electric rotating machine. The first rotor is coupled mechanically to an internal combustion engine working as a power source, and further comprising a power transmission control mechanism which selectively establishes and blocks transmission of power between the first rotor and the internal combustion engine.

The power transmission control mechanism includes an electronically-controlled breaker which breaks the transmission of power between the third rotor and the internal combustion engine.

The power transmission control mechanism may also include a one-way transmission mechanism which achieves the transmission of power between the first rotor and the internal combustion engine in a condition that a speed of an input of the one-way transmission mechanism which leads to the first rotor is not lower than that of an output of the one-way transmission mechanism which leads to the internal combustion engine.

The power transmission control mechanism which selectively establishes and blocks the transmission of power between the first rotor and the internal combustion engine may function as a first power transmission control mechanism. The power transmission apparatus may also include a second power transmission control mechanism which selectively establishes and blocks transmission of power between the second rotor and the internal combustion.

The power split device may include a planetary gear set equipped with a sun gear, a carrier, and a ring gear which work as the first, second, and third rotors.

The power transmission apparatus may also include a power transmission path in which the speed variator is disposed and through which the first and second rotors are so linked without the third rotor as to rotate in conjunction with each other. The power source is coupled mechanically to the power transmission path.

The power source which are coupled mechanically to the first and second rotors is an electric rotating machine. An internal combustion engine working as a power source may be joined mechanically to one of the first and second rotors. The power transmission apparatus may also include a first-to-second operation mode switching mechanism which switches between a first operation mode in which the speed varator is connected mechanically to both the first and second rotors and a second operation mode in which the speed variator is connected mechanically to the second and third rotors. A derivative value of a function, in which the speed ratio is expressed by a dependent variable, and a gear ratio of the speed variator is expressed by an independent variable, with respect to the independent variable in the second operation mode is opposite in sign to that in the first operation mode.

According to the third aspect of the embodiment, there is provided a power transmission apparatus for a vehicle which comprises: (a) a power split device which includes a first, a second, and a third rotor which rotate in conjunction with each other to split power among the first, second, and third rotors, the third rotor being coupled mechanically to a driven wheel of a vehicle; (b) a speed variator joined mechanically to the power split device; (c) setting means for setting signs of power, as outputted from the first and second rotors, opposite each other to establish a power circulation mode in which the power is circulated between the first and second rotors in a power transmission mode in which power, as produced by the power source, is transmitted to the third rotor through the second rotor and then to the driven wheel; and (d) a reversing mechanism which works to change between mechanical connections of at least one of the power source and the driven wheel to the first, second, and third rotors of the power split device to reverse a sign of a speed ratio of a speed of rotation of an output of the power source to a speed of rotation of the driven wheel.

The power circulation mode enables a geared neutral to be established while keeping the direction of rotation of the power source or the driven wheel to be reversed, in other words, the speed ratio to be lie both in the above described positive and negative ranges. The power transmission apparatus is, however, equipped with the bidirectional switching means to reverse the rotation of the electric rotating machine, thereby reversing the driven wheel. This eliminates the need for the speed ratio to lie over the positive and negative ranges, thus permitting a permissible range of the speed ratio to be narrowed. This decreases the degree of torque acting on the speed variator, thus permitting a required degree of durability of the speed variator to be reduced.

In the preferred mode of the embodiment, the power source may be an electric rotating machine.

The power transmission apparatus may also include a controller which controls the speed ratio of speed of rotation of the output of the power source to speed of rotation of the driven wheel to lie within one of a positive range in which a sign of the speed ratio is positive and a negative range in which a sign of the speed ratio is negative.

The second rotor becomes rotatable when a speed of the third rotor coupled to the driven wheel is zero. The second rotor may also be coupled to an accessory of the vehicle.

The speed ratio of the speed of rotation of the output of the power source to the speed of rotation of the driven wheel in the power circulation mode is determined to lie within a range extending from a positive range in which a sign of the speed ratio is positive and a negative range in which a sign of the speed ratio is negative across zero (0).

The power source may be an electric rotating machine. The first rotor may be coupled mechanically to an internal combustion engine working as a power source. The power transmission apparatus also includes a power transmission control mechanism which selectively establishes and blocks transmission of power between the first rotor and the internal combustion engine.

The power transmission control mechanism includes an electronically-controlled breaker which breaks the transmission of power between the third rotor and the internal combustion engine.

The power transmission control mechanism may also include a one-way transmission mechanism which achieves the transmission of power between the first rotor and the internal combustion engine in a condition that a speed of an input of the one-way transmission mechanism which leads to the first rotor is not lower than that of an output of the one-way transmission mechanism which leads to the internal combustion engine.

The power transmission control mechanism which selectively establishes and blocks the transmission of power between the first rotor and the internal combustion engine may function as a first power transmission control mechanism. The power transmission apparatus may also include second power transmission control mechanism which selectively establishes and blocks transmission of power between the second rotor and the internal combustion.

The power split device includes a planetary gear set equipped with a sun gear, a carrier, and a ring gear which work as the first, second, and third rotors.

The power transmission apparatus may also include a power transmission path in which the speed variator is disposed and through which the first and second rotors are so linked without the third rotor as to rotate in conjunction with each other. The power source is coupled mechanically to the power transmission path.

The power source which are coupled mechanically to the first and second rotors may be an electric rotating machine. The internal combustion engine working as a power source maybe joined mechanically to one of the first and second rotors. The power transmission apparatus may also include a first-to-second operation mode switching mechanism which switches between a first operation mode in which the speed varator is connected mechanically to both the first and second rotors and a second operation mode in which the speed variator is connected mechanically to the second and third rotors. A derivative value of a function, in which the speed ratio is expressed by a dependent variable, and a gear ratio of the speed variator is expressed by an independent variable, with respect to the independent variable in the second operation mode is opposite in sign to that in the first operation mode.

According to the fourth aspect of the embodiment, there is provided a power transmission apparatus for a vehicle which comprises: (a) a power split device which is to be coupled to a power source and includes power split rotors that are a first, a second, and a third rotor which rotate in conjunction with each other to split power among the first, second, and third rotors, the first rotor being coupled mechanically to a driven wheel of a vehicle, the first, second, and third rotor being so linked as to have rotational speeds thereof arrayed on a straight line in a nomographic chart; (b) a continuously variable transmission joined mechanically to the power split device; (c) a power circulation path through which power is to be circulated between the second and third rotors through the continuously variable transmission in a power transmission mode in which power, as produced by the power source, is transmitted to the first rotor through the second rotor; and (d) fixing means for fixing a speed ratio of a speed of the second rotor to a speed of the third rotor without use of the continuously variable transmission by establishing either one of a given mechanical connection among the power split rotors and a mechanical connection of one of the power split rotors to a given member when the continuously variable transmission is determined to be failing in operation to transmit the power therethrough.

Specifically, the fixing means keeps the speed ratio of the speed of the second rotor to the speed of the third rotor constant. Therefore, when the power is permitted to be applied to either one of the second and third rotors, the power transmission apparatus is capable of controlling the speed or power of the third rotor, thus enabling the speed or power of the driven wheel to be controlled.

For instance, the fixing means is implemented by a combination of the clutches C1 and C2, as illustrated in FIG. 22(a). As will be described later in step S20 of FIG. 28, the clutches C1 and C2 are both engaged to connect the carrier C (e.g., the third rotor) and the ring gear R (e.g., the first rotor). This causes the carrier C and the ring gear R to be held from rotating relative to each other. This means that all the ring gear R, the sun gear S, and the carrier C rotate in unison with each other. In other words, the ratio of speed of the sun gear S (e.g., the second rotor) to that of the carrier C (e.g., the third rotor) as well as that of the sun gear S to the ring gear R are fixed to, for example, one (1). The power, as produced by the engine 12 (i.e., the power source) is, therefore, transmitted to the sun gear S and to both the ring gear R and the carrier C. A portion of the power, as transmitted to the ring gear R, is outputted directly to the driven wheels 14, while a remaining portion of the power, as transmitted to the carrier C, is transmitted to the driven wheels 14 through the gear G2α, the gear G2β, the clutches C1 and C2, and the gear G6. Therefore, the speed or power of the ring gear R (i.e., the driven wheels 14) is permitted to be controlled by controlling an output of the engine 12.

The power transmission apparatus may also include a driving power transmission path through which the second rotor is to be connected mechanically to the first rotor through the continuously variable transmission and a driven wheel-side power transmission control mechanism which is disposed in the driving power transmission path and selectively establishes and blocks transmission of power between the first and second rotors. The fixing means includes dual path establishing controlling means for controlling an operation of the driven wheel-side power transmission control mechanism to establish transmission of power through both the power circulation path and the driving power transmission path when the continuously variable transmission is determined to be failing in operation to transmit the power therethrough.

Specifically, the dual path establishing controlling means works to keep a speed ratio of speed of the first rotor to speed of the third rotor constant, thus causing the speed ratio of speed of the second rotor to the speed of the third rotor to be fixed. For instance, the driven wheel-side power transmission control mechanism is implemented by the clutch C2 in the structure of FIG. 22(a). The dual path establishing controlling means is implemented by the clutch C1.

The power transmission apparatus may also include a circulation establishing power transmission control mechanism which selectively establishes and blocks transmission of power between the second and third rotors through the power circulation path. The dual path establishing controlling means controls operations of the driven wheel-side power transmission control mechanism and the circulation establishing power transmission control mechanism to establish the transmission of power through the power circulation path and the driving power transmission path when the continuously variable transmission is determined to be failing in operation to transmit the power therethrough.

The power is enabled to be circulated between the second and third rotors when the circulation establishing power transmission control mechanism establishes the transmission of power between the second and third rotors through the power circulation path, and the driven wheel-side power transmission control mechanism blocks the transmission of power between the first and second rotors.

The power source may be connected mechanically between the continuously variable transmission and the second rotor.

The power transmission apparatus may also include diagnosing means for diagnosing whether the continuously variable transmission is failing in operation to transmit the power therethrough or not. The dual path establishing controlling means may establish the transmission of power through both the power circulation path and the driving power transmission path when the continuously variable transmission is determined to be failing in operation to transmit the power therethrough.

The power source may include an internal combustion engine and an electric rotating machine. The internal combustion engine is joined mechanically to one of an input and an output of the continuously variable transmission leading to the second rotor. The electric rotating machine is joined mechanically to the other of the input and the output of the continuously variable transmission.

The power transmission apparatus may also include a starting power transmission control mechanism which selectively establishes and blocks transmission of power between the third rotor and a rotating shaft of the internal combustion engine.

The starting power transmission control mechanism may include an electrically-controlled fastener which selectively establishes engagement and disengagement between the third rotor and the rotating shaft of the internal combustion engine.

The starting power transmission control mechanism may alternatively include a one-way transmission mechanism which establishes the transmission of power between the third rotor and a rotating shaft of the internal combustion engine in a condition that a speed of rotation of an input of the one-way transmission mechanism leading to the third rotor is not lower than that of an output of the one-way transmission mechanism leading to the internal combustion engine.

The power transmission apparatus may also include a driving power transmission control mechanism which selectively establishes and blocks transmission of power between the second rotor and the internal combustion engine.

The continuously variable transmission may be of a belt type. The power transmission apparatus may also include transmission blocking means for loosening a belt of the continuously variable transmission to block the transmission of power through the continuously variable transmission. When the transmission blocking means blocks the transmission of power through the continuously variable transmission, the dual path establishing controlling means establishes the transmission of power through both the power circulation path and the driving power transmission path.

The power source may be connected mechanically between the continuously variable transmission and the second rotor. The power transmission apparatus may also include holding means for holding the third rotor from rotating, and wherein said fixing means operates the holding means to hold the third rotor from rotating.

Specifically, the holding means holds the third rotor from rotating, thus permitting the speed of the second rotor to be controlled through the power source to control the speed of the driven wheel.

According to the fifth aspect of the embodiment, there is provided a power transmission apparatus for a vehicle which comprises: (a) a power split device which is to be coupled to a power source and includes power split rotors that are a first, a second, and a third rotor which rotate in conjunction with each other to split power among the first, second, and third rotors, the first rotor being coupled mechanically to a driven wheel of a vehicle; (b) a continuously variable transmission joined mechanically to the power split device; (c) a power circulation path which is established by connecting the second and third rotors through the continuously variable transmission and through which power is to be circulated between the second and third rotors in a power transmission mode in which power, as produced by the power source, is transmitted to the first rotor through the second rotor; (d) a driving power transmission path through which the second rotor is to be connected mechanically to the first rotor through the continuously variable transmission; (e) a driven wheel-side power transmission control mechanism which is disposed in the driving power transmission path and selectively establishes and blocks transmission of power between the first and second rotors; and (f) dual path establishing controlling means for controlling an operation of the driven wheel-side power transmission control mechanism to establish transmission of power through both the power circulation path and the driving power transmission path when the continuously variable transmission is determined to be failing in operation to transmit the power therethrough.

Specifically, the dual path establishing controlling means works to keep the speed ratio of speed of the first rotor to speed of the third rotor, thus enabling the speed ratio of speed of the second rotor to the speed of the third rotor to be fixed without using the continuously variable transmission. This structure also enables a portion of the power which is being circulated between the second and third rotors to be supplied to the first rotor. Therefore, when the power or torque which is being circulated between the second and third rotors is greater than an upper limit of a permissible toque range of the continuously variable transmission, the supply of the portion of the power to the first rotor results in a decrease in degree of torque exerted on the continuously variable transmission.

In the preferred mode of the embodiment, the power transmission apparatus may also include efficiency determining means for determining that the continuously variable transmission has decreased in efficiency in transmitting the power therethrough when a degree of torque acting on the continuously variable transmission increases. When the efficiency determining means determines that the continuously variable transmission has decreased in efficiency in transmitting the power therethrough, the dual path establishing controlling means setting speeds of an input and an output of the driven wheel-side power transmission control mechanism to be different from each other so as to decrease a degree to which the power is to be transmitted through the driven wheel-side transmission control mechanism.

According to the sixth aspect of the embodiment, there is provided a power transmission apparatus for a vehicle comprising: (a) a power split device which is to be coupled to a power source and includes a plurality of power split rotors that are so linked as to rotate in conjunction with each other to split power between the power split rotors; (b) a speed variator which is coupled mechanically to the power split device and has a variable gear ratio; (c) an in-direct transmission path which is established to transmit power, as produced by the power source, to the driven wheel through the speed variator; (d) a direct transmission path which is established to transmit the power, as produced by the power source, to the driven wheel without using the speed variator; and (e) switching means for between an in-direction transmission mode in which the in-direction transmission path is established and a direct transmission mode in which the direct transmission path is established.

The use of the direct transmission mode results in an improvement of efficiency in transmitting the power to the driven wheel.

In the preferred mode of the embodiment, the power split rotors may include a first, a second, and a third rotor, the first rotor being coupled mechanically to the driven wheel. In the in-direct transmission mode, the second and third rotors are coupled mechanically to each other through the speed variator to transmit the power, as produced by the power source, to the first rotor through one of the second and third rotors. The power transmission device may also include a power circulation path through which power is to be circulated between the second and third rotors in the in-direct power transmission mode.

The power transmission apparatus may also include a driving power transmission path through which the first rotor is to be connected mechanically to the second rotor through the speed variator, an in-direct power transmission control mechanism which selectively establishes and blocks transmission of power between one of an input and an output of the speed variator which is connected mechanically to the second rotor and the power source, and a direct power transmission control mechanism which selectively establishes and blocks transmission of power between one of the input and the output of the speed variator which is coupled mechanically to the first rotor and the power source.

The direct power transmission control mechanism may include an electronically-controlled fastener which has a first axis leading to the power source and a second axis leading to the speed varaitor and which selectively establishes engagement and disengagement between the first and second axes.

The direct power transmission control mechanism may alternatively include a one-way transmission mechanism which transmits power therethrough in a condition that a speed of an input of the one-way transmission mechanism which leads to the power source is not lower than that of an output of the one-way transmission mechanism which leads to the speed variator.

The direct power transmission control mechanism is implemented by an electronically-controlled fastener which has a first axis leading to the power source and a second axis leading to the speed varaitor and which selectively establishes engagement and disengagement between the first and second axes, and the in-direct power transmission control mechanism is implemented by a one-way transmission mechanism which transmits power therethrough in a condition that a speed of an input of the one-way transmission mechanism which leads to the power source is not lower than that of an output of the one-way transmission mechanism which leads to the speed variator. Alternatively, the direct power transmission control mechanism is implemented by a one-way transmission mechanism which transmits power therethrough in a condition that a speed of an input of the one-way transmission mechanism which leads to the power source is not lower than that of an output of the one-way transmission mechanism which leads to the speed variator, and the indirect power transmission control mechanism is implemented by an electronically-controlled fastener which has a first axis leading to the power source and a second axis leading to the speed varaitor and which selectively establishes engagement and disengagement between the first and second axes. The power transmission apparatus may also include controlling means for controlling an operation of the speed variator in the direct power transmission mode so that a speed of rotation of the output of the one-way transmission mechanism is not low or equal to that of the input of the one-way transmission mechanism.

Alternatively, the direct power transmission control mechanism is implemented by a one-way transmission mechanism which transmits power therethrough in a condition that a speed of an input of the one-way transmission mechanism which leads to the power source is not lower than that of an output of the one-way transmission mechanism which leads to the speed variator. The indirect power transmission control mechanism is implemented by a one-way transmission mechanism which transmits power therethrough in a condition that a speed of an input of the one-way transmission mechanism which leads to the power source is not lower than that of an output of the one-way transmission mechanism which leads to the speed variator.

The power transmission apparatus may also include a power circulation path which is established by connecting the second and third rotors through the speed variator and through which power is to be circulated between the second and third rotors in a power transmission mode in which power, as produced by the power source, is transmitted to the first rotor through one of the second rotor and the third rotor, a circulation establishing power transmission control mechanism which selectively establishes and blocks transmission of the power between the second and third rotors through the power circulation path, and a driven wheel-side power transmission control mechanism which is disposed in the driving power transmission path and selectively establishes and blocks transmission of the power between one of the output and the input of the speed variator which is coupled mechanically to the first rotor and the first rotor.

The power source producing the power which is to be transmitted selectively through the in-direct power transmission control mechanism and the direct power transmission control mechanism is an internal combustion engine. The second rotor is coupled mechanically to an electric rotating machine.

The power transmission apparatus may also include comprising a starting power transmission control mechanism which selectively establishes and blocks transmission of power between the third rotor and the internal combustion engine.

The starting power transmission control mechanism includes an electrically-controlled fastener which selectively establishes engagement and disengagement between the third rotor and the internal combustion engine.

The starting power transmission control mechanism may alternatively include a one-way transmission mechanism which establishes the transmission of power between the third rotor and the internal combustion engine in a condition that a speed of rotation of an input of the one-way transmission mechanism leading to the third rotor is not lower than that of an output of the one-way transmission mechanism leading to the internal combustion engine.

When the circulation establishing power transmission control mechanism blocks the transmission of the power between the second and third rotors, the driven wheel-side power transmission control mechanism establishes the transmission of the power between the one of the output and the input of the speed variator and the first rotor, and the starting power transmission control mechanism establishes the transmission of power between the third rotor and the internal combustion engine, the power is circulated between the first and second rotors through the driven wheel-side power transmission control mechanism.

The power transmission apparatus may also include direct transmission mode establishing means for establishing the direct transmission mode when a speed of the driven wheel lies within a given range.

The speed variator may be of a belt type continuously variable transmission. The power transmission apparatus may also include diagnosing means for diagnosing whether the continuously variable transmission is failing in operation to transmit the power therethrough or not and direct transmission mode establishing means for establishing the direct transmission mode when the continuously variable transmission is determined to be failing in operation to transmit the power therethrough.

The electric rotating machine is coupled mechanically to the second rotor through the speed variator. The power transmission apparatus may also include power conversion means for converting the power, as produced by the internal combustion engine, into electric energy. When the driven wheel is stopped, the power conversion means blocks the transmission of the power between the second and third rotors and the transmission of the power between the one of the output and the input of the speed variator and the first rotor through the circulation establishing power transmission control mechanism and the driven wheel-side power transmission control mechanism, and converts the power into the electric energy.

The power transmission apparatus may also include comprising a driving power transmission path through which the first rotor is to be connected mechanically to the second rotor through the speed variator, a driven wheel-side power transmission control mechanism which is disposed in the driving power transmission path and selectively establishes and blocks transmission of the power between one of the output and the input of the speed variator which is coupled mechanically to the first rotor and the first rotor, and a circulation establishing power transmission control mechanism which selectively establishes and blocks transmission of the power between the second and third rotors through the power circulation path. The switching means includes the driven wheel-side power transmission control mechanism and the circulation establishing power transmission control mechanism. When the driven wheel-side power transmission control mechanism establishes the transmission of the power between one of the output and the input of the speed variator and the first rotor, and the circulation establishing power transmission control mechanism blocks the transmission of the power between the second and third rotors, the direct transmission mode is established.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 2(a) is a schematic block diagram which shows a power transmission path when a vehicle is started by a motor-generator in a first operation mode;

FIG. 2(b) is a nomographic chart which represents an operation of a power split device of the power transmission device of FIG. 1(a) along with the speed of an internal combustion engine;

FIG. 2(c) is a table which lists a relation in sign of rotational direction, torque, and power among a sun gear, a carrier, and a ring gear of the power split device of FIGS. 2(a) and 2(b);

FIG. 4(a) is a schematic block diagram which shows a power transmission path when an internal combustion engine is started by a motor-generator in a second operation mode;

FIG. 4(b) is a nomographic chart which represents an operation of a power split device along with the speed of an internal combustion engine;

FIG. 4(c) is a table which lists a relation in sign of rotational direction, torque, and power among a sun gear, a carrier, and a ring gear of the power split device of FIGS. 4(a) and 4(b);

FIG. 6(a) is a graph which shows a relation between a total gear ratio of a power transmission device and a gear ratio of a CVT when a vehicle is powered by an internal combustion engine;

FIG. 6(b) is a graph which shows a relation between a total gear ratio of a power transmission device and a gear ratio of a CVT when a vehicle is powered by a motor-generator;

FIG. 6(c) is a graph which shows a relation between a total gear ratio of a power transmission device of the first embodiment and a power transmission efficiency;

FIG. 23(a) is a schematic block diagram which shows a power transmission path of the power transmission device of FIG. 22(a) when a vehicle is started by a motor-generator in a first operation mode;

FIG. 23(b) is a nomographic chart which represents an operation of a power split device of the power transmission device of FIG. 22(a) along with the speed of an internal combustion engine;

FIG. 23(c) is a table which lists a relation in sign of rotational direction, torque, and power among a sun gear, a carrier, and a ring gear of the power split device of FIGS. 23(a) and 23(b);

FIG. 25(a) is a schematic block diagram which shows a power transmission path of the power transmission device of FIG. 22(a) when an internal combustion engine is started by a motor-generator in a second operation mode;

FIG. 25(b) is a nomographic chart which represents an operation of a power split device of FIG. 22(a) along with the speed of an internal combustion engine;

FIG. 25(c) is a table which lists a relation in sign of rotational direction, torque, and power among a sun gear, a carrier, and a ring gear of the power split device of FIGS. 25(a) and 25(b);

FIG. 31 is a flowchart of a fail-safe operation of the power transmission device of the tenth embodiment;

FIG. 36(a) is a schematic block diagram which shows a power transmission path of the power transmission device of FIG. 35 when a vehicle is started by a motor-generator in a first operation mode;

FIG. 36(b) is a nomographic chart which represents an operation of a power split device of the power transmission device of FIG. 35 along with the speed of an internal combustion engine;

FIG. 36(c) is a table which lists a relation in sign of rotational direction, torque, and power among a sun gear, a carrier, and a ring gear of the power split device of FIGS. 36(a) and 36(b);

FIG. 38(a) is a schematic block diagram which shows a power transmission path of the power transmission device of FIG. 35 when an internal combustion engine is started by a motor-generator in a second operation mode;

FIG. 38(b) is a nomographic chart which represents an operation of a power split device of FIG. 35 along with the speed of an internal combustion engine;

FIG. 38(c) is a table which lists a relation in sign of rotational direction, torque, and power among a sun gear, a carrier, and a ring gear of the power split device of FIGS. 38(a) and 38(b);

FIG. 47(*b*) is a schematic diagram which shows a power transmission path in a fourth fail-safe operation in the nineteenth embodiment;

FIG. 48(*b*) is a schematic diagram which shows a power transmission path of the power transmission device of FIG. 48(*a*) placed in a third operation mode;

FIG. 51(*b*) is a graph which shows a relation between a total gear ratio of another modification of a power transmission device and a gear ratio of a CVT when an operation mode of the power transmission device is switched to a third operation mode; and FIG. 51(*c*) is a graph which shows a relation between a total gear ratio of another modification of a power transmission device and a gear ratio of a CVT when an operation mode of the power transmission device is switched to a third operation mode.

DESCRIPTION OF THE PREFERRED EMBODIMENTS

Figure 1A:
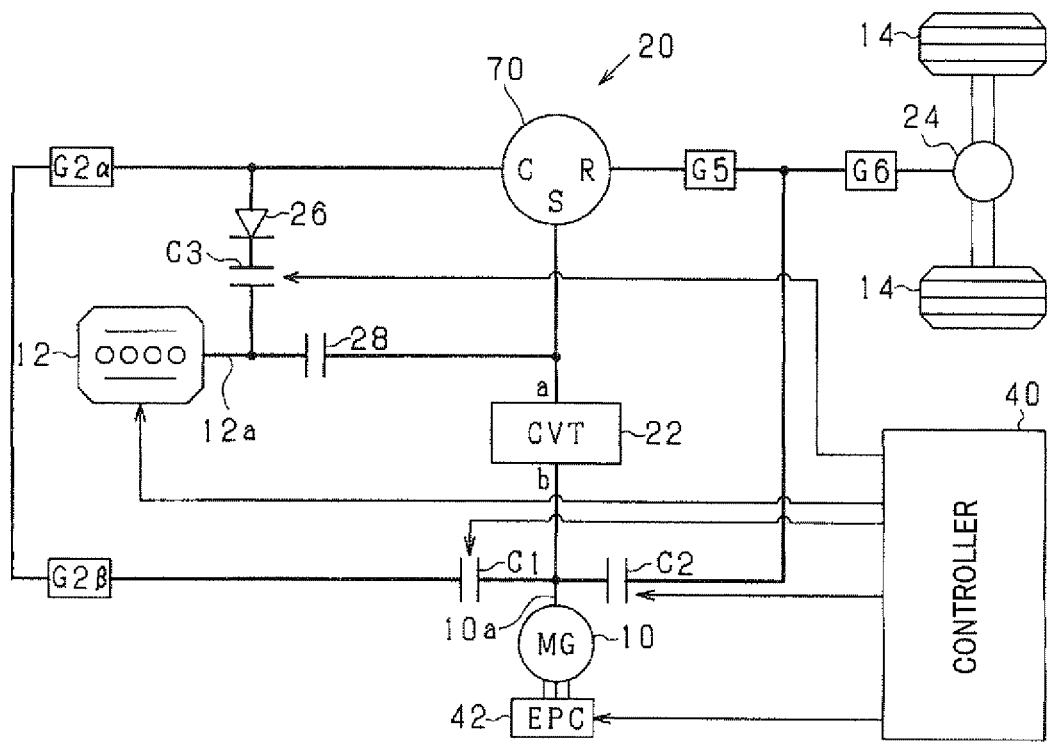
FIG. 1(a) is a block diagram which illustrates a power transmission device of the first embodiment which is installed in a hybrid system for a vehicle.

Referring to the drawings, wherein like reference numbers refer to like parts in several views, particularly to FIGS. 1(*a*) and 1(*b*), there is shown an automotive hybrid system equipped with a power transmission control system according to the first embodiment of the invention. The power transmission control system is equipped with a power transmission device and a controller working to control an operation of the power transmission device. FIG. 1(*a*) illustrates the structure of the hybrid system. FIG. 1(*b*) is a skeleton view of power transmission paths of the power transmission device.

The hybrid system includes a motor-generator 10 (i.e., an electric rotating machine) and a power split device 20. The motor-generator 10 is made of a three-phase ac motor-generator and works as an in-vehicle power producing device along with an internal combustion engine 12 to run an automotive vehicle. The power split device 20 works to split power or torque among the motor-generator 10, the internal combustion engine 12, and driven wheels 14 of the vehicle.

The power split device 20 is equipped with a single planetary gear set 70 made up of three power split rotors: a sun gear S, a carrier C, and a ring gear R. To the sun gear S, an output axis (i.e. a rotating shaft) 10*a* of the motor-generator 10 is coupled mechanically through a continuously variable transmission (CVT) 22. The ring gear R is also connected mechanically to the sun gear S through the CVT 22, a clutch C2, and a gear G5. The motor-generator 10 is, therefore, connected mechanically to the ring gear R through the clutch C2 and the gear G5. In other words, the motor-generator 10 and the ring gear R are so connected through a mechanical interlocking path that they rotate in conjunction with each other without the other power split rotors of the power split device 20. The CVT 22, as used in this embodiment, is of a mechanical type using a metallic or rubber belt. The gear G5 is implemented by a counter gear which works to change a ratio of rotational speed of an input to an output thereof by a fixed factor and reverse the direction of rotation of the input, in other words, reverse the sign in direction of rotation of the output to that of the input. The clutch C2 works as an electronically controlled-hydraulic power breaker to block transmission of power or torque between an input and an output thereof, in other words, works as an electrically controlled fastener to selectively establish engagement between the input and the output (i.e., an input and an output shaft or axis) thereof. The clutches C1, C3 to C5, as will be described later, have substantially the same structure as the clutch C2. The input and the output, as referred to therein, are an input into which the energy is entered and an output from which the energy goes out, but its relation may be changed.

To the ring gear R of the power split device 20, the driven wheels 14 are coupled mechanically. Specifically, the driven wheels 14 are joined to the ring gear R through gears G5 and G6 and a differential gear 24. The gear G6 is implemented by a forward gear set (also called a normal rotation gear set) which works to change a ratio of rotational speed of an input to an output thereof by a fixed factor, but does not reverse the direction of rotation of the input.

To the carrier C of the power split device 20, the sun gear S is coupled mechanically through gears G2α and G2β, a clutch C1, and the CVT 22. The gears G2α and G2β are each implemented by a counter gear which works to change a ratio of rotational speed of an input to an output thereof by a fixed factor and reverse the direction of rotation of the input. The gears G2α and G2β may be made by a single gear assembly or gear box. The clutch C1 works as an electronically controlled hydraulic power breaker (i.e., a power transmission control mechanism) to block transmission of power or torque between an input and an output thereof. The clutches C1 and C2 are, as can be seen from FIG. 1(*b*), each joined at either of the input or the output thereof to a common rotational shaft.

The crankshaft (i.e., the rotating shaft 12*a*) of the engine 12 is also coupled mechanically to the carrier C through a one-way bearing 26 and a clutch C3. The one-way bearing 26 works as a one-way transmission mechanism to permit the transmission of power (torque) from the carrier C to the engine 12 under the condition that the rotational speed of the carrier C (i.e., an input of the one-way bearing 26) is not lower than that of the rotating shaft 12*a* (i.e., an output of the one-way bearing 26) of the engine 12. In other words, the one-way bearing 26 works to have the sun gear S follow the input of the one-way bearing 26 unless the speed of the output of the one-way bearing 26 is greater than that of the input of the one-way bearing 26. The clutch C3 works as a normally-open type of electronically controlled mechanical breaker to block the transmission of power (torque) between an input and an output thereof.

The sun gear S is also coupled mechanically to the rotating shaft 12*a* of the engine 12 through a clutch 28. The clutch 28 works as an electronically controlled hydraulic power breaker to block transmission of power or torque between an input and an output thereof. The engine 12 is, therefore, joined mechanically to the ring gear R through the clutch 28, the CVT 22, the clutch C2, and the gear G5.

Each of the gears G2α, G2β, G5, and G6 may be implemented by a gear set made up of a plurality of gears with a fixed gear ratio (i.e., an output-to-input speed ratio).

The hybrid system also includes a controller 40 to control an operation of the power transmission device. The controller 40 works to actuate the clutches C1, C2, C3, the clutch 28, and the CVT 22 to control the mode of power transmission and determine a controlled variable of the engine 12. The controller 40 also works to control an operation of an inverter (i.e., a power converter) 42 to determine a controlled variable of the motor-generator 10.

The controller 40 controls the operations of the clutches C1 and C2 to place the power transmission device either in a first operation mode or a second operation mode. In the first operation mode, the clutch C1 is in an engaged state, while the clutch C2 is in a disengaged state. In the second operation mode, the clutch C1 is in the disengaged state, while the clutch C2 is in the engaged state. The operations of the power transmission device in the first and second operation modes, a mode switching mode wherein the first operation mode is to be switched to the second operation mode, and a reverse driving mode in which the vehicle is run in a backward direction will be described below. Note that the clutches C1 and C2 and the CVT 22 are illustrated in FIG. 1(a) as being separate from each other, but either or both of the clutches C1 and C2 and the CVT 22 may be assembled into a unit functioning as a connecting mechanism.

First Operation Mode

A starting mode in which a vehicle starting operation is made by the motor-generator 10 in the first operation mode will be described with reference to FIGS. 2(a) to 2(c). FIG. 2(a) illustrates a power transmission path when the vehicle is started. FIG. 2(b) is a nomographic chart (also called a nomogram) which represents the operation of the power split device 20 along with the speed of the internal combustion engine 12. In FIG. 2(b), a negative direction of rotation of the ring gear R is defined as "forward" because the gear G5 is made of a counter gear. Arrows in nomographic chart indicate directions of torque.

In the example of FIGS. 2(a) and 2(b), the clutch C3 is in the disengaged state, and the internal combustion engine 12 is stopped. The speeds of the rotors of the planetary gear set 70 which constitute the power split device 20 are dependent on the speed of the motor-generator 10 and the gear ratio (also called an output-to-input speed ratio, a variable speed ratio, a pulley ratio, or a CVT ratio) of the CVT 22. Specifically, in the nomographic chart of FIG. 2(b), the speeds of the sun gears S, the carrier C, and the ring gear S lie on a diagonal straight line. In other words, the sun gear S, the carrier C, and the ring gear R are so linked as to provide output rotational energies thereof which are arrayed straight in the nomogrpahic chart. The speed of the ring gear R that is one of the rotors of the power split device 20 other than the sun gear S and the carrier C is, therefore, set by determining the speed of the sun gear S and the carrier C.

In the first operation mode, amounts of output rotational energy (i.e., power), as outputted from the sun gear S and the carrier C that are the power split rotors of the planetary gear set 70 other than the ring gear R are, as illustrated in FIG. 2(c), opposite in sign to each other, so that the power is circulated between the sun gear S and the carrier C. Specifically, the power, as outputted from the carrier C, flows to the sun gear S through a looped mechanical path extending through the gears G2α and G2β and the CVT 22. Such a power circulation mode enables the driven wheels 14 to be rotated at an extremely low speed while keeping the motor-generator 10 rotating, so that a great degree of torque is applied to the driven wheels 14. This permits the vehicle to be started with a high degree of torque through the motor-generator 10 without needs for increasing the size of the motor-generator 10. Note that in FIG. 2(c), the plus (+) and minus (−) signs of the rotational direction of each of the sun gear S, the carrier C, and the ring gear R represent opposite directions: a normal direction and a reverse direction thereof, the plus (+) sign of the rotational energy (i.e., power) indicates when the rotational energy is outputted from the power split device 20, and the plus (+) and minus (−) signs of the torque are so defined as to meet the condition that the product of signs of the rotational direction and the torque will be the sign of the rotational energy (i.e., power). The generation of high torque to be imparted to the driven wheels 14 will also be described later in a section "GENERATION OF HIGH TORQUE IN FIRST OPERATION MODE" of the last part of the explanation of the embodiments.

The first operation mode in which the power is, as described above, circulated is capable of achieving the so-called geared neutral which places the speed of the driven wheels 14 at zero (0) during running of the power source (i.e., the motor-generator 10) and also reversing the sign of the speed of rotation of the driven wheels 14 (i.e., the direction of rotation of the driven wheels 14) while fixing the sign of the speed of rotation of the power source. These are advantageous operations provided by the circulation of the power in the power transmission device. The power transmission device of this embodiment is, however, designed not to reverse the sign of the speed (i.e., the direction) of rotation of the driven wheels 14 while the power is being circulated for reasons, as described later in detail.

Second Operation Mode

Figure 3A:
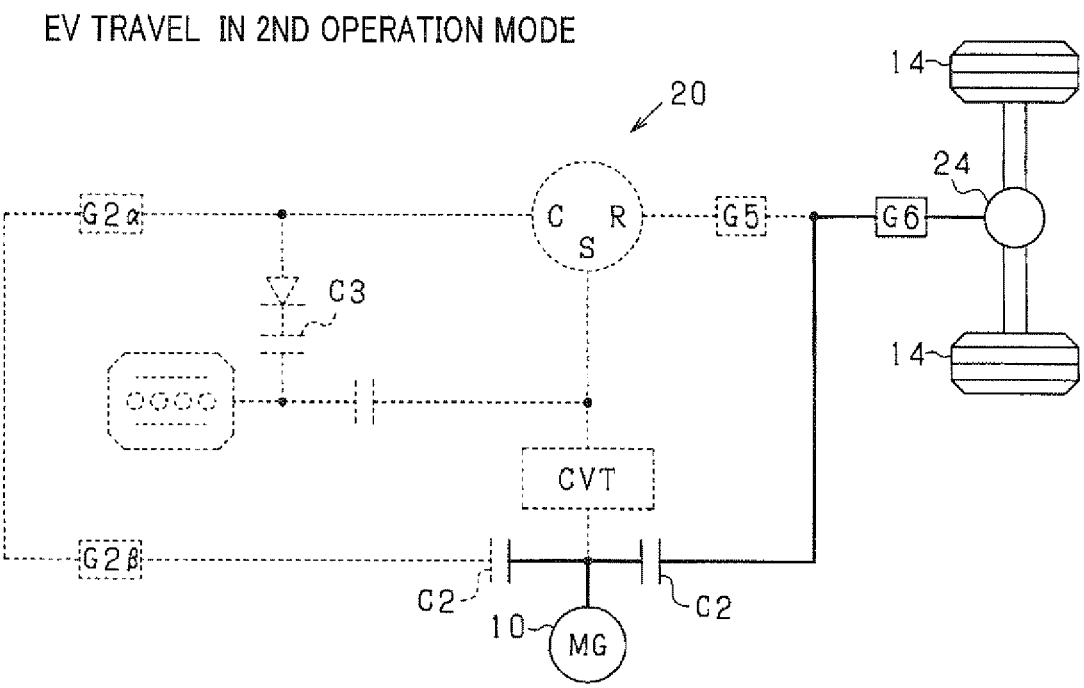
FIG. 3(a) is a schematic block diagram which shows a power transmission path when a vehicle is run by a motor-generator in a second operation mode.
Figure 3B:
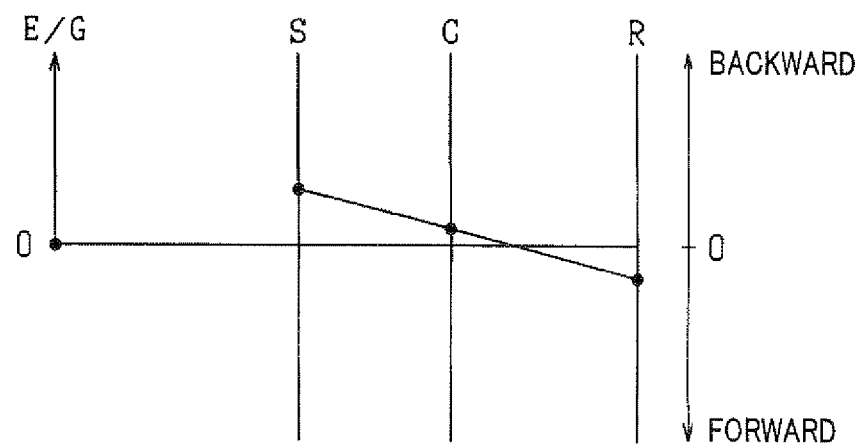
FIG. 3(b) is a nomographic chart which represents an operation of a power split device along with the speed of an internal combustion engine.

FIG. 3(a) illustrates a power transmission path of the power transmission device in the second operation mode that is an EV travel mode in which the vehicle is run only by the motor-generator 10. FIG. 3(b) is a nomographic chart in the second operation mode. The clutch C3 is in the disengaged state.

The power is transmitted from the motor-generator 10 to the driven wheels 14 through the clutch C2 and the gear G6 without the power split device 20. This is because torques of the carrier C, the sun gear S, and the ring gear R are proportional to each other (see Eqs. (c1) and (c2), as will be described later in detail), so that the torque is not transmitted to either of the sun gear S and the ring gear R when the torque is not exerted on to the carrier C. The power, as produced by the motor-generator 10, is transmitted directly to the driven wheels 14 without passing through the CVT 22, thus resulting in a decrease in loss of the power.

FIG. 4(a) illustrates a power transmission path of the power transmission device when the engine 12 is started in the second operation mode. FIG. 4(b) illustrates a nomographic chart in such an engine starting mode.

The clutch C3 is engaged, as shown in FIG. 4(a), to permit the torque to be transmitted to the engine 12 through the power split device 20. Specifically, the rotational energy of a starting rotor (i.e., the carrier q of the power split device 20 is transmitted to the rotating shaft 12a of the engine 12 through the one-way bearing 26. FIG. 4(c) demonstrates relations among the rotational direction, the torque, and the power of the sun gear S, the carrier C, and the ring gear R in the engine starting mode. The sun gear S and the ring gear R are opposite in sign of the power to each other, so that the power is circulated between the sun gear S and the ring gear R. Specifically, the power, as outputted from the ring gear R is inputted to the sun gear S. Therefore, the carrier C may be rotated at a very low or zero (0) speed, or the absolute value of the power of the carrier C may be decreased to a small value even when the absolute value of output torque of the motor-generator 10 or the driven wheels 14 is not zero (0). This enables the speed of the input of the one-way bearing 26 relative to that of the output thereof to be lowered extremely when the clutch C3 is switched to the engaged state when the rotating shaft 12a of the engine 12 is stopped, thereby minimizing mechanical vibrations of the power split device 20 which arises from the switching of the clutch C3 to the engaged state.

It is preferable that the clutch C3 is placed in the engaged state when the speed of the engine 12 is lower than or equal to a minimum value required to ensure the stability in running of the engine 12. When the speed of the engine 12 is above the minimum value, the controller 40 starts to burn fuel in the internal combustion engine 12 being running and control the burning of fuel in a combustion control mode.

The circulation of power, as described above, is required to keep the speed of rotation of the carrier C at zero (0) even when the absolute value of torque or power of the motor-generator 10 or the driven wheels 14 is not zero (0). This is because the power of the motor-generator 10 or the driven wheels 14 needs to be consumed fully in order to keep the speed of the carrier C at zero (0) even when the power is not being circulated through a loop between the ring gear R and the sun gear S according to the law of energy conservation.

Figure 5A:
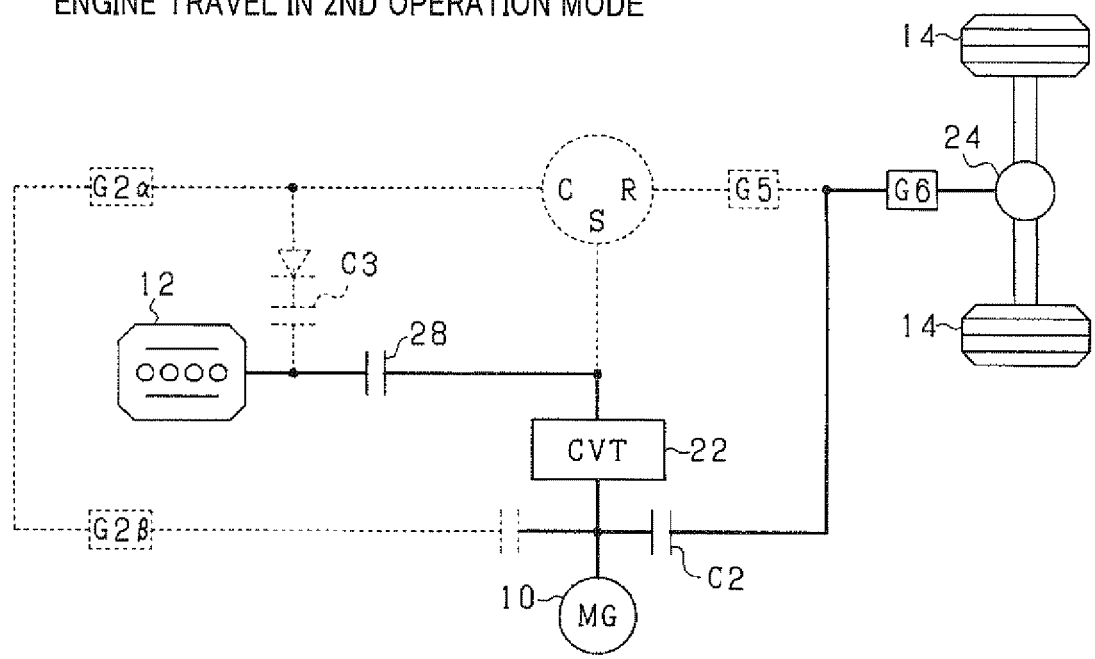
FIG. 5(a) is a schematic block diagram which shows a power transmission path when a vehicle is driven by an internal combustion engine in a second operation mode.
Figure 5B:
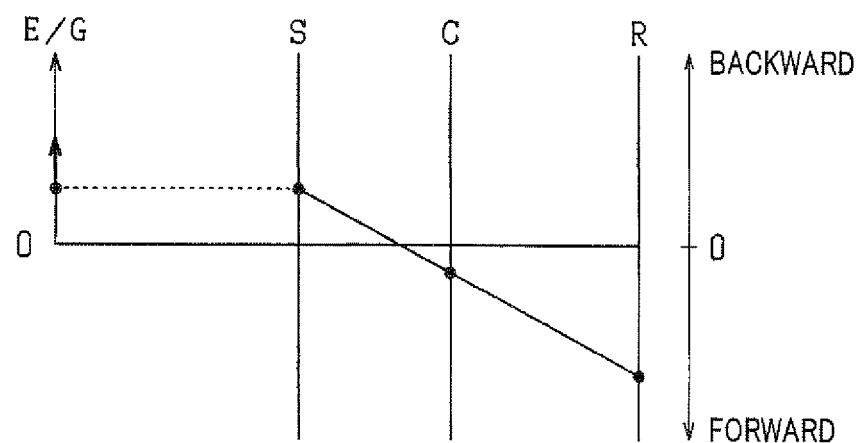
FIG. 5(b) is a nomographic chart which represents an operation of a power split device along with the speed of an internal combustion engine.

FIG. 5(a) illustrates a power transmission path of the power transmission device to run the vehicle through the engine 12 in the second operation mode. FIG. 5(b) illustrates a nomographic chart in such an engine-powered running mode.

When the speed of the engine 12 is increased, and the speed of the input of the clutch 28 reaches that of the output thereof, the clutch 28 is engaged to transmit the torque of the engine 12 to the output of the clutch 28. The transmission of torque between the motor-generator 10 and the driven wheels 14 or between the engine 12 and the driven wheels 14 without passing through the power split device 20 is achieved by disengaging the clutch C3. Specifically, the output of the engine 12 is converted in speed by the CVT 22 and then transmitted to the driven wheels 14. The output of the motor-generator 10 is transmitted to the driven wheels 14 without passing through the CVT 22.

When the vehicle is being run by the engine 12, the motor-generator 10 does not necessarily need to be operated as an electric motor, but may be used as a generator. Alternatively, the motor-generator 10 may be deactivated.

Switching from First Operation Mode to Second Operation Mode

FIG. 6(a) illustrates a relation between a total gear ratio in the power transmission path extending from the engine 12 to the driven wheels 14 and the gear ratio of the CVT 22. Note that the total gear ratio, as referred to herein, represents an output-to-input speed ratio that is an output speed (i.e., speed of the driven wheels 14)/an input speed (i.e., speed of the power source (i.e., speed of an output of the engine 12 or the motor-generator 10 which is to be inputted to the power transmission device)). FIG. 6(b) illustrates a relation between a total gear ratio of the power transmission path extending from the motor-generator 10 to the driven wheels 14 and the gear ratio of the CVT 22. When the first operation mode is entered, the controller 40 may change the gear ratio of the CVT 22 continuously to change the speed of the driven wheels 14 from an extremely lower speed to a higher speed. When a given gear ratio of the CVT 22 is reached, the controller 40 may also switch the operation mode of the power transmission device from the first operation mode to the second operation mode, thereby enabling a range in which the total gear ratio in the power transmission path extending from the engine 12 to the driven wheels 14 is permitted to be change, as illustrated in FIG. 6(a), to be increased.

Specifically, the power transmission device is capable of changing the gear ratio of the CVT 22 in the first operation mode, as demonstrated in FIG. 6(a), to increase the total gear ratio in the power transmission path extending from the engine 12 to the driven wheels 14, subsequently switching the operation mode of the power transmission device to the second operation mode at a mode-switching point P, and then changing the direction in which the gear ratio of the CVT 22 changes to the opposite direction (which will also be referred to as a CVT reversing operation below) to increase the total gear ratio further. This results in an increased range in which the total gear ratio is permitted to be changed.

The above operation is achieved by controlling the power transmission device so that the sign of speed at which the total gear ratio changes with a change in gear ratio of the CVT 22 in the second operation mode, that is, the direction in which the total gear ratio changes with a change in gear ratio of the CVT 22 in the second operation mode is opposite that in the first operation mode. This is established in the condition that a derivative value of a function, in which the gear ratio of the CVT 22 is expressed by an independent variable, and the total gear ratio is expressed by a dependent variable, with respect to the gear ratio of the CVT 22 (i.e., the independent variable) in the second operation mode is opposite in sign to that in the first operation mode. This condition is realized by the gears G2α, G2β, and G5. Specifically, the possibility of the CVT reversing operation is dependent upon the sign of a product of gear ratios of the gears G2α, G2β, and G5. Conditions in which the CVT reversing operation is feasible will be given by a section "TOTAL GEAR RATIO", as will be discussed in the last section of this application.

The controller 40 performs the above first-to-second operation mode switching under the condition that the total gear ratio, that is, a ratio of an output speed that is the speed of the driven wheels 14 to an input speed that is the speed of the motor-generator 10 or the engine 12 will not change between the first and second operation modes. This condition is met when speeds of an input and an output of the clutch C1 are identical with each other, and speeds of an input and an output of the clutch C2 are identical with each other. The first-to-second operation mode switching may, therefore, be made through the time when both the clutches C1 and C2 are engaged simultaneously, thus avoiding an instantaneous omission of transmission of torque to the driven wheels 14.

The omission of transmission of torque to the driven wheels 14 is eliminated by the means of the gears G2α, G2β, and G5. The planetary gear set 70 (i.e., the power split device 20) is, as described above, so constructed that the speeds of the sun gear S, the carrier C, and the ring gear R of the power split device 20 are either all identical with or all different from each other. Specifically, the power split device 20 is, as can be seen from FIGS. 2(b) and 2(c), so designed that the speeds of rotation (or the rotational directions) of the sun gear S and the ring gear R are opposite in sign to each other in the nomographic chart. The sun gear S, the carrier C, and the ring gear R are, thus, different in speed from each other except when they are all zero (0). It is, therefore, impossible for only the CVT 22 to realize the condition that speeds of the input and the output of the clutch C1 are identical with each other, and speeds of the input and the output of the clutch C2 are identical with each other. Accordingly, the power transmission device of this embodiment has the gear G5, G2α, and G2β to ensuring the stability in engagement of the clutches C1 and C2 without the omission of transmission of torque to the driven wheels 14. Specifically, the gear G5 disposed between the ring gear R of the power split device 20 and the clutch C2 serves as a fist-to-second operation mode switching speed variator to compensate for a difference in speed between the sun gear S and the ring gear R when the first operation mode is switched to the second operation mode. The gear G5 may alternatively disposed between the sun gear S and the clutch C2. Similarly, either or both of the gears G2α and G2β disposed between the carrier C of the power split device 20 and the clutch C1 serve as a second-to-first operation mode switching speed variator to compensate for a difference in speed between the sun gear S and the carrier C when the second operation mode is switched to the first operation mode. The gear ratios of the gears G2α, G2β, and G5 and the CVT 22 required to avoid the omission of transmission of torque to the driven wheels 14 will be discussed later in the section "SWITCHING CONDITION WITHOUT OMISSION OF TRANSMISSION OF TORQUE".

As apparent from the above discussion, the switching from the first operation mode to the second operation mode results in an increased range in which the total gear ratio is permitted to be changed. This allows the CVT 22 to be reduced in size. In the second operation mode, the power is not circulated, thus enabling the power transmission efficiency that is the ratio of input energy to output energy in the power transmission device to be increased as compared with in the first operation mode. FIG. 6(*c*) is a graph which represents a relation between the power transmission efficiency and the total gear ratio. The graph shows that a very low range of the power transmission efficiency exists in the first operation mode, but not in the second operation mode. In the graph of FIG. 6(*c*), the power transmission efficiency in the first operation mode immediately before switched to the second operation mode is illustrated as being higher than that in the second operation mode, but it does not mean that the power transmission efficiency when the power transmission device is designed to operate only in the first operation mode is higher than when the power transmission device is designed to be switched between the first and second operation modes.

The controller 40 actuates the power transmission device in the first operation mode to apply an increased degree of torque to the driven wheels 14 even though the power transmission efficiency is low. This permits the motor-generator 10 to be reduced in size thereof. The controller 40 switches from the first operation mode to the second operation mode in a range where the speed of the driven wheels 14 is higher than a given value, thereby improving the power transmission efficiency and increasing the range where the total gear ratio is permitted to be changed. When the power transmission device is switched to the second operation mode, it results in no need for the power split device 20 to transmit the power to the driven wheels 14, but the carrier C of the power split device 20 may be used to apply initial torque (i.e., starting torque) to the engine 12. In other words, when it is required to start the engine 12 in the second operation mode, one of the rotors (i.e., the power split rotors) of the planetary gear set 70 which needs not be used in transmitting the power to the driven wheels 14 may be employed to start the engine 12.
Reverse Driving of Vehicle The reverse driving of the vehicle is achieved in the condition that the power is to be circulated, as illustrated in FIGS. 6(*a*) and 6(*b*), but the sign of the total gear ratio is not reversed in the first operation mode. Specifically, a minimum value of the total gear ratio is set to a value which is slightly greater than zero (0) by a given margin Δ and which does not permit the geared neutral to be achieved. This is for decreasing a required degree of the durability of the CVT 22. Generally, a gear ratio of the power transmission device which establishes a maximum speed of the vehicle is specified or fixed, thus limiting a maximum gear ratio in the first operation mode (i.e., a gear ratio at the mode switching point P). Consequently, when the driven wheels 14 are required to be reversed, in other words, the direction of rotation of the driven wheels 14 are required to be changed by reversing the sign of the total gear ratio in the first operation mode, an amount by which (i.e., a range within which) the total gear ratio is to be changed in the first operation mode needs to be increased. We have found that the greater the amount of change in the total gear ratio, the greater the torque to be exerted on the CVT 22, and that the required degree of durability of the CVT 22 will be decreased by decreasing the amount of change in the total gear ratio. The fact that the greater the amount of change in the total gear ratio, the greater the torque to be exerted on the CVT 22 will be described later in the section "RELATION BETWEEN CHANGE IN TOTAL GEAR RATIO AND DURABILITY OF CVT".

Figure 7A:
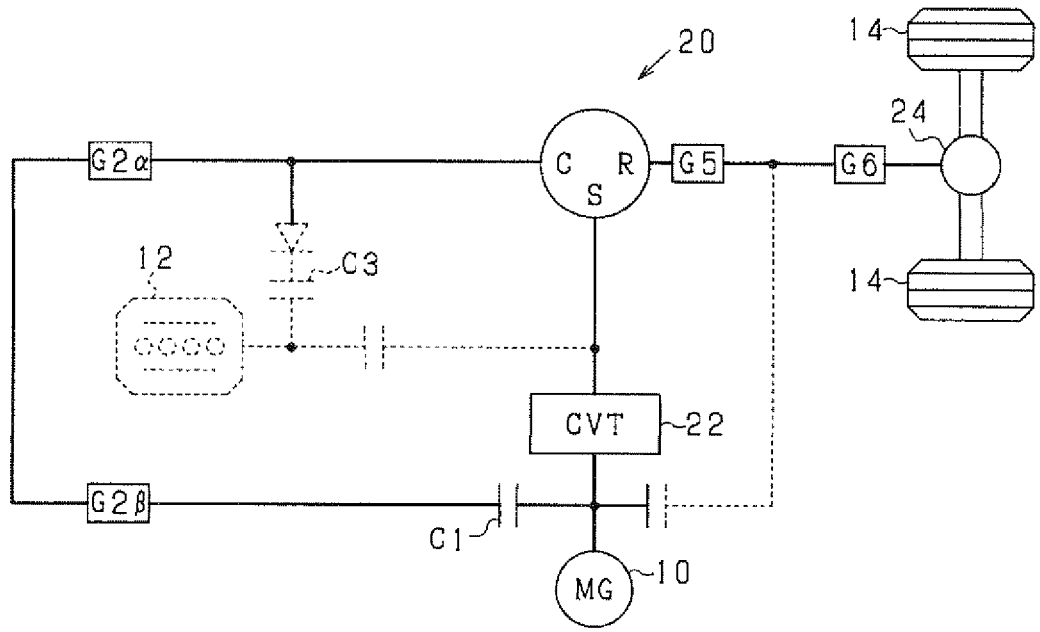
FIG. 7(a) is a schematic block diagram which shows a power transmission path when a vehicle is run backward by a motor-generator in a first operation mode.
Figure 7B:
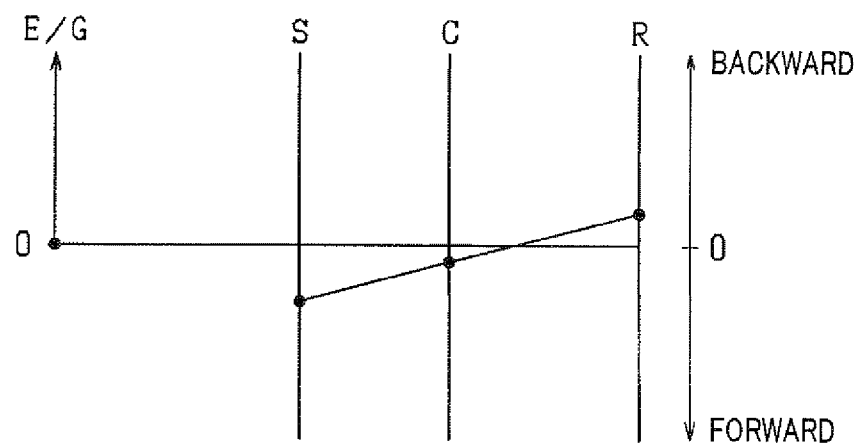
FIG. 7(b) is a nomographic chart which represents an operation of a power split device along with the speed of an internal combustion engine.

The power transmission device of this embodiment uses, as illustrated in FIG. 7(*a*), the first operation mode to run the vehicle in the backward direction. FIG. 7(*b*) is a nomographic chart in such a reverse driving mode. The controller 40 rotates the motor-generator 10 in a direction opposite to that when the vehicle is to be run in the forward direction and disengages the clutch 28 to avoid the rotation of the engine 12 following the rotation of the motor-generator 10.

The margin Δ, as illustrated in FIGS. 6(*a*) and 6(*b*), is selected to have a value which keeps the total gear ratio from reversing in sign thereof (i.e., the direction in which the driven wheels 14 to rotate) even through the CVT 22 has aged. The above discussion refers to, as an example, the case where the vehicle is run in the backward direction, however, the margin Δ may be used in defining the permissible range of the total gear ratio when the vehicle is to run in the forward direction in the first operation mode. For instance, in the case where the power transmission device is designed to run the vehicle in the forward direction within the range where the sign of the total gear ratio is positive (+) in sign, the negative (−) sign of the total gear ratio indicates that the vehicle is run in the backward direction. Conversely, in the case where the power transmission device is designed to run the vehicle in the backward direction within the range where the sign of the total gear ratio is positive (+) in sign, the negative (−) sign of the total gear ratio indicates that the vehicle is run in the forward direction. The margin Δ will produce the creep torque when the motor-generator 10 is activated. For instance, when it is required to run the vehicle in the forward direction, and the motor-generator 10 is activate, the creep torque works to move the vehicle in the forward direction immediately when the brake of the vehicle is released. The margin Δ may is preferably selected to have a value which does not cause the creep torque from moving the vehicle in the backward direction undesirably due to the aging of the CVT 22. This type of creep torque is similar to that produced in typical automotive vehicles equipped with an automatic transmission, thus not giving vehicle drivers a uncomfortable feeling.

The effects of aging of the CVT 22 will be described below with reference to FIGS. 8(*a*) to 8(*d*).

The CVT 22 includes a primary pulley 22*a*, a secondary pulley 22*b*, and a belt 22*c*. The primary pulley 22*a* serves as the input of the CVT 22. The secondary pulley 22*b* servers as the output of the CVT 22 which is to be coupled with the carrier C of the power split device 20. The secondary pulley 22*b* is equipped with a stopper working to limit the movement of the secondary pulley 22*b*, in other words, stop the width of the secondary pulley 22*b* from widening over a given limit. The stopper is of a known type equipped with a torque cam.

Figure 8A:
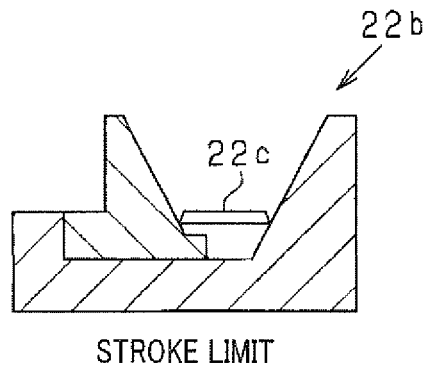
FIG. 8(a) is a transverse sectional view which shows a secondary pulley of a CVT when a belt is located most inwardly.
Figure 8B:
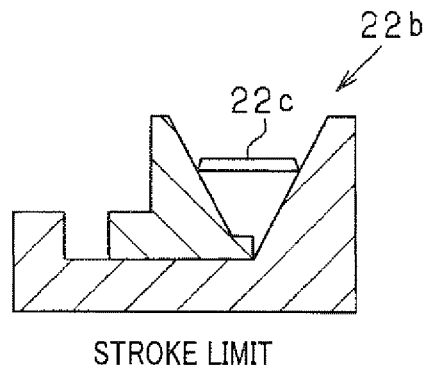
FIG. 8(b) is a transverse sectional view which shows a secondary pulley of a CVT when a belt is located most outwardly.
Figure 8C:
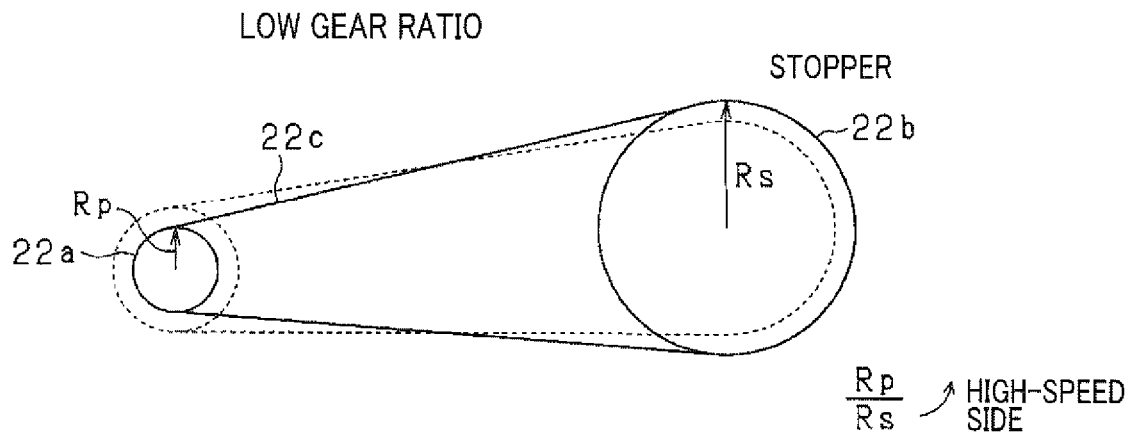
FIG. 8(c) is a side view of a CVT placed in a low-speed output mode.
Figure 8D:
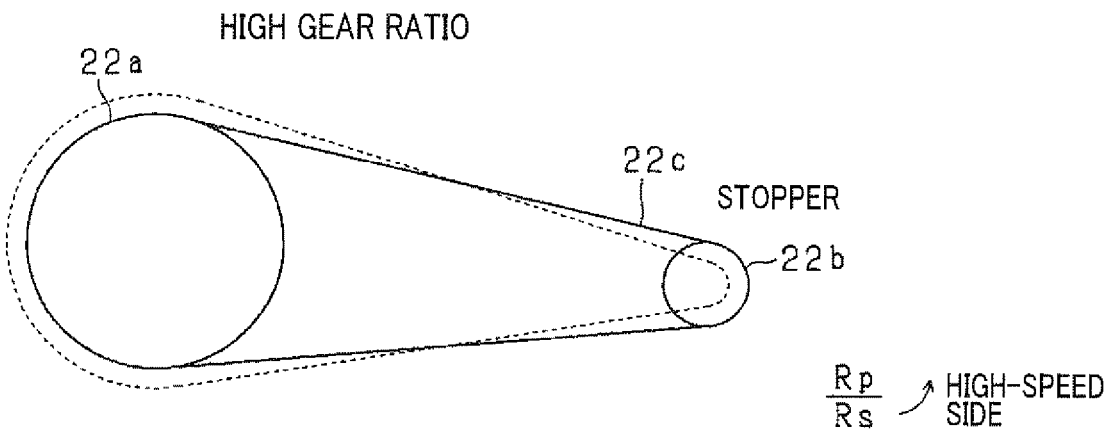
FIG. 8(d) is a side view of a CVT placed in a high-speed mode.

An increase in wear of the belt 22c of the CVT 22 will result in a decrease in width of the belt 22c, so that a portion of the belt 22c wound around the secondary pulley 22b is, as indicated by a broken line in each of FIGS. 8(c) and 8(d), shifted inwardly. The overall length of the belt 22c usually remains unchanged, so that a portion of the belt 22c wound around the primary pulley 22a is shifted outwardly. This results in an increase in a ratio (Rp/Rs), as defined by a ratio of a radius or distance Rp between the center of the primary pulley 22a and the belt 22c to a distance Rs between the center of the secondary pulley 22b and the belt 22c. In other words, the ratio (Rp/Rs) is changed to a high-speed gear ratio. This will cause a minimum value of an absolute value of the total gear ratio, as illustrated in FIGS. 6(a) to 6(c), to be decreased as the CVT 22 ages. The margin Δ is, therefore, so selected as to keep the minimum value of the absolute value of the total gear ratio from decreasing below zero (0) even if the CVT 22 has aged.

The structure of the hybrid system (i.e., the power transmission device) of this embodiment offers the following advantages.

1) The absolute value of the total gear ratio in the power transmission device is permitted to have in the first operation mode in terms of the structure of the power transmission device is, as described above, kept greater than zero (0). In other words, the range within which the total gear ratio is permitted to be changed is fixed to either of a positive range in which the sign of the total gear ratio is kept positive or a negative range in which the sign of the total gear ratio is kept negative, thereby allowing a required degree of durability of the CVT 22 to be decreased. The definition of the range in which the total gear ratio is permitted to changed may be achieved by designing the structure of the power transmission device (especially, the CVT 22) mechanically or a software program to be executed by the controller 40. It is advisable that the absolute value of the minimum value of the total gear ratio be set greater than zero (0) by a given amount (i.e., the margin Δ) which is substantially equivalent to, in other words, great enough to compensate for a change in total gear ratio arising from the aging of the CVT 22.

2) The power transmission device is designed to rotate the motor-generator 10 both in opposite directions, thereby permitting the driven wheels 14 to be reversed in the first operation mode. If the engine 10 is so engineered as to be rotatable both in opposite directions by itself or in combination with some mechanical means such as a gear, the power transmission device may reverse the engine 10 to reverse the driven wheels 14.

3) The absolute value of the minimum value of the total gear ratio is, as described above, set greater than zero (0), thereby producing the creep torque to move the vehicle in the forward or reverse direction.

4) The power transmission device is so designed that when it is required to output torque from the engine starting rotor (i.e., the carrier C) of the power split device 20 to start the engine 12, the power will be circulated between the other power split rotors (i.e., the sun gear S and the ring gear R), thereby facilitating ease of decreasing the speed of the engine starting rotor (i.e., the carrier q to a very low speed or zero (0), which will minimize mechanical vibrations exerted on the power split device 20 when the initial torque is applied to the engine 10.

5) In the second operation mode, the power split rotors of the power split device 20 other than the engine starting rotor (i.e., the carrier q are coupled mechanically together through the CVT 22. This permits the inclination of the straight line on which the power split rotors are arrayed in speed in the nomographic chart, as already described, to be changed by controlling the gear ratio of the CVT 22, in other words, the speed of the engine starting rotor (i.e., the carrier C) to be controlled variably by selecting the gear ratio of the CVT 22 regardless of the speed of the driven wheels 14.

6) In the second operation mode, the clutch C3 is in the disengaged state except when the engine 12 is started, thereby permitting the power to be transmitted from the motor-generator 10 or the engine 12 to the driven wheels 14 without the power split device 20.

7) In the second operation mode, the motor-generator 10 is placed in direction connection with the driven wheels 14 without using the CVT 22, thereby enhancing the efficiency of transmission of power between the motor-generator 10 and the driven wheels 14.

8) The engine 12 is placed in power transmitting communication with the sun gear S and the CVT 22 to transmit power of the engine 12 to the sun gear S and the CVT 22 after start-up of the engine 12. In other words, the engine starting rotor (i.e., the carrier C) which is to be placed in power transmitting communication with the rotating shaft 12a when it is required to start the engine 12 is different from a power transmitted rotor (i.e., the sun gear S) which is to be placed in power transmitting communication with the engine 12 and to which the power is transmitted from the engine 12 when it is required to rotate the driven wheels 14, thus enabling the speed of the engine 12 to be brought to an effective speed range quickly.

9) When it is required to transmit the output of the engine 12 to the driven wheels 12 in the second operation mode, the CVT 22 is disposed in connection between the engine 12 and the driven wheels 14, thus permitting the speed of the engine 12 to be changed by the CVT 22.

10) The clutch 28 is interposed between the engine 12 and the sun gear S, thereby permitting the power to be transmitted from the engine 12 to the sun gear S selectively and also avoiding the rotation of the engine 12 following the rotation of the driven wheels 14 when the vehicle is run in the backward direction.

11) The switching between the first operation mode and the second operation mode makes mechanical connections among the motor-generator 10, the engine 12, and the driven wheels 14 suitable for operational conditions thereof.

12) The CVT 22 is operable both in the first and second operation modes, thus resulting in a decrease in part of the power transmission device.

13) A first order derivative value of a function, in which the gear ratio of the CVT 22 is expressed by an independent variable, and the total gear ratio in the power transmission path between the power source (i.e., the motor-generator 10 or the engine 12) and the driven wheels 14) is expressed by a dependent variable, with respect to the gear ratio of the CVT 22 (i.e., the independent variable) in the second operation mode is set opposite in sign to that in the first operation mode. This enables the CVT reversing operation to broaden the range in which the total gear ratio is permitted to be changed.

14) The power transmission device is equipped with a mechanical measure (i.e., the gears G2α, G2β, and G5) which compensates for a difference in speed between the carrier C and the ring gear R, thereby eliminating the instantaneous omission of transmission of torque to the driven wheels 14 upon the switching between the first operation mode and the second operation mode.

15) The power transmission device is equipped with the electronically-controlled clutch C3 to establish or block the transmission of torque between the engine starting rotor (i.e., the carrier q of the power split device 20 and the rotating shaft 12a of the engine 12, thereby avoiding an error in transmission of torque from the engine starting rotor to the engine 12 before the engine 12 is started, which minimizes consumption of energy or power in the power transmission device.

16) The power transmission device is also equipped with the one-way bearing 26 which establishes the transmission of torque from the power slit device 20 to the rotating shaft 12a of the engine 12 under the condition that the speed of the input of the one-way bearing 26 (i.e., the speed of the engine starting rotor) is not lower than that of the output of the one-way bearing 26 (i.e., the speed of the rotating shaft 12a of the engine 12), thereby avoiding the transmission of torque from the engine 12 to the engine starting rotor when the torque is produced upon start of combustion of fuel in a combustion chamber of the engine 12, so that the speed of the rotating shaft 12a of the engine 12 rises quickly. This is because when the speed of the output of the one-way bearing 26 (i.e., the speed of the rotating shaft 12a) is elevated above that of the input of the one-way bearing 26, the one-way bearing 26 blocks the transmission of torque from the output to the input of the one-way bearing 26. This avoids the transmission of torque pulsation to the operator of the vehicle.

Figure 1B:
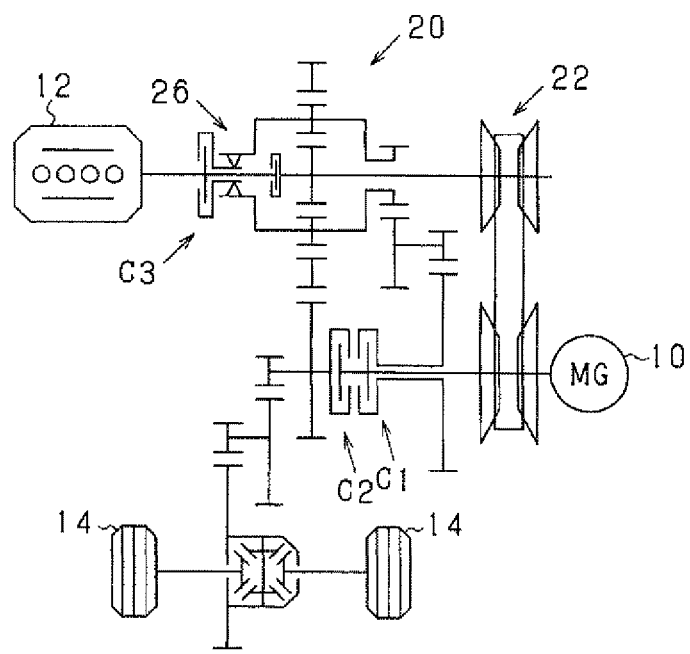
FIG. 1(b) is a view of power transmission paths of the power transmission device of FIG. 1(a)

17) The clutches C1 and C2 are, as illustrated in FIG. 1(b), coupled directly to the common shaft of the power transmission device, thus facilitating the ease of arranging the clutches C1 and C2 close to each other, which permits the size of the power transmission device to be reduced.

Figure 9A:
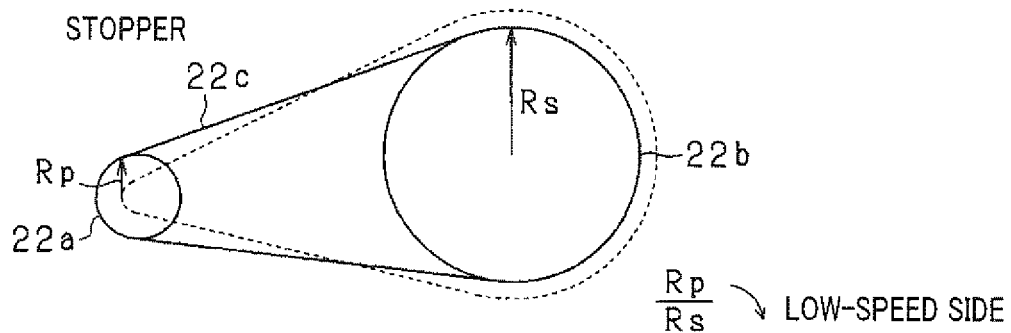
FIG. 9(a) is a side view of a CVT placed in a low-speed output mode when a stopper is installed on a primary pulley in the second embodiment.
Figure 9B:
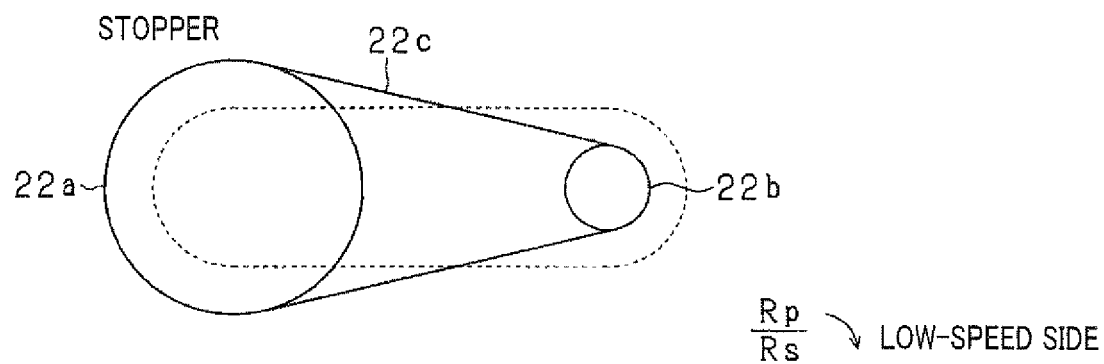
FIG. 9(b) is a side view of a CVT placed in a high-speed mode when a stopper is installed on a primary pulley in the second embodiment.
Figure 9C:
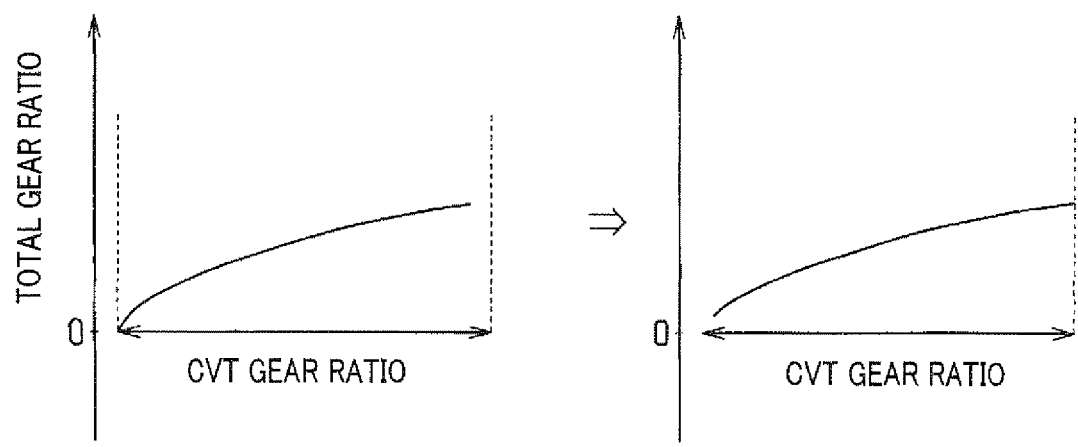
FIG. 9(c) is a view which represents graphs representing a change in relation between a total gear ratio and a gear ratio of a CVT due to aging of the CVT.

A power transmission device of the second embodiment will be described below with reference to FIGS. 9(a) to 9(c). The same reference numbers as employed in the first embodiment refer to the same or similar parts, and explanation thereof in detail will be omitted here.

The primary pulley 22a is equipped with a stopper working to limit the movement of the primary pulley 22a. The stopper is identical in structure with the one in FIGS. 8(a) to 8(d). An increase in wear of the belt 22c of the CVT 22 will cause the gear ratio of the CVT 22 to be shifted to the lower-speed gear ratio. The minimum value of the total gear ratio is, therefore, shifted to the high-speed side as the CVT 22 ages. This permits the minimum value of the total gear ratio to be set to zero (0) as a factory default value because the aging of the CVT 22 will not produce the creep torque which moves the vehicle undesirably in the backward direction when it is required to move the vehicle in the forward direction. The absolute value of the minimum value of the total gear ratio may also be initialized to a value slightly greater than zero (0).

This embodiment also offers an additional beneficial effect below.

18) The location where the stopper is to be installed on the CVT 22 is so selected as to increase the absolute value of the minimum value of the total gear ratio as the CVT 22 ages, thereby preventing the driven wheels 14 from being reversed by the creep torque when the CVT 22 has aged.

Figure 10A:
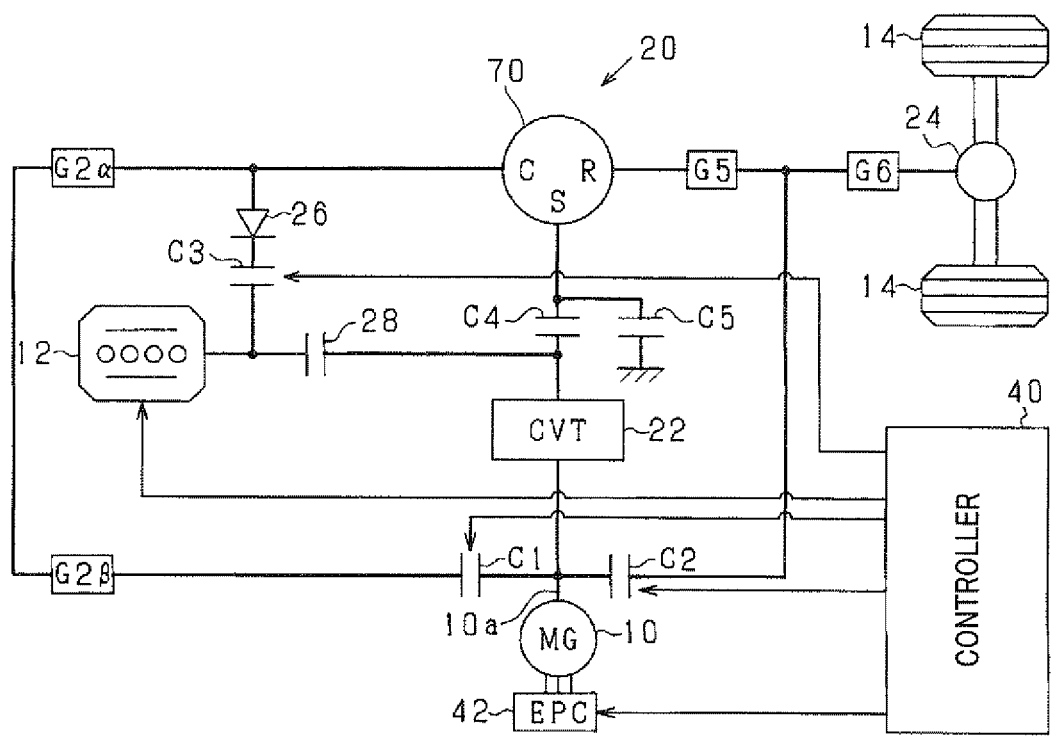
FIG. 10(a) is a block diagram which illustrates a power transmission device of the third embodiment which is installed in a hybrid system for a vehicle.
Figure 10B:
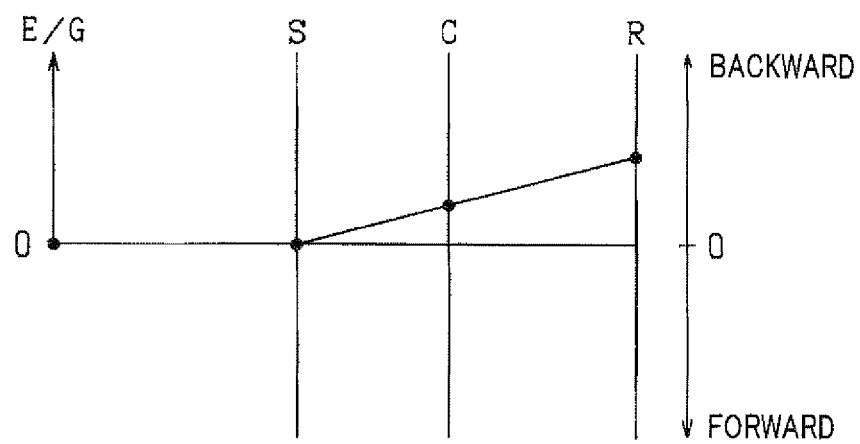
FIG. 10(b) is a nomographic chart which represents an operation of a power split device along with the speed of an internal combustion engine in the power transmission device of FIG. 10(a)

A hybrid vehicle equipped with a power transmission device of the third embodiment will be described below with reference to FIGS. 10(a) and 10(b). The same reference numbers as employed in the first embodiment refer to the same or similar parts, and explanation thereof in detail will be omitted here. FIG. 10(a) illustrates the structure of the hybrid system. FIG. 10(b) is a nomographic chart which represents the operation of the power split device 20 along with the speed of the internal combustion engine 12.

The power transmission device includes the clutch C4 disposed between the sun gear S and the CVT 22 and the clutch C5 disposed between the sun gear S and the body of the vehicle. Each of the clutches C4 and C5 works as an electronically controlled-hydraulic power breaker to block transmission of power or torque between an input and an output thereof. The controller 40 disengages the clutch C4 and engages the clutch C5 to fix or hold one (i.e., the sun gear S) of the two rotors (i.e., the sun gear S and the carrier C) of the power split device 20 which are coupled with the motor-generator 10 from rotating. This causes the inclination of the straight line on which the power split rotors (i.e., the ring gear R coupled with the driven wheels 14 and the sun gear S and the carrier C coupled with the motor-generator 10) are arrayed in speed in the nomographic chart, as illustrated in FIG. 10(b), to be reversed in sign, thereby permitting the vehicle to move in the backward direction.

This embodiment also offers the following beneficial effect in addition to the effects 1) and 3) to 17), as described above.

19) The power transmission device is operable to change the mode of mechanical connections of the power split rotors to reverse the sign of the total gear ratio, thereby reversing the driven wheels 14.

Figure 11A:
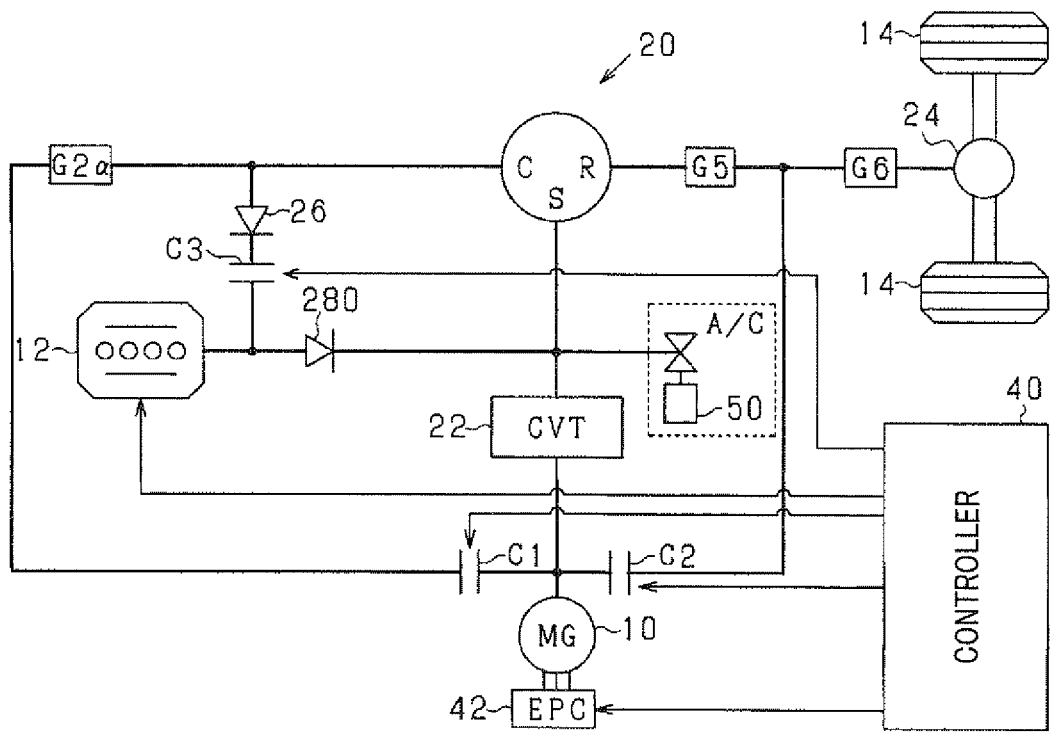
FIG. 11(a) is a block diagram which illustrates a power transmission device of the fourth embodiment which is installed in a hybrid system for a vehicle.
Figure 11B:
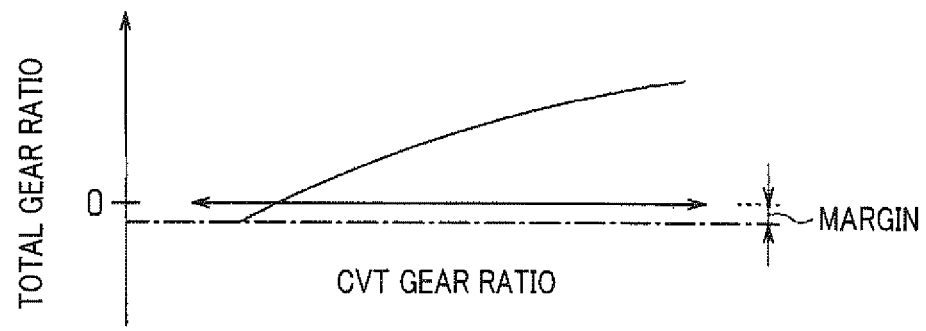
FIG. 11(b) is a graph which shows a relation between a total gear ratio and a gear ratio of a CVT in the fourth embodiment.

A hybrid vehicle equipped with a power transmission device of the fourth embodiment will be described below with reference to FIGS. 11(a) and 11(b). The same reference numbers as employed in the above embodiments refer to the same or similar parts, and explanation thereof in detail will be omitted here.

The vehicle is equipped with an air conditioner. The air conditioner has a compressor 50 coupled mechanically to the sun gear S of the power split device 20. The power transmission device is so designed that the minimum value of the total gear ratio of the power transmission line leading to the driven wheels 14 has, as illustrated in FIG. 11(b), a negative value smaller than zero (0). This ensures the stability in achieving the geared neutral regardless of the aging of the CVT 22 to transmit the power from the motor-generator 10 to the compressor 50 through the sun gear S when the driven wheels 14 are stopped.

This embodiment also offers the following beneficial effects in addition to the effects 1), 2), and 4) to 17), as described above.

20) The minimum value of the total gear ratio is set to a negative value, thereby permitting the geared neutral to be achieved steadily to make the power split rotor work as a power source for the compressor 50 when the driven wheels 14 are stopped.

21) The CVT 22 is disposed between the compressor 50 and the motor-generator 10, thereby permitting the displacement of the compressor 50 to be controlled variably through the CVT 22.

A hybrid vehicle equipped with a power transmission device of the fifth embodiment will be described below with reference to FIG. 12. The same reference numbers as employed in the above embodiments refer to the same or similar parts, and explanation thereof in detail will be omitted here.

The power split device 20 is equipped with a first planetary gear set 20a and a second planetary gear set 20b which work as a power split device to split power or torque among the motor-generator 10, the internal combustion engine 12, and driven wheels 14 of the vehicle. Each of the first and second planetary gear sets 22 and 24 is made up of three power split rotors: the sun gear S, the carrier C, and the ring gear R. The power split device 20, thus, uses a total of six power split rotors to split the power among the motor-generator 10, the internal combustion engine 12, and the driven wheels 14. The ring gear R of the first planetary gear set 20a and the carrier C of the second planetary gear set 20b are joined mechanically together. The rotating shaft 10a of the motor-generator 10 is coupled mechanically to the ring gear R of the second planetary gear set 20b. The driven wheels 14 are coupled mechanically to the ring gear R of the first planetary gear set 20a and the carrier C of the second planetary gear set 20b through the gear G6 and the differential gear 24.

The carrier C of the first planetary gear set 20a is to be coupled mechanically to the crankshaft (i.e., the rotating shaft 12a) of the engine 12 through the one-way bearing 26 and the clutch C3. The clutch 28 is disposed between the rotating shaft 12a of the engine 12 and a joint of the sun gear S and the first planetary gear set 20a and the sun gear S of the second planetary gear set 20b. The sun gears S of the first and second planetary gear sets 20a and 20b are jointed mechanically to the rotating shaft 10a of the motor-generator 10 through the CVT 22, the clutch C1, and the gear G3. The gear G3 is a counter gear which works to change a ratio of rotational speed of an input to that of an output thereof by a fixed factor and reverse the direction of rotation of the input.

The sun gears S of the first and second planetary gear sets 20a and 20b are also coupled mechanically to the ring gear R of the first planetary gear set 20a and the carrier C of the second planetary gear set 20b through the CVT 22, the clutch C2, and the gear G4.

The power transmission device functions to achieve the circulation of power in the first operation mode where the clutch C1 is in the engaged state, while the clutch C2 is in the disengaged state. Specifically, in the first operation mode, the power, as outputted from the sun gear S of the second planetary gear set 20b, is inputted to the ring gear R of the second planetary gear set 20b through the CVT 22, the clutch C1, and the gear G3. This enables a high degree of torque to be applied to the driven wheels 14 when the carrier C of the second planetary gear set 20b is rotating at an extremely low speed. The circulation of power, like in the above embodiment, is not used to reverse the sign of the speed of the driven wheels 14 (i.e., the direction of rotation of the driven wheels 14) without reversing the direction of rotation of the motor-generator 10. The lower limit value of the total gear ratio is set slightly greater than zero (0). This permits a required degree of durability of the CVT 22 to be decreased.

A hybrid vehicle equipped with a power transmission device of the sixth embodiment will be described below with reference to FIG. 13. The same reference numbers as employed in the above embodiments refer to the same or similar parts, and explanation thereof in detail will be omitted here.

The power split device 20 is, like in the fifth embodiment, equipped with the first planetary gear set 20a and the second planetary gear set 20b which work as a power split device to split power or torque among the motor-generator 10, the internal combustion engine 12, and driven wheels 14 of the vehicle.

The motor-generator 10 is coupled mechanically to the sun gear S of the first planetary gear set 20a and also to the carrier C of the second planetary gear set 20b through the gear G3. The motor-generator 10 is also coupled mechanically to the sun gear S of the second planetary gear set 20b through the CVT 22. The gear G3 works to convert the speed of an input thereof at a fixed gear ratio into that of an output thereof and is implemented by a forward gear in which the speeds of the input and the output are identical in sign with each other, in other words, the rotational directions of the input and the output are identical with each other.

The driven wheels 14 are coupled mechanically to the ring gear R of the first planetary gear set 20a through the differential gear 24 and the gear G7. The gear G7 is implemented by a counter gear which works to change a ratio of rotational speed of an input to that of an output thereof by a fixed factor and reverse the direction of rotation of the input.

The carrier C of the first planetary gear set 20a and the ring gear R of the second planetary gear set 20b are joined mechanically together through the gear G5 and a clutch C1. The carrier C of the first planetary gear set 20a and the sun gear S of the second planetary gear set 20b are joined mechanically together through the gear G4 and the clutch C2. Each of the gears G4 and G5 is implemented by a counter gear which works to change a ratio of rotational speed of an input to that of an output thereof by a fixed factor and reverse the direction of rotation of the input.

The crankshaft (i.e., the rotating shaft 12a) of the engine 12 is coupled mechanically to the ring gear R of the second planetary gear set 20b through the one-way bearing 26 and the clutch C3. The rotating shaft 12a is also joined mechanically to the carrier C of the second planetary gear set 20b through a clutch 28.

The power transmission device of this embodiment is operable to achieve the circulation of power in the first operation mode where the clutch C1 is in the engaged state, while the clutch C2 is in the disengaged state. Specifically, in the first operation mode, the power, as outputted from the carrier C of the first planetary gear set 20a, is inputted to the sun gear S of the first planetary gear set 20a through the clutch C1, the ring gear R of the second planetary gear set 20b, the sun gear S of the second planetary gear set 20b, and the CVT 22. This enables a high degree of torque to be applied to the driven wheels 14 when the carrier C of the first planetary gear set 20a (i.e., the driven wheels 14) is rotating at an extremely low speed. The circulation of power, like in the above embodiment, is not used to reverse the sign of the speed of the driven wheels 14 (i.e., the direction of rotation of the driven wheels 14 without reversing the direction of rotation of the motor-generator 10. The reversal of rotation of the driven wheels 14 is achieved in the first operation mode by reversing the motor-generator 10. The lower limit value of the total gear ratio is set slightly greater than zero (0). This permits a required degree of durability of the CVT 22 to be decreased.

Figure 14:
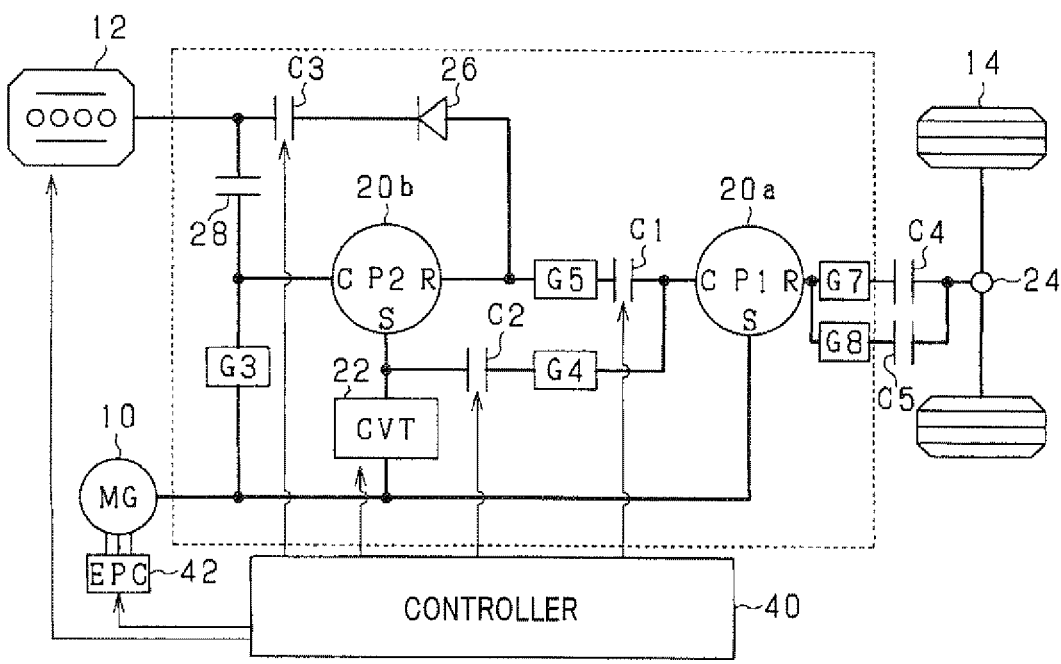
FIG. 14 is a block diagram which illustrates a power transmission device of the seventh embodiment which is installed in a hybrid system for a vehicle.

A hybrid vehicle equipped with a power transmission device of the seventh embodiment will be described below with reference to FIG. 14. The same reference numbers as employed in the sixth embodiment refer to the same or similar parts, and explanation thereof in detail will be omitted here.

The clutch C4 is disposed between the differential gear 24 and the gear G7. The gear G8 and the clutch C5 are disposed in parallel to the gear G7 and the clutch C4 in connection therewith. The gear G8 works to convert the speed of an input thereof at a fixed gear ratio into that of an output thereof and is implemented by a forward gear in which the speeds of the input and the output are identical in sign with each other. Each of the clutches C4 and C5 is implemented by an electronically-controlled breaker working to block the transmission of power between an input and an output thereof.

The reversal of rotation of the driven wheels 14 is achieved without changing the direction of rotation of the motor-generator 10 between when the clutch C4 is in the engaged state, and the clutch C5 is in the disengaged state and when the clutch C4 is in the disengaged state, and the clutch C5 is in the engaged state.

Modifications

The power transmission devices of the above embodiments may be modified as discussed below.

Bidirectional Control for Motor-Generator

The bidirectional control (i.e., bidirectional switching) may be achieved in the second operation mode as well as the first operation mode to switch the rotation of the motor-generator 10 between the opposite directions (i.e., the normal and reverse directions).

Reversing Mechanism

Figure 15A:
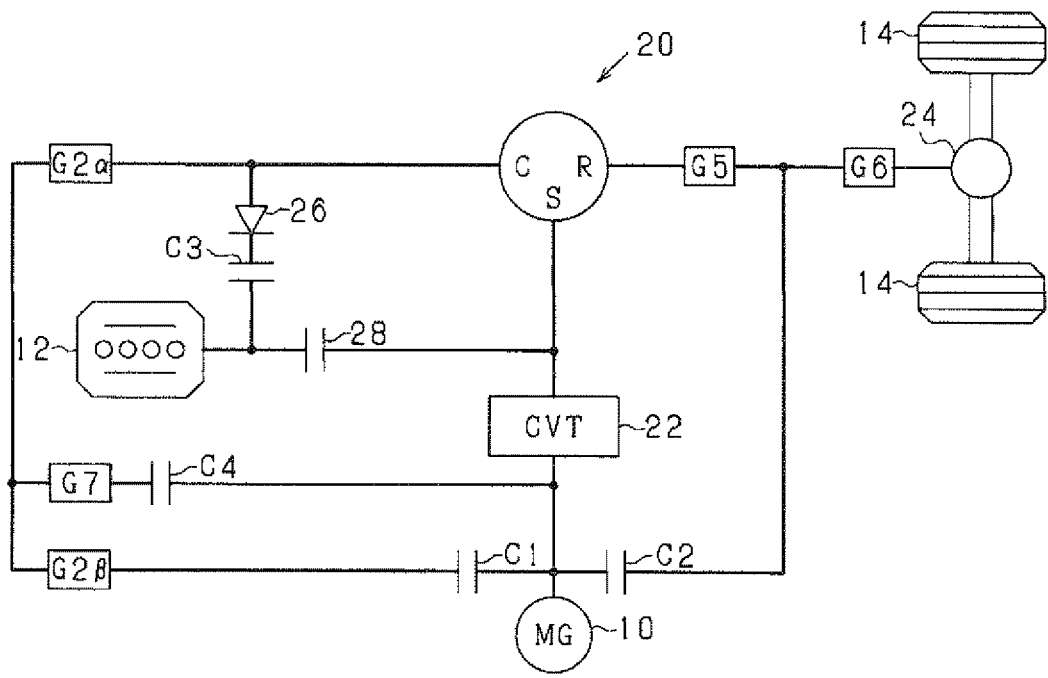
FIG. 15(a) is a block diagram which illustrates a modification of a power transmission device.
Figure 15B:
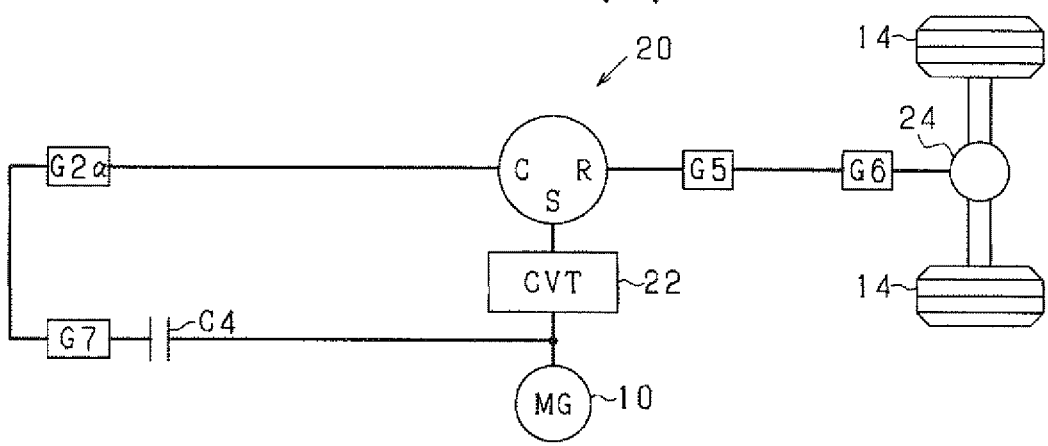
FIG. 15(b) is a view which shows a power transmission path in a reverse running mode.
Figure 15C:
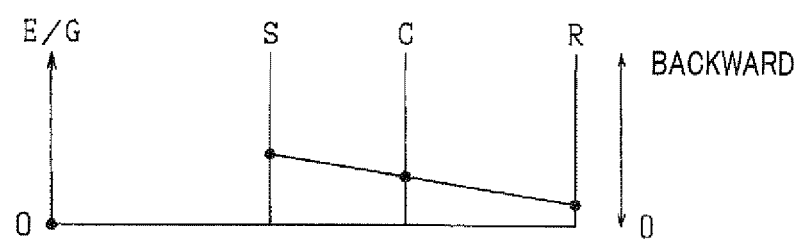
FIG. 15(c) is a nomographic chart which represents an operation of a power split device along with the speed of an internal combustion engine in the reverse running mode of FIG. 15(b)

The reversing mechanism working to reverse the rotation of the driven wheels 14 (i.e., the sign of speed of the driven wheels 14) in the above embodiments may alternatively be implemented by engineering the power transmission device so that the two power split rotors of the power split device 20 coupled mechanically to the motor-generator 10 and the power split rotor coupled mechanically to the driven wheels 14 are linked to have rotational speeds arrayed on a straight line in the nomographic chart and installing a speed variator between the above two power split rotors. The reversal of the rotation of the driven wheels 14 is achieved by changing the gear ratio of the speed variator to change the inclination of the straight line. FIG. 15(a) illustrates an example of such a power transmission device which is a modified form of the one in the first embodiment. A combination of the clutch C4 and the gear G7 is disposed parallel to the clutch C1. The gear G7 is so engineered that the speed of an output thereof leading to the carrier C of the power split device 20 is greater than that of an input thereof leading to the motor-generator 10. Particularly, in the case where the gear G7 is similar in structure to the gear G2α, the degree with which the speed of the output of the gear G7 coupled to the carrier C is greater than that of the input thereof coupled to the motor-generator 10 is set greater than that with which the speed of the output of the gear G2α leading to the carrier C is greater than that of the input thereof leading to the motor-generator 10. A power transmission path, as illustrated in FIG. 15(b), is established by disengaging the clutches C1 and C2, while engaging the clutch C4, which enables, as can be seen from FIG. 15(c), the power transmission device to rotate the driven wheels 14 in the backward direction without needs for reversing the motor-generator 10.

Figure 16A:
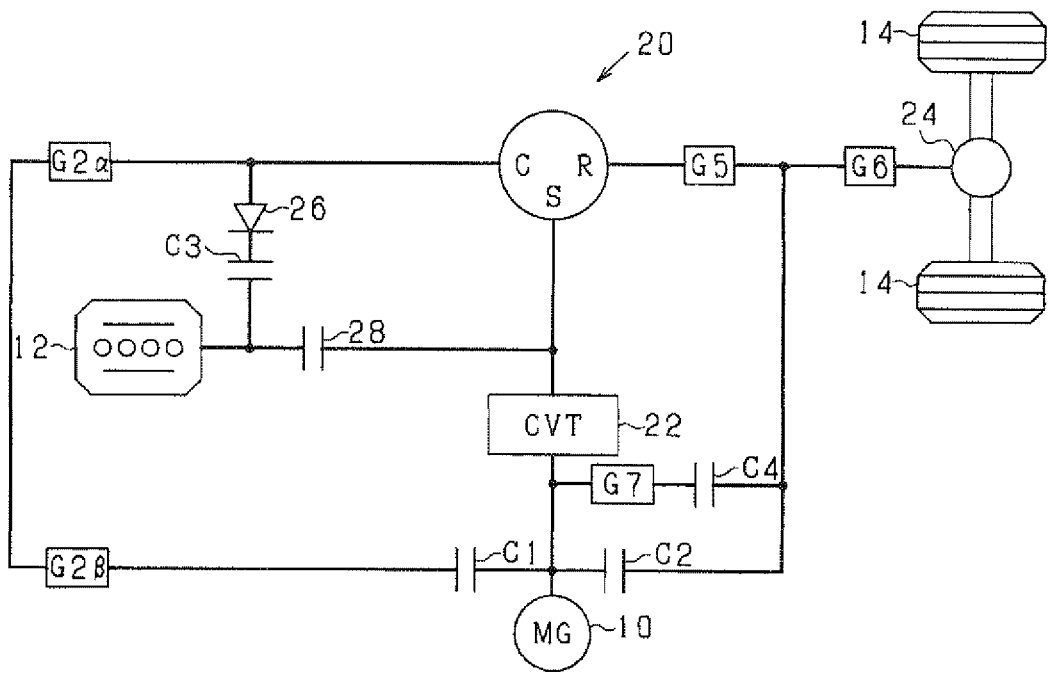
FIG. 16(a) is a block diagram which illustrates a modification of a power transmission device.
Figure 16B:
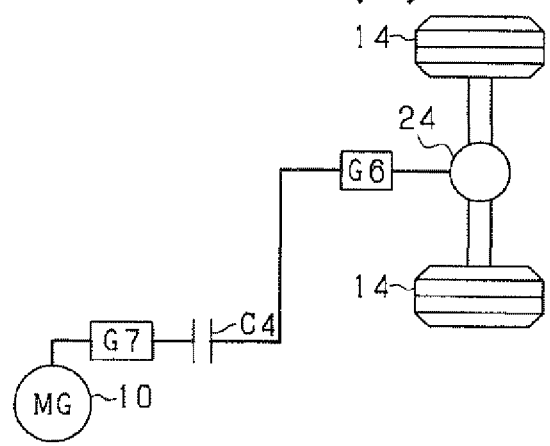
FIG. 16(b) is a view which shows a power transmission path in a reverse running mode.
Figure 16C:
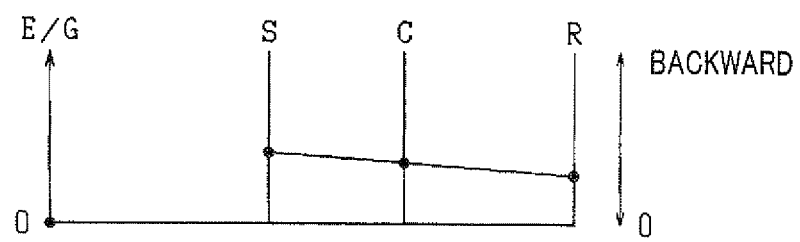
FIG. 16(c) is a nomographic chart which represents an operation of a power split device along with the speed of an internal combustion engine in the reverse running mode of FIG. 16(b)

The reversing mechanism working to reverse the rotation of the driven wheels 14 may alternatively be established in the structure of the power transmission device of FIG. 16(a). The gear G7 and the clutch C4 are disposed in parallel to the clutch C2. The gear G7 is so engineered as to convert the speed of the input thereof at a fixed gear ratio into that of the output thereof and also to reverse the sign of speed of rotation of the input. A power transmission path, as illustrated in FIG. 16(b), is established by disengaging the clutches C1 and C2, while engaging the clutch C4, which enables, as can be seen from FIG. 16(c), the power transmission device to rotate the driven wheels 14 in the backward direction without needs for reversing the motor-generator 10. The backward movement of the vehicle using the power of the engine 12 may also be achieved by engaging the clutch 28.

Figure 17A:
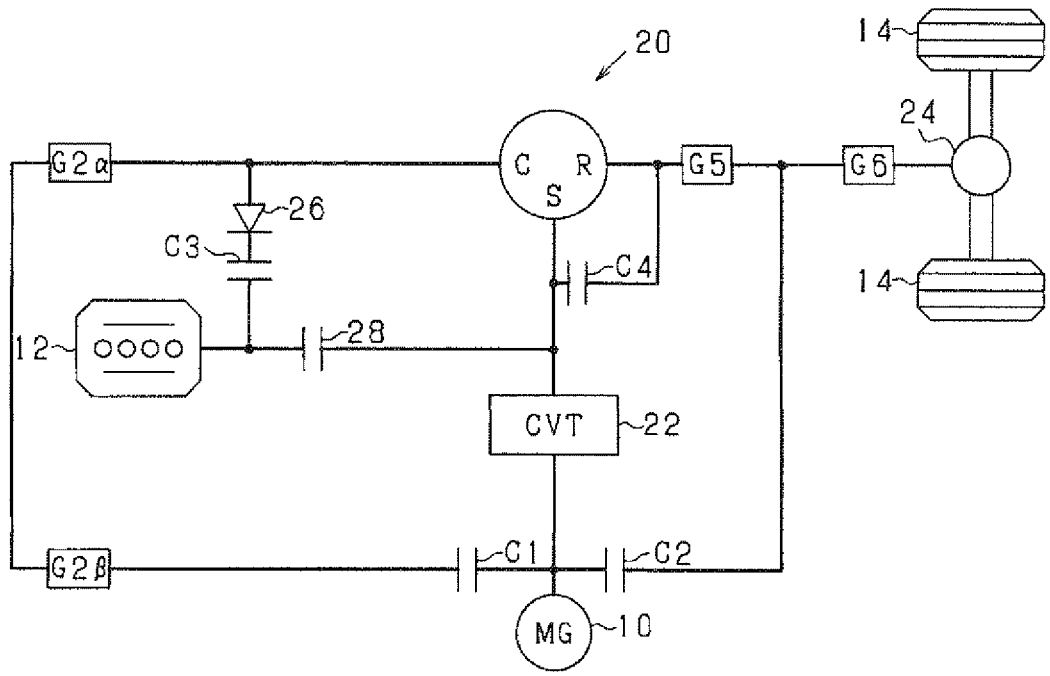
FIG. 17(a) is a block diagram which illustrates a modification of a power transmission device.
Figure 17B:
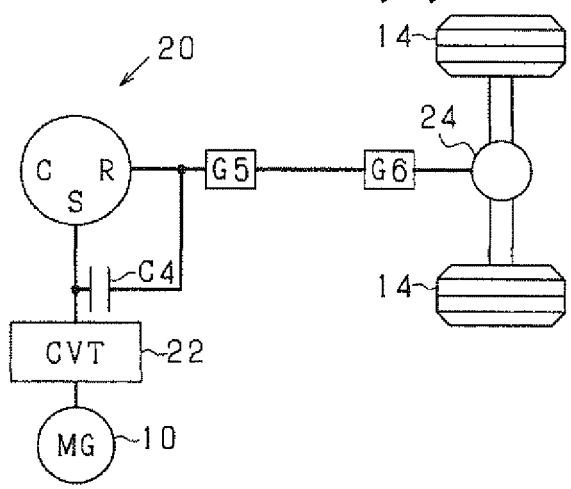
FIG. 17(b) is a view which shows a power transmission path in a reverse running mode.
Figure 17C:
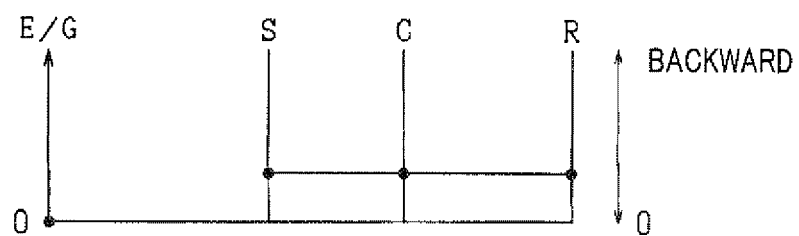
FIG. 17(c) is a nomographic chart which represents an operation of a power split device along with the speed of an internal combustion engine in the reverse running mode of FIG. 17(b)

The reversing mechanism working to reverse the rotation of the driven wheels 14 in the above embodiments may alternatively be implemented by engineering the power transmission device so that the three power split rotors of the power split device 20 are linked to have rotational speeds arrayed on a straight line in the nomographic chart, and the speed of the power split rotor(s) coupled mechanically to the driven wheels 14 is opposite in sign to that of at least one of the other split rotors and providing a mechanical means to change the linkages to the power split rotors so that the speeds of the power split rotors will be equal to each other. FIG. 17(a) illustrates as example of such a power transmission device which is a modified form of the one in the first embodiment. The clutch C4 is disposed between the sun gear S and the ring gear R of the power split device 20 to selectively establish or block the connection therebetween. A power transmission path, as illustrated in FIG. 17(b), is established by disengaging the clutches C1 and C2, while engaging the clutch C4, which enables, as can be seen from FIG. 17(c), the power transmission device to rotate the driven wheels 14 in the backward direction without needs for reversing the motor-generator 10.

Figure 18A:
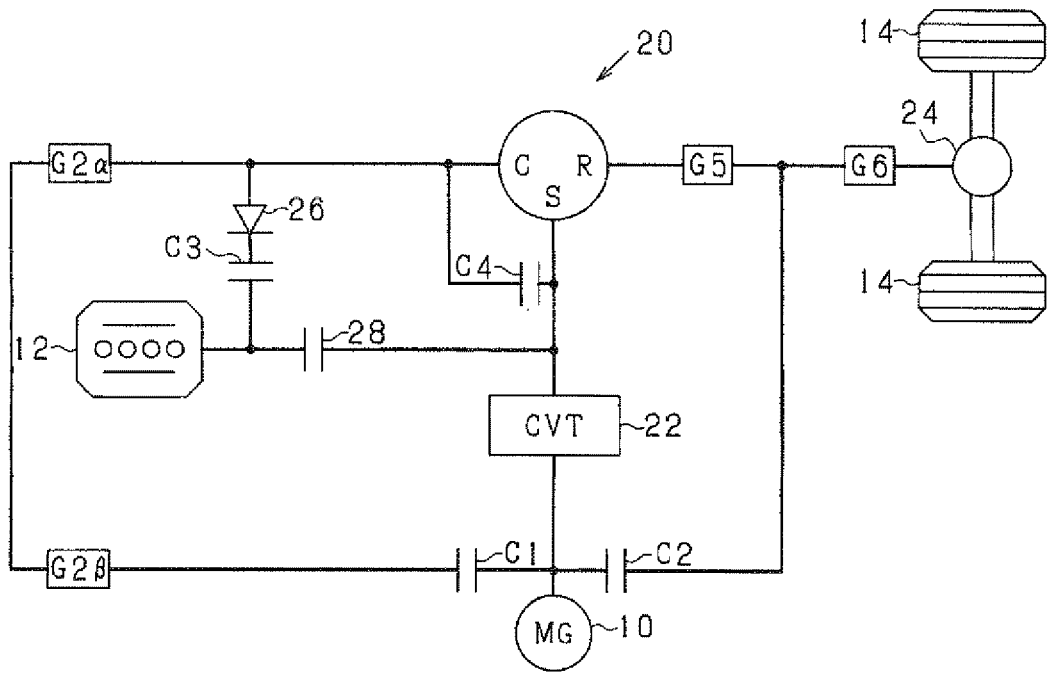
FIG. 18(a) is a block diagram which illustrates a modification of a power transmission device which is to be operate in a reverse running mode.
Figure 18B:
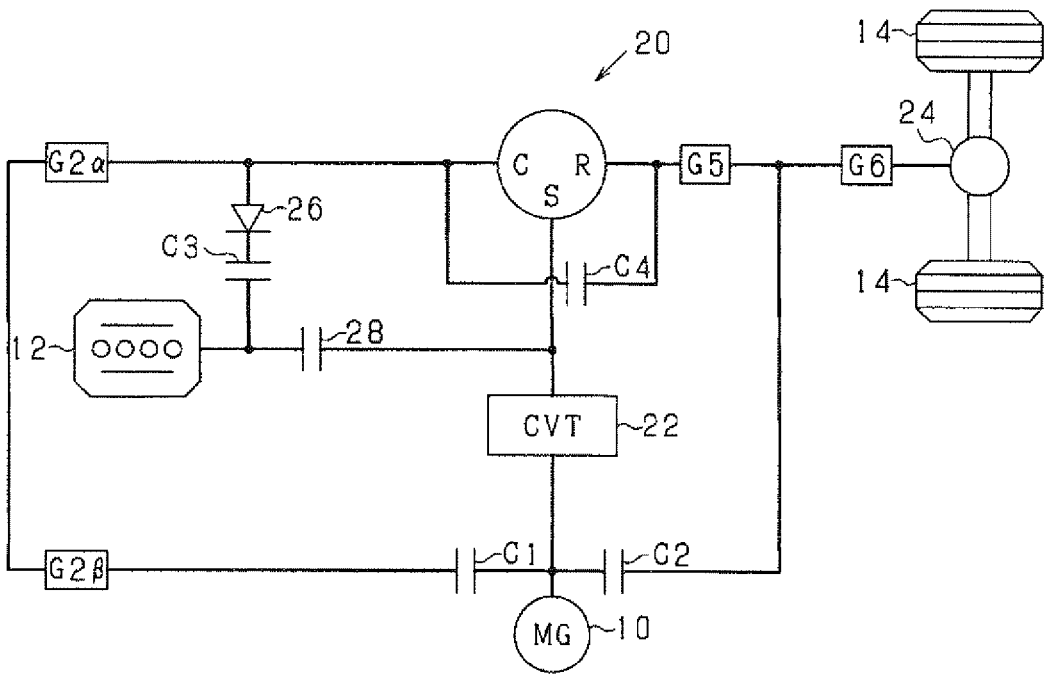
FIG. 18(b) is a block diagram which illustrates a modification of a power transmission device which is to be operate in a reverse running mode.

Instead of the arrangement of the clutch C4 between the sun gear S and the ring gear R, the clutch C4 may be disposed, as illustrated in FIG. 18(a), between the carrier C and the sun gear S or, as illustrated in FIG. 18(b), between the carrier C and the ring gear R.

Further, the reversing mechanism of the seventh embodiment may be employed in the third embodiment.

Permissible Range of Total Gear Ratio

A permissible range in which the minimum value of the total gear ratio is kept positive needs not be a range in which the same degree of creep torque as in typical automatic transmission vehicles will be produced. For instance, it is physically impossible to set the minimum value of the total gear ratio to zero (0) depending upon selection of the range of the total gear ratio. In such a case, if the minimum value of the total gear ratio is selected to have a positive value, it prevents the creep torque from reversing the rotation of the driven wheels 14.

The minimum value of the total gear ratio needs not be set to be negative in the case where the torque of the power split rotor is used, like in the fourth embodiment, as a power source for an accessory or auxiliary device installed in the vehicle. For instance, when the minimum value of the total gear ratio is set to be negative, it enables the geared neutral to be established. This is useful for designing the vehicle not to creep in a controlled operation mode. In the case where the geared neutral is not essential, a range in which the total gear ratio is permitted to have a negative value may be decreased by using only a range in which the total gear ratio has a value greater than or equal to zero (0) in the power transmission device. This permits the required degree of durability of the CVT 22 to be decreased.

The minimum value of the total gear ratio in the power transmission device of the fourth embodiment may be set to zero (0). The use of a stopper on the secondary pulley 22b of the CVT 22, like in the first embodiment, will cause the minimum value of the total gear ratio to decrease with the aging of the CVT 22, thereby ensuring the stability in establishing the geared neutral.

Power Split Rotor Coupled Mechanically to Accessory

Figure 19:
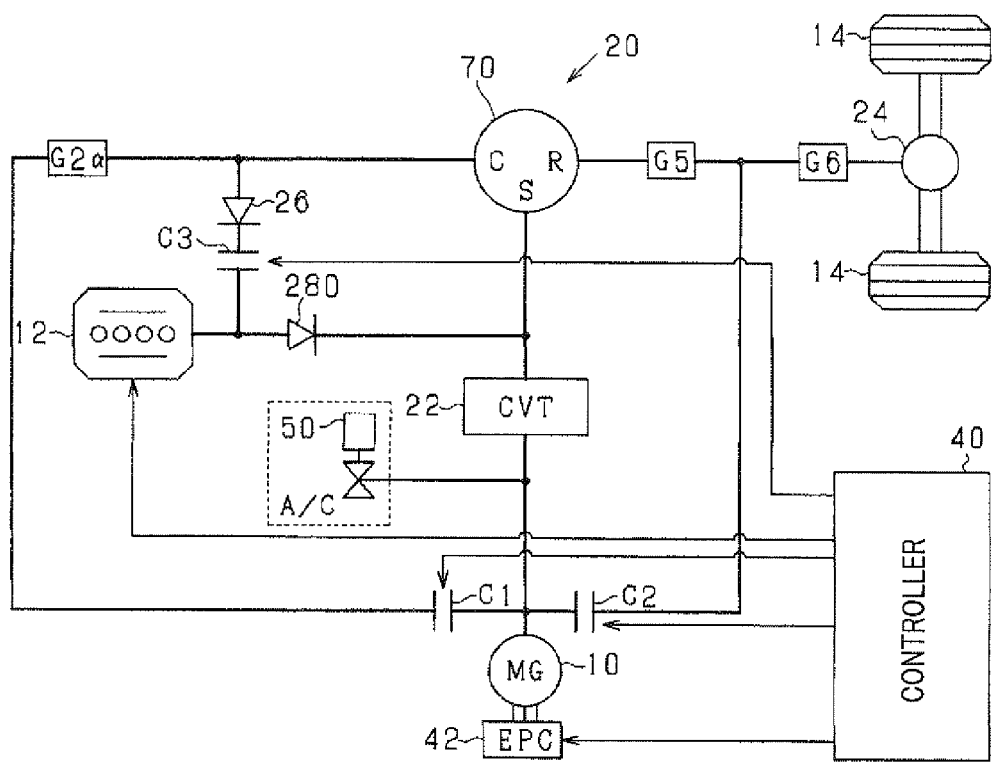
FIG. 19 is a block diagram which illustrates a modification of the power transmission device of the fourth embodiment.

The power transmission device may be, as illustrated in FIG. 19, designed to have the compressor 50 connected between the motor-generator 10 and the CVT 22. This arrangement is superior to the one in FIG. 11 in terms of the improvement of efficiency in transmitting the power from the motor-generator 10 to the compressor 50. Usually, the transmission of the power through the CVT 22 results in a loss of the power. The structure of FIG. 19 transmits the power from the motor-generator 10 directly to the compressor 50 without passing through the CVT 22, thus minimizing the loss of the power transmitted to the compressor 50.

Accessory Power by Torque of Power Split Rotor

A brake pump which applies a braking force to the driven wheels 14, a water pump which circulates water to cool the engine 12, or a cooling fan which dissipates heat from the water may also be powered by the power split device 20 instead of or in addition to the compressor 50.

First Power Transmission Control Mechanism

The clutch C3 and the one-way bearing 26, as described above, work as a first power transmission control mechanism to selectively block or establish transmission of torque between the rotating shaft 12a of the engine 12 and the engine starting rotor of the power split device 20 (i.e., the carrier q when it is required to start the engine 12. The first power transmission control mechanism may, however, be designed to include only the clutch C3. In this case, unwanted transmission of torque which will be increased suddenly upon start of combustion of fuel in the engine 12 to the power split device 20 is avoided by disengaging the clutch C3 prior to the start of combustion of fuel in the engine 12 after an initial rotation is given to the rotating shaft 12a of the engine 12. The first power transmission control mechanism may also be made by only the one-way bearing 26.

The clutch C3 may alternatively be joined to the input of the one-way bearing 26.

Instead of the one-way bearing 26 which establishes the transmission of torque to the engine 12 under the condition that the speed of the input of the one-way bearing 26 is not lower than that of the output of the one-way bearing 26 (i.e., the rotating shaft 12a of the engine 12), a one-way clutch or another similar type one-way power transmission control mechanism working to have the rotating shaft 12a follow the rotation of the engine starting rotor with or without any slip may be used.

The clutch C3 which selectively blocks the transmission of torque from the power split device 20 to the rotating shaft 12a of the engine 12 to start the engine 12 is of a normally open type, but may be of a normally closed type.

Second Power Transmission Control Mechanism

Figure 20A:
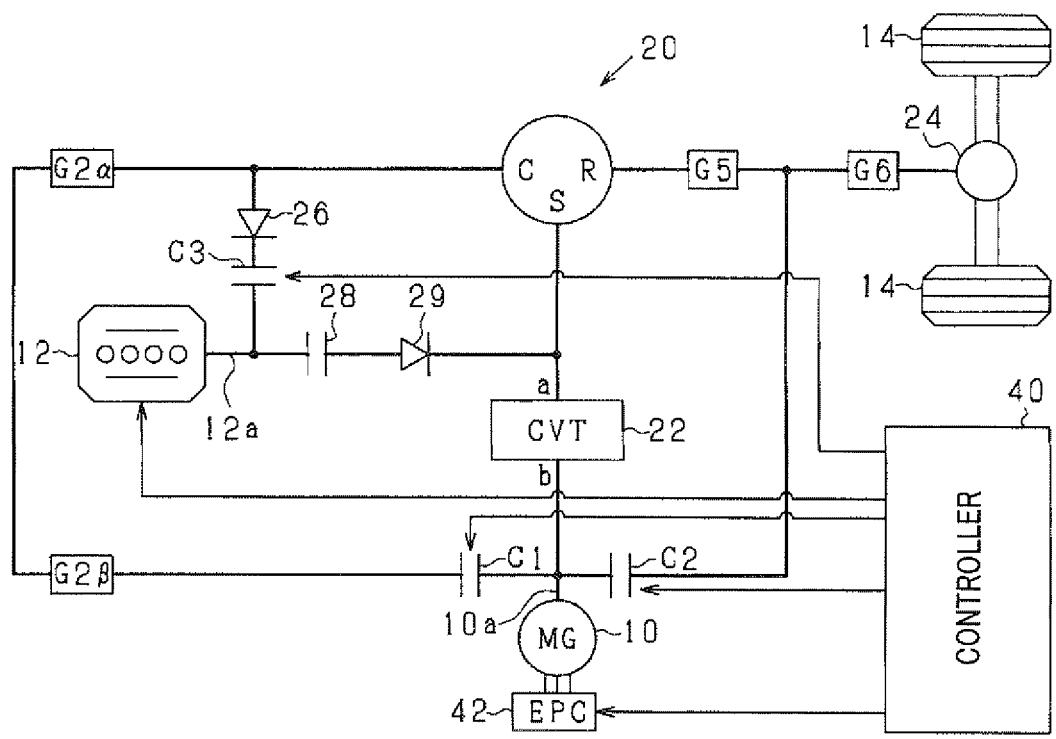
FIG. 20(a) is a block diagram which illustrates a modification of the power transmission device of the first embodiment.
Figure 20B:
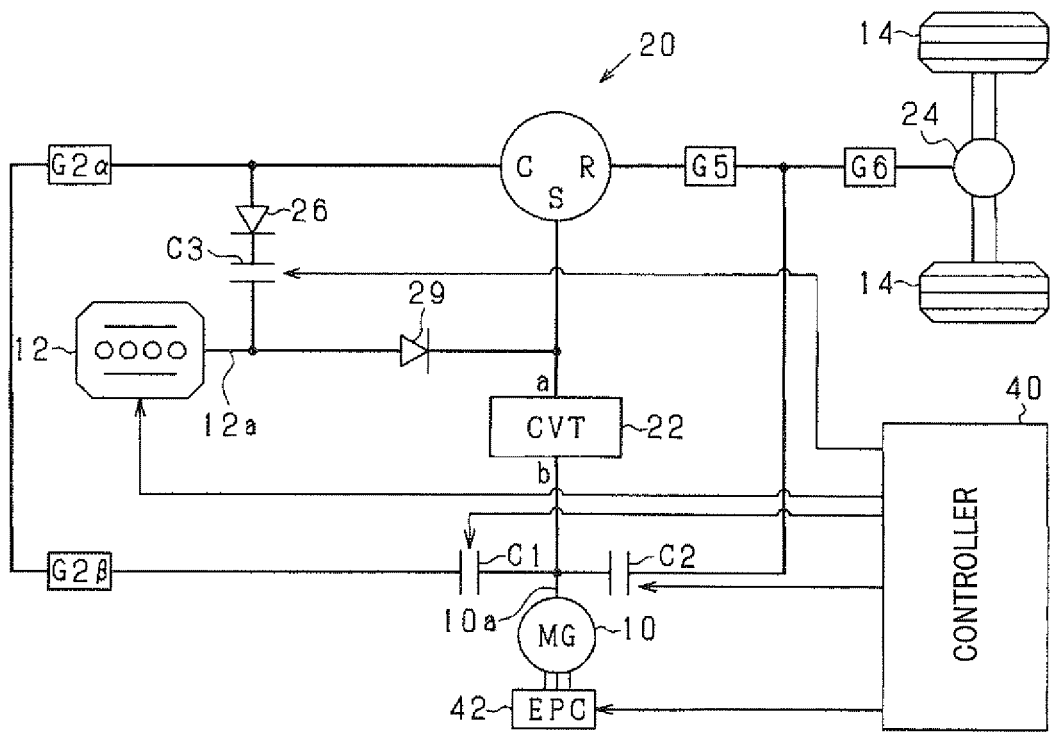
FIG. 20(b) is a block diagram which illustrates another modification of the power transmission device of the first embodiment.

The clutch 28 works as a second power transmission control mechanism to control the transmission of power between the engine 12 and a power transmission rotor of the power split device 20 to transmit torque from the engine 12 to the driven wheels 14 when it is required to run the driven wheels 14. The second power transmission control mechanism may alternatively be implemented by a one-way transmission mechanism such as a one-way clutch or a one-way bearing. FIG. 20(a) illustrates a modification of the power transmission device of the first embodiment which is equipped with a one-way bearing 29 disposed between the clutch 28 and a joint of the sun gear S and the CVT 22. FIG. 20(b) illustrates another modification of the power transmission device of the first embodiment which is equipped with the one-way bearing 29 instead of the clutch 28. This structure allows the engine 12 to be reversed following rotation of the driven wheels 14 when being run in the backward direction. It is, therefore, desirable to design the engine 12 so that lubricating oil will lubricate moving parts thereof well during the reverse rotation of the engine 12. An decrease in load on the engine 12 may be achieved by installing solenoid-operated valves as intake and exhaust valves of the engine 12 and opening them when the driven wheels 14 are reversed.

Power Split Mechanism

The power split mechanism is implemented by the power split device 20 having the structure, as described above, but may alternatively be designed to have a different layout of the sun gear S, the carrier C, and the ring gear R. Substantially the same effects as those in the above embodiments may be obtained by altering the structure or locations of the gears disposed among the planetary gear set 70, the motor-generator 10, the engine 12, and the driven wheels 14.

Power Split Rotor

The power split rotors (i.e., the sun gear S, the carrier C, and the ring gear R) are so linked that when the speeds of rotation of the sun gear S and the ring gear R are opposite in sign to each other, the speed of the carrier C may be zero (0), but may alternatively be designed that when the signs of speeds of the sun gear S and the ring gear R are identical with each other, the speed of the carrier C may be zero (0). This is realized by, for example, a double pinion planetary gear set such as one, as disclosed in Japanese Patent First Publication No. 2001-108073.

Instead of the planetary gear set 70, a differential gear or gear set may be employed.

Type of Speed Variator

The CVT 22 needs not be of a belt-type. For example, a traction drive type or hydraulic continuously variable transmission may be used. Alternatively, a gear transmission may be used instead of the CVT 22.

Other Modifications

The power transmission device may be designed to allow the omission of transmission of torque to the driven wheels 14 upon switching between the first and second operation modes. This also offers the same advantage 1), as described in the first embodiment. Specifically, the controller 40 gradually increases the degree of engagement of one of the clutches C1 and C2 which is being switched from the disengaged state to the engaged state to establish the partial engagement of the one of the clutches C1 and C2. However, when a fail-safe mode is entered in which it is required to switch between the first and second operation modes quickly regardless of mechanical stock arising therefrom, the controller 40 may switch between the first and second operation modes forcibly at a gear ratio of the CVT 22 which develops values of the total gear ratio which are different between the first and second operation modes without creating the partial engagement of the one of the clutches C1 and C2.

The power transmission device needs not be designed to operate in the second operation mode.

Automotive vehicles in which the power transmission device is to be installed may be engine-powered vehicles equipped with only the engine 12 or electric vehicles equipped with only the motor-generator 10 as well as the hybrid vehicles, as described above, equipped with both the engine 12 and the motor-generator 10. The automotive vehicles may also be equipped with a plurality of electric rotating machines for use in running the driven wheels 14. The electric rotating machines may be all or partly implemented by motor-generators. For example, some of the electric rotating machines may be used only as electric motors, while some of the electric rotating machines may be used only as electric generators which also work to charge a high-voltage battery installed in the vehicle to supply electric power to the electric motors.

The electric rotating machines may be implemented by a three-phase alternating electric motor, a brushed DC motor, or an induction motor.

Total Gear Ratio

Figure 21:
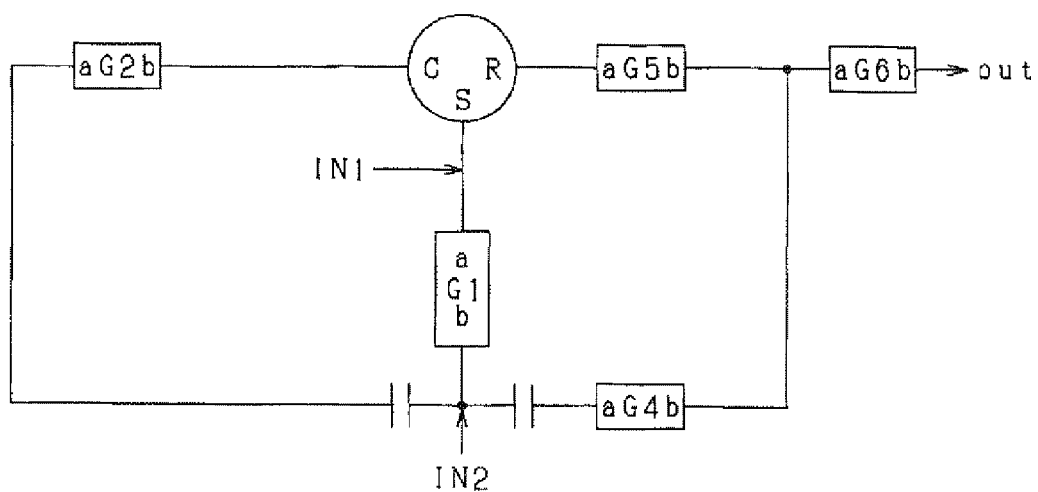
FIG. 21 is a view which shows an equivalent structure of a power transmission device of FIG. 1(a) for explaining how to determine a total gear ratio.

The total gear ratio in the power transmission device of the first embodiment may be determined using an equivalent structure, as illustrated in FIG. 21. The illustrated structure has gears G1, G2, and G4. The gear G1 corresponds to the CVT 22. The gear G2 serves as a combination of the gears G2α and G2β of the first embodiment between the clutch C1 and the carrier C. In the following discussion, a total gear ratio of the gears G2α and G2β is given by a gear ratio r2 of the gear G2. A gear ratio r4 of the gear G4 is one (1). The gear ratio ri (i=1 to 6) is defined as a ratio of speed b to speed a. Note that each of "a" and "b" in each block of FIG. 21 indicates one of an input and an output of each gear.

The number Zs of teeth of the sun gear S/the number Zr of teeth of the ring gear R of the power split device 20 is defined as a gear ratio ρ (i.e., Zs/Zr). The torques of the ring gear R, the sun gear S, and the carrier C are defined as Tr, Ts, and Tc, respectively. The rotational speeds of the ring gear R, the sun gear S, and the carrier C are defined as wR, wS, and wC, respectively. The following equations are met.

$$Tr = -Tc/(1+\rho) \quad (c1)$$

$$Ts = -\rho Tc/(1+\rho) \quad (c2)$$

$$\rho wS - (1+\rho)wC + wR = 0 \quad (c3)$$

Generation of High Torque in First Operation Mode

"IN2" in FIG. 21 represents the motor-generator 10 when used as a power source for the driven wheels 14. If the torque, as outputted from the motor-generator 10, is defined as Tm, the following equation is given from the relations, as illustrated in FIG. 2(c), according to the law of conservation of energy. Note that Eq. (c4) is idealized by ignoring the mass of the gear G2.

$$wC(Tm + r1 Tc) = -wSTs \quad (c4)$$

By eliminating torques Ts and Tc from Eq. (c4) using Eqs. (c1) and (c2), we obtain $$Tr = 1/\{r2(1+\rho) - \rho(wS/wC)\} \quad (c5)$$

Eq. (c5) shows that the torque Tr of the ring gear R, in other words, the torque to be transmitted to the driven wheels 14 is increased greatly by approximating the ratio wS/wC by $r2(1+\rho)/\rho$.

Total Gear Ratio in First Operation Mode

1 When Engine is Used as Power Source

In the first operation mode, the speed wS of the sun gear S and the speed wC of the carrier C have the following relation.

$$wC = r1 \cdot r2 \cdot wS \quad (c6)$$

The speed wG6b of an output of the gear G6 is given by Eq. (7) below.

$$wG6b = r6 \cdot r5 \cdot wR \quad (c7)$$

By substituting Eqs. (c6) and (c7) into Eq. (c3), we obtain $$wG6b = r6 \cdot r5 \cdot \{r1 \cdot r2(1+\rho) - \rho\}wS \quad (c8)$$

Therefore, the total gear ratio is given by Eq. (c9) below.

$$\text{Total gear ratio} = r6 \cdot r5 \cdot \{r1 \cdot r2(1+\rho) - \rho\} \quad (c9)$$

2 When Motor-Generator is Used as Power Source

The output of the gear G1 will be the input of the power transmission device. The following equation is, thus, given by dividing "wS" on the right side of Eq. (c8) by the gear ratio r1.

$$\text{Total gear ratio} = r6 - r5 \cdot \{r2 \cdot (1+\rho) - \rho/r1\} \quad (c10)$$

Total Gear Ratio in Second Operation Mode

When the engine 12 is used as the power source in the second operation mode, the total gear ratio is given by Eq. (c/1) below in a power transmission path extending through the gears G1, G4, and G6.

$$\text{Total gear ratio} = r1 \cdot r4 \cdot r6 \quad (c11)$$

Mode Switching Condition without Omission of Transmission of Torque

No omission of transmission of torque is achieved under condition where the speed wG1b of the gear G1 is equal to both the speed wG2a of the gear G2 and the speed wG4a of the gear G4. This condition is expressed by $$wC/r2 = wS \cdot r1 = wR \cdot r5/r4 \quad (c12)$$

Expressing the speeds wS and wR of the sun gear S and the ring gear R by the speed wC of the carrier C in Eq. (c12), and substituting it into Eq. (c3), we obtain $$r1 = \rho r5/\{r2 r5 \cdot (1+\rho) - r4\} \quad (c13)$$

The switching between the first and second operation modes with no omission of transmission of torque to the driven wheels 14 is, therefore, achieved by selecting the gear ratio r1 of the CVT 22 (i.e., the gear G1 in FIG. 21) to have the value in the right side of Eq. (c13).

CVT Reversing Operation

The CVT reversing operation is achieved under condition that the product of values derived by differentiating a function in which the total gear ratio is expressed by a dependent variable, and the gear ratio r1 is expressed by an independent variable with respect to the gear ratio r1 in the first operation mode and in the second operation mode is negative.

Using Eqs. (c9) and (c11), the above condition is given by $$\{r6 \cdot r5 \cdot r2 \cdot (1+\rho)\} \cdot \{r4 \cdot r6\} < 0$$

Rewriting the above relation, we obtain $$r5 \cdot r4 \cdot r2 < 0 \quad (c14)$$

Since, in the structure of the first embodiment, the gear G5, G2α, and G2β are counter gears, and the gear G4 is omitted, r2>0, r5<0, and r4=1. These relations meet Eq. (c14).

Relation Between Amount of Change in Total Gear Ratio and Durability of CVT

We have evaluated such a relation in the structure of the power transmission device designed to establish the geared neutral in terms of the torque which will be exerted on the CVT 22 when the power transmission device is in the geared neutral state. This is because when the output of the power source is kept constant, the torque applied to the driven wheels 14 (i.e., the torque acting on the CVT 22) is thought of as being maximized when the power transmission device is in the geared neutral state in terms of the law of conservation of energy.

If the torque applied to the driven wheels 14 is defined by TOUT, torque T(G1a) acting on the input of the gear G1 and torque T(G1b) acting on the output of the gear G1 are expressed by $$T(G1a) = Ts = \rho Tr = \rho r5 r6 TOUT \quad (c15)$$

$$T(G1b) = T(G1a)/r1 = \rho r5 r6 TOUT/r1 \quad (c16)$$

The permissible range, that is, an amount by which the total gear ratio is to be changed to be changed will be, as can be seen from Eq. (c10), proportional to a value of ρr5r6. The torques T(G1a) and T(G1b) are also proportional to the value of ρr5r6. It is, thus, found that the greater the amount by which the total gear ratio is to be changed, the greater the torque exerted on the CVT 22.

The relation between the total gear ratio and the degree of durability of the CVT 22 may be evaluated based on the torque exerted on the CVT 22 in the manner, as described above. This is true for the structure in the seventh embodiment.

Figure 22A:
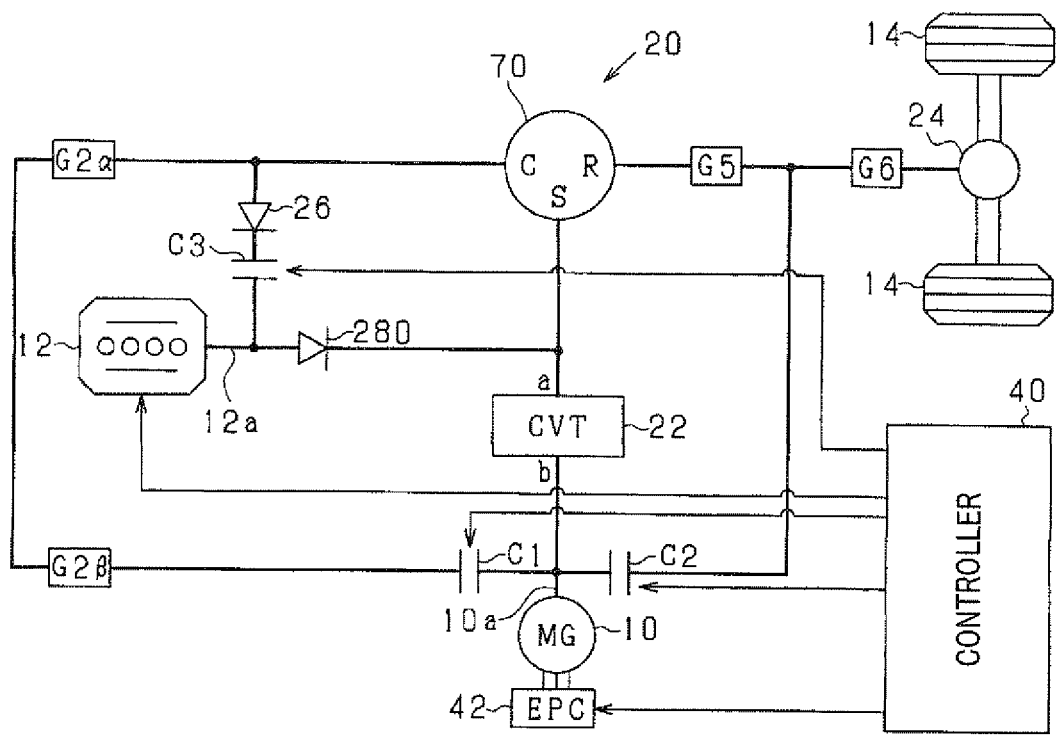
FIG. 22(a) is a block diagram which illustrates a power transmission device of the eighth embodiment which is installed in a hybrid system for a vehicle.
Figure 22B:
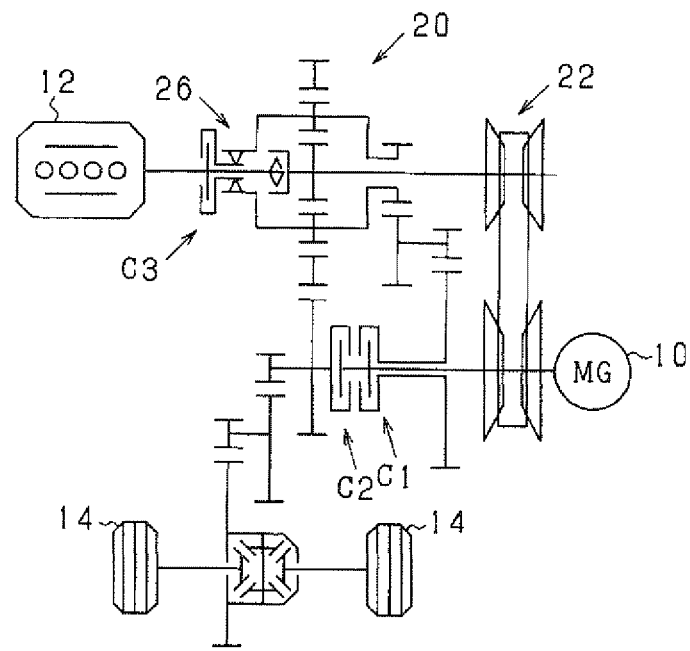
FIG. 22(b) is a view of power transmission paths of the power transmission device of FIG. 22(a)

FIGS. 22(a) and 22(b) show a hybrid system equipped with a power transmission device of the eighth embodiment of the invention. The same reference numbers as employed in the above embodiments refer to the same parts, and explanation thereof in detail will be omitted here. Note that the power transmission device of embodiments, as described below, may be designed to have one or a combinations of the features, as described above.

The geared neutral is established under the condition where two of the power split rotors other than one coupled mechanically to the output shaft of the power transmission device (i.e., the power split device 20) are opposite in sign of power thereof to each other. The power is, however, circulated between the two of the power split rotors, thus resulting in a decrease in efficiency of use of the energy. When it is required to run the driven wheels 14 at a higher speed, so that the second operation mode is entered, the torque applied to the CVT 22 will be decreased below the torque applied from the engine 12 to the input shaft of the power transmission device, thus enhancing the efficiency in transmitting the power to the driven wheels 14 through the CVT 22. If, however, the CVT 22 has become defective, it may result in a failure in transmitting the power from the power to the driven wheels 14. The power transmission device of this embodiment is designed to alleviate such a problem.

The power transmission device of this embodiment is equipped with a one-way bearing 280 instead of the clutch 28 used in the first embodiment. Other arrangements are identical with those in the first embodiment.

The one-way bearing 280 is disposed between the rotating shaft 12a of the engine 12 and the sun gear S of the power split device 20. The one-way bearing 280 works as a one-way transmission mechanism to permit the transmission of power (torque) from the engine 12 to the sun gear S under the condition where the speed of the rotating shaft 12a (i.e. an input of the one-way bearing 280) is not lower than that of the sun gear S (i.e., an output of the one-way bearing 280). In other words, the output of the one-way bearing 280 is permitted to rotate following rotation of the input thereof unless the speed of the output is greater than that of the input. The engine 12 is to be coupled mechanically to the ring gear R through the one-way bearing 280, the CVT 22, the clutch C2, and the gear G5.

The controller 40 works to actuate the clutches C1, C2, C3, and the CVT 22 to control the mode of power transmission and determine a controlled variable of the engine 12. The controller 40 also works to control an operation of an inverter (i.e., a power converter) 42 to determine a controlled variable of the motor-generator 10.

The controller 40, like in the first embodiment, controls the operations of the clutches C1 and C2 to place the power transmission device either in the first operation mode or the second operation mode and also performs a fail-safe operation, as described later.

FIG. 23(a) shows a power transmission path when the vehicle is started by the motor-generator 10 in the first operation mode. FIGS. 23(b) and 23(c) are equivalent to FIGS. 2(b) and 2(c), and explanation thereof in detail will be omitted here.

Figure 24A:
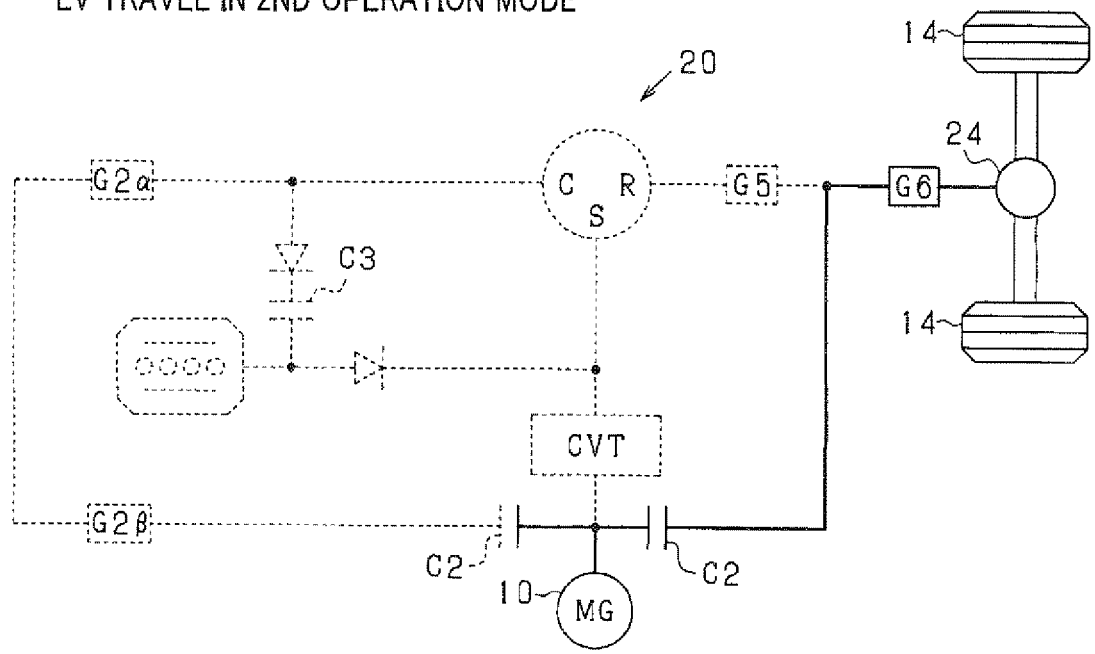
FIG. 24(a) is a schematic block diagram which shows a power transmission path of the power transmission device of FIG. 22(a) when a vehicle is run by a motor-generator in a second operation mode.
Figure 24B:
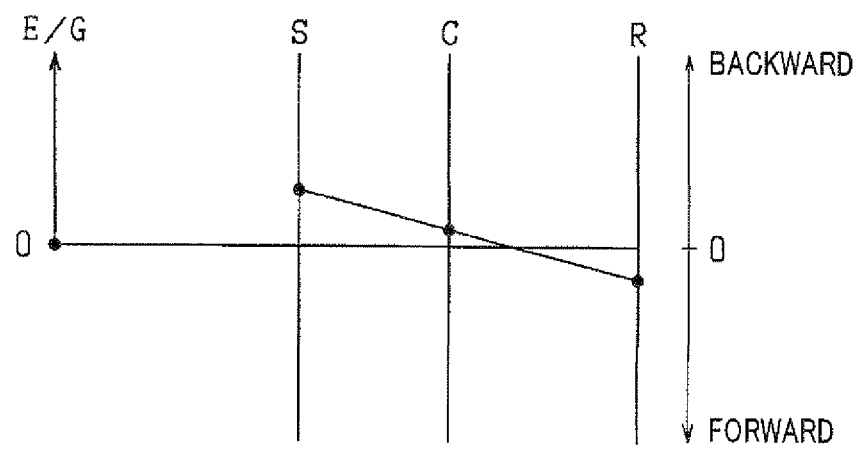
FIG. 24(b) is a nomographic chart which represents an operation of a power split device of FIG. 22(a) along with the speed of an internal combustion engine.

FIG. 24(a) shows a power transmission path when the vehicle is run only by the motor-generator 10 in the second operation mode. FIG. 24(b) is equivalent to FIG. 3(b), and explanation thereof in detail will be omitted here.

FIG. 25(a) shows a power transmission path of the power transmission device when the engine 12 is started in the second operation mode. FIGS. 25(b) and 25(c) are equivalent to FIGS. 4(b) and 4(c), and explanation thereof in detail will be omitted here.

Figure 26A:
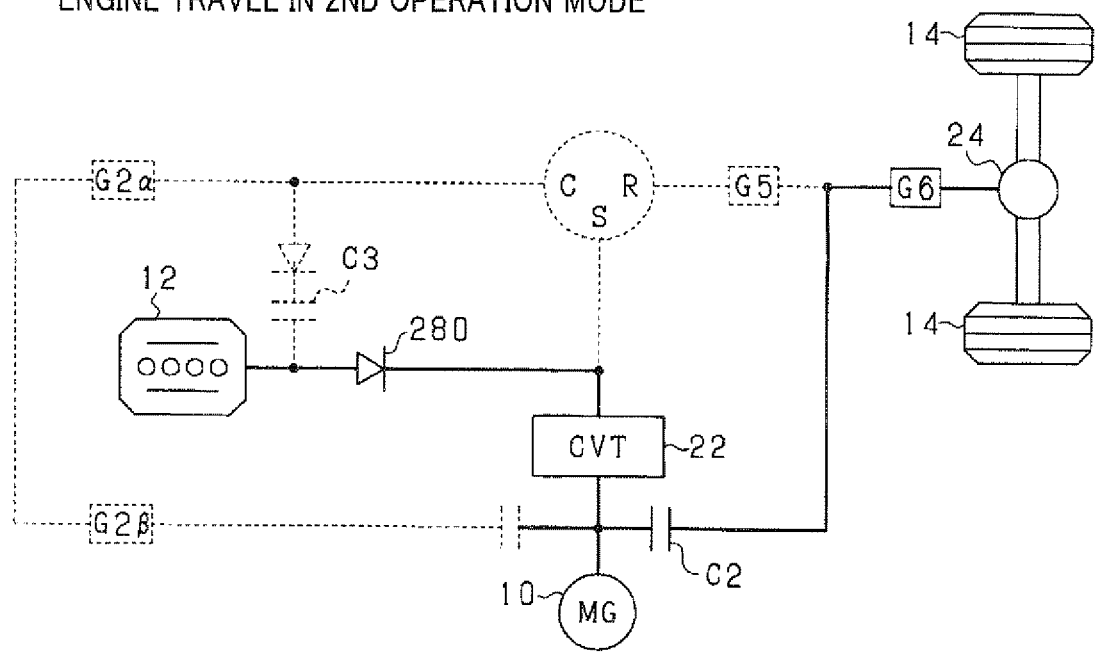
FIG. 26(a) is a schematic block diagram which shows a power transmission path of the power transmission device of FIG. 22(a) when a vehicle is driven by an internal combustion engine in a second operation mode.
Figure 26B:
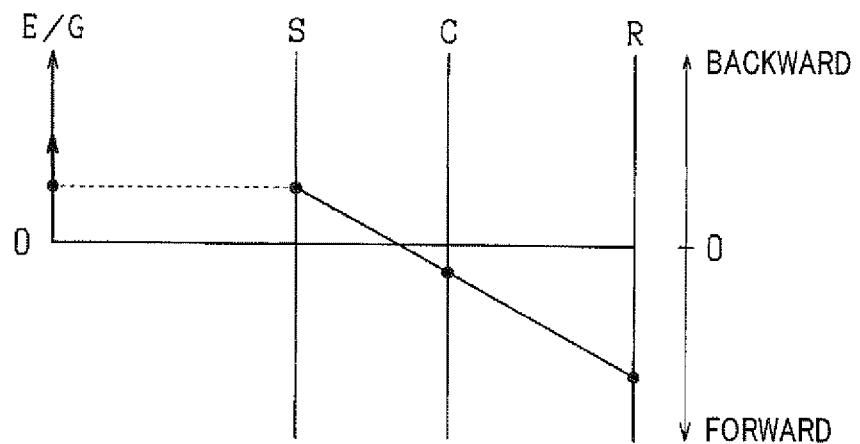
FIG. 26(b) is a nomographic chart which represents an operation of a power split device of the power transmission device of FIG. 22(a) along with the speed of an internal combustion engine.

FIG. 26(a) shows a power transmission path of the power transmission device to run the vehicle through the engine 12 in the second operation mode. FIG. 26(b) is equivalent to FIG. 5(b).

When the speed of the engine 12 is increased, and the speed of the input of the one-way bearing 280 reaches that of the output thereof, it will cause the torque of the engine 12 to be transmitted to the output of the one-way bearing 280. The transmission of torque between the motor-generator 10 and the driven wheels 14 or between the engine 12 and the driven wheels 14 without passing through the power split device 20 may be achieved by disengaging the clutch C3. Specifically, the output of the engine 12 is converted in speed by the CVT 22 and then transmitted to the driven wheels 14.

When the vehicle is being run by the engine 12, the motor-generator 10 needs not be activated as an electric motor, but may be used as a generator. Alternatively, the motor-generator 10 may be deactivated.

Switching from First Operation Mode to Second Operation Mode

Figure 27A:
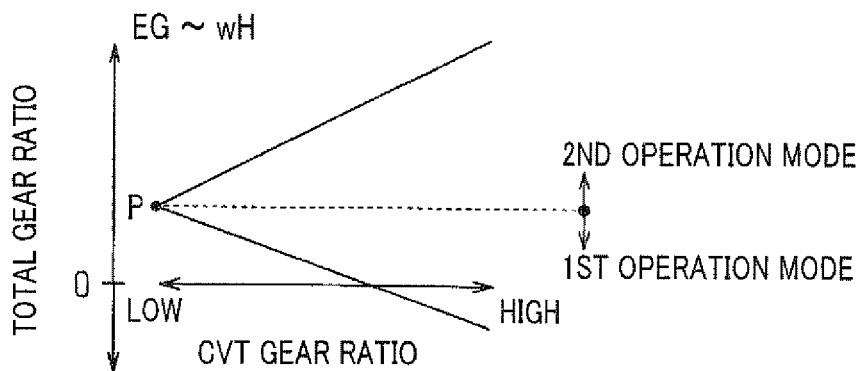
FIG. 27(a) is a graph which shows a relation between a total gear ratio of a power transmission device and a gear ratio of a CVT when a vehicle is powered by an internal combustion engine in the eighth embodiment.
Figure 27B:
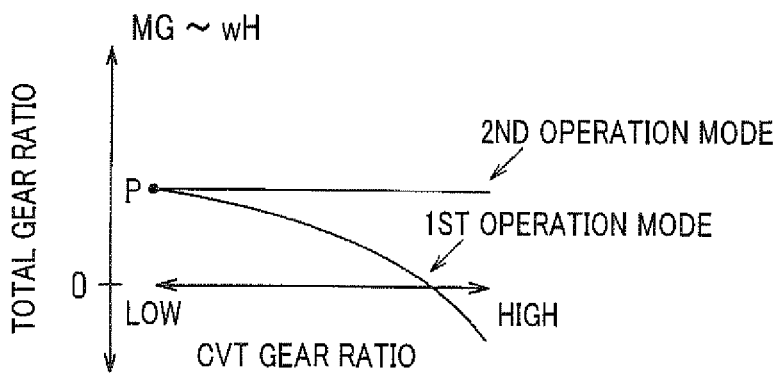
FIG. 27(b) is a graph which shows a relation between a total gear ratio of a power transmission device and a gear ratio of a CVT when a vehicle is powered by a motor-generator in the eighth embodiment.

FIG. 27(a) illustrates a relation of the total gear ratio (i.e., an output-to-input speed ratio) in the power transmission path extending from the engine 12 to the driven wheels 14 to the gear ratio of the CVT 22. FIG. 27(b) illustrates a relation of the total gear ratio in the power transmission path extending from the motor-generator 10 to the driven wheels 14 to the gear ratio of the CVT 22. Note that the total gear ratio of "a" to "b", as referred to herein, represents a ratio of speed of b/speed of a.

When the first operation mode is entered, the controller 40 may change the gear ratio of the CVT 22 continuously to change the speed of the driven wheels 14 from a minus speed (which indicates a reverse rotation of the driven wheels 14) to zero (0), and to a plus speed (which indicates a normal rotation of the driven wheels 14). When a given gear ratio of the CVT 22 (i.e., the mode-switching point P) is reached, the controller 40 switches the operation mode of the power transmission device from the first operation mode to the second operation mode to increase the total gear ratio further, thereby rotating the driven wheels 14 at a higher speed. The switching from the first operation mode to the second operation mode enables a range of a permissible change in the total gear ratio to be increased.

Specifically, the power transmission device is capable of changing the gear ratio of the CVT 22 in the first operation mode, as demonstrated in FIG. 27(a), to increase the total gear ratio in the power transmission path extending from the engine 12 to the driven wheels 14, subsequently switching the operation mode of the power transmission device to the second operation mode at the mode-switching point P, and also changing the direction in which the gear ratio of the CVT 22 changes to the opposite direction to increase the total gear ratio further.

The above operation is, as described in the first embodiment, achieved by controlling the power transmission device so that the sign of speed at which the total gear ratio changes with a change in gear ratio of the CVT 22 in the second operation mode, that is, the direction in which the total gear ratio changes with a change in gear ratio of the CVT 22 in the second operation mode is opposite that in the first operation mode. This is established in the condition that a derivative value of a function in which the gear ratio of the CVT 22 is expressed by an independent variable, and the total gear ratio is expressed by a dependent variable with respect to the gear ratio of the CVT 22 in the second operation mode is opposite in sign to that in the first operation mode. This condition is realized by the gears G2α, G2β, and G5. Specifically, the possibility of the CVT reversing operation is dependent upon the sign of a product of gear ratios of the gears G2α, G2β, and G5.

The controller 40 performs, like in the first embodiment, the above first-to-second operation mode switching under the condition that the total gear ratio, that is, a ratio of an output speed that is the speed of the driven wheels 14 to an input speed that is the speed of the motor-generator 10 or the engine 12 will not change between the first and second operation modes, thus avoiding the omission of transmission of torque to the driven wheels 14.

Figure 27C:
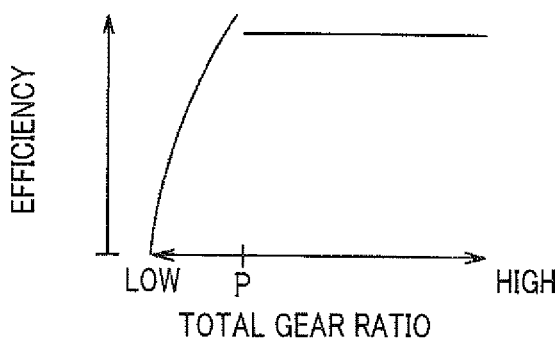
FIG. 27(c) is a graph which shows a relation between a total gear ratio of a power transmission device of the eighth embodiment and a power transmission efficiency.

FIG. 27(c) is equivalent to FIG. 6(c) which represents a relation between the power transmission efficiency and the total gear ratio in the power transmission path extending from the engine 12 to the driven wheels 14. The graph shows that a very low range of the power transmission efficiency exists in the first operation mode, but not in the second operation mode. In the graph of FIG. 27(c), the power transmission efficiency in the first operation mode immediately before switched to the second operation mode is illustrated as being higher than that in the second operation mode, but it does not mean that the power transmission efficiency when the power transmission device is designed to operate only in the first operation mode is higher than when the power transmission device is designed to be switched between the first and second operation modes.

Fail-Safe Operation

For instance, if the belt of the CVT 22 is broken, thus resulting in a failure in transmitting the power through the CVT 22, it is possible to run the driven wheels 14 in the second operation mode, but the power of the engine 12 is unavailable. In order to enable the vehicle to be driven by the engine 12 in the event of the failure in transmitting the power through the CVT 22, the power transmission device of this embodiment performs the fail-safe operation, as will be described below with reference to FIG. 28.

Figure 28:
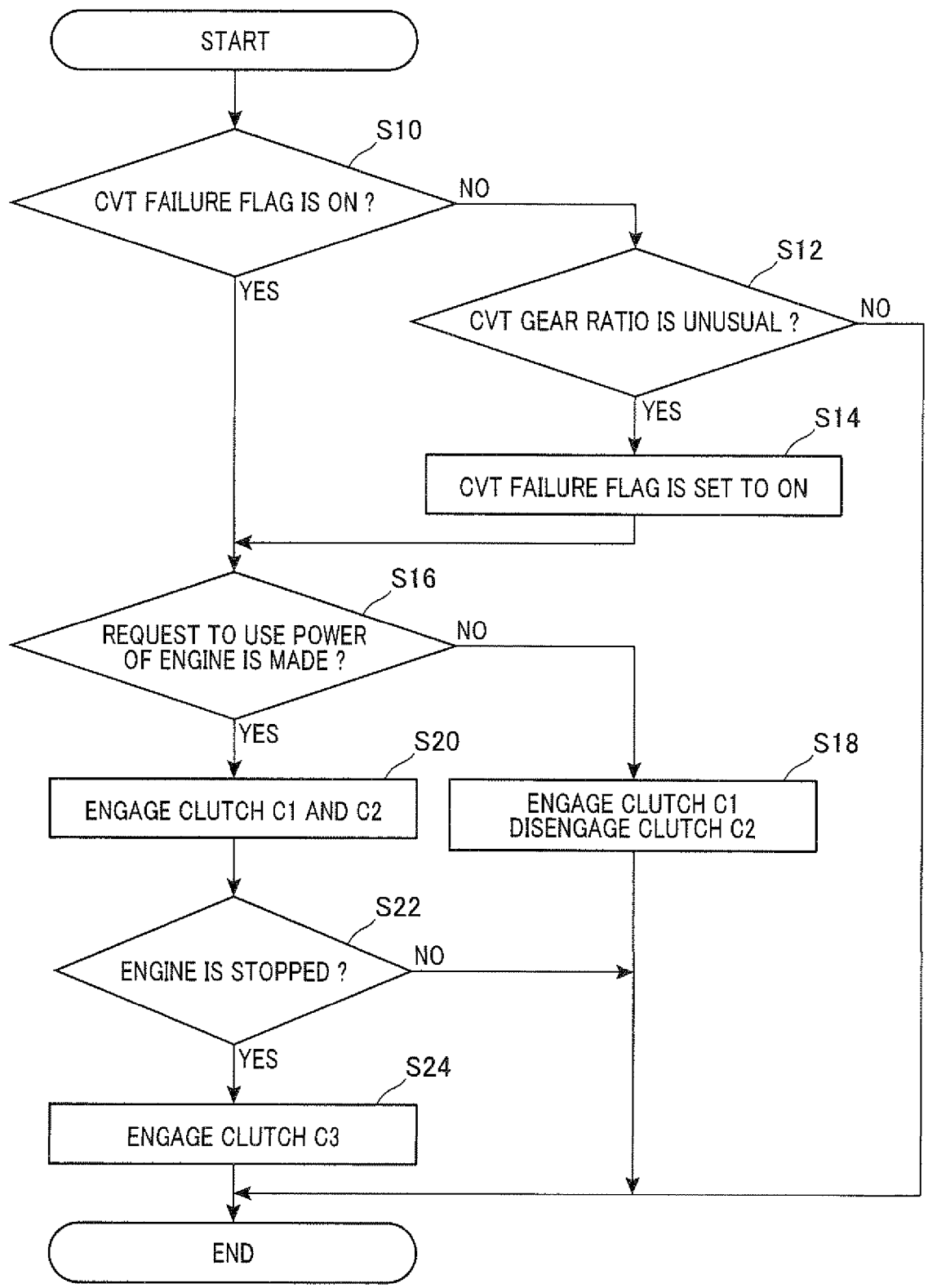
FIG. 28 is a flowchart of a fail-safe operation of the power transmission device of the eighth embodiment.

FIG. 28 is a flowchart of the fail-safe operation to be executed by the controller 40 at given intervals.

After entering the program, the routine proceeds to step S10 wherein it is determined whether a CVT failure flag is set on or not. The CVT failure flag indicates the presence of a failure in transmitting the power through the CVT 22 which arises from, for example, the breakage of the belt of the CVT 22. If a NO answer is obtained in step S10 meaning that the CVT 22 is operating properly, then the routine proceeds to step S12 wherein it is determined whether the value of the gear ratio of the CVT 22 is unusual or not. For example, when the speed of the primary pulley 22a or the secondary pulley 22b, as illustrated in FIGS. 8(c) and 8(d), is away from an expected speed, as calculated based on a relation between an amount by which the CVT 22 has been requested to operate and the speed of another CVT-linked rotor, by a given value, it is determined whether the value of the gear ratio of the CVT 22 is not correct. Alternatively, when the speed of the primary pulley 22a or the secondary pulley 22b lies outside an expected speed range which is calculated based on a relation between the range within which the gear ratio of the CVT 22 is to be changed and the current speed of another CVT-linked rotor by a given value, it is determined whether the value of the gear ratio of the CVT 22 is not correct. If a YES answer is obtained, then the routine proceeds to step S14 wherein the CVT failure flag is set to ON.

If a YES answer is obtained in step S10 or after step S14, the routine proceeds to step S16 wherein it is determined whether a request to use the power from the engine 12 is made or not. For example, when the vehicle has any problem to run, but the power of the motor-generator 10 is insufficient to move the vehicle in an emergency running mode, or when the amount of electric energy remaining in a power supply such as a storage battery for the motor-generator 10 is lacking, it is determined that the power of the engine 12 is requested to be used. If a NO answer is obtained in step S16, then the routine proceeds to step S18 wherein the clutch C1 is disengaged, while the clutch C2 is engaged, thereby establishing the second operation mode to permit the vehicle to be run only by the power of the motor-generator 10 in the emergency running mode.

Figure 29:
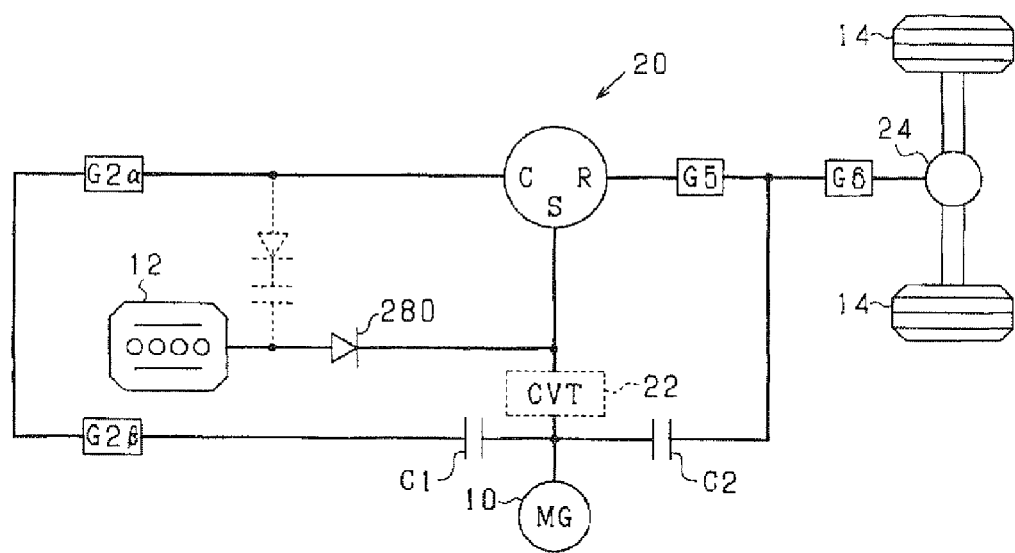
FIG. 29 is a block diagram which shows a power transmission path in the fail-safe operation of FIG. 28.

Alternatively, if a YES answer is obtained in step S16, then the routine proceeds to step S20 wherein the clutches C1 and C2 are both engaged, as illustrated in FIG. 29, to enable the torque to be applied to the carrier C and the ring gear R of the power split device 20, which permits the power of the engine 12 to be transmitted to the driven wheels 14 through the sun gear S. Specifically, a combination of the clutches C1 and C2 works as a fixing mechanism to connect the carrier C and the ring gear R of the power split device 20 mechanically to each other, so that they are fixed to each other. In other words, the carrier C and the ring gear R are held from rotating relative to each other. This means that all the ring gear R, the sun gear S, and the carrier C rotate in unison with each other. The ratio of speed of the sun gear S to that of the carrier C, and the ratio of speed of the sun gear S to that of the ring gear R are, therefore, fixed to one (1). The power, as produced by the engine 12 is, thus, transmitted to the sun gear S and then to both the ring gear R and the carrier C. A portion of the power, as transmitted to the ring gear R, is outputted directly to the driven wheels 14, while a remaining portion of the power, as transmitted to the carrier C, is transmitted to the driven wheels 14 through the gear G2α, the gear G2β, the clutches C1 and C2, and the gear G6. Therefore, the speed or power of the ring gear R (i.e., the driven wheels 14) is permitted to be controlled by controlling an output of the engine 12.

The routine proceeds to step S22 wherein it is determined whether the engine 12 is stopped or not. If a YES answers is obtained meaning that the engine 12 is at rest, then the routine proceeds to step S22 wherein the clutch C3 is engaged to apply an initial torque to the rotating shaft 12a of the engine 12 to start the engine 12. When the speed of the rotating shaft 12a of the engine 12 is above the speed at which the engine 12 will start to burn the fuel without being cranked, the controller 40 may instruct a fuel injector (not shown) to spray the fuel into the engine 12 without engaging the clutch C3.

After step S24, or S18 or if a NO answer is obtained in step S12 or S22, the routine terminates.

The structure of the power transmission device of this embodiment offers the following advantages.

22) When the CVT 22 is determined as being malfunctioning, the controller 40 engages the clutches C1 and C2, thereby allowing an operator to move the vehicle in the emergency running mode to a safe area such as a service location using the power outputted from the engine 12.

23) The one-way bearing 280 is disposed between the engine 12 and the sun gear S to establish the transmission of torque from the engine 12 to the sun gears S under the condition that the speed of the input of the one-way bearing 280 (i.e., the speed of the rotating shaft 12a of the engine 12) is not lower than that of the output of the one-way bearing 280 (i.e., the speed of the sun gear S), thus causing the torque to be transmitted from the engine 12 to the sun gear S when the speed of the input of the one-way bearing 280 reaches that of the output thereof. This facilitates the ease of starting to supply the torque of the engine 12 to the sun gear S.

24) The controller 40 switches the operation mode of the power transmission device between the first and second operation modes, thereby making mechanical connections among the motor-generator 10, the engine 12, and the driven wheels 14 suitable for operational conditions thereof.

25) The power transmission device is so designed that when the sign of the speed of the motor-generator 10 (or the engine 12) is fixed to be either plus or minus, the signs of power of the carrier C and the sun gear S will be opposite to each other in the first operation mode, while the powers of the sun gear S and the ring gear R will be zero (0) in the second operation mode. This causes the power to be circulated between the rotors of the power split device 20 other than connected mechanically to the driven wheels 14 in the first operation mode, thus permitting the geared neutral to be established desirably. The power is not circulated in the second operation mode, thus resulting in an increase in power transmission efficiency. No need also arises to reverse the motor-generator 12 (or the engine 10) upon the switching between the first and second operation modes.

26) The CVT 22 is operable both in the first and second operation modes, thus resulting in a decrease in part of the power transmission device.

27) A first order derivative value of a function, in which the gear ratio of the CVT 22 is expressed by an independent variable, and the total gear ratio in the power transmission path between the power source (i.e., the motor-generator 10 or the engine 12) and the driven wheels 14) is expressed by a dependent variable, with respect to the gear ratio of the CVT 22 (i.e., the independent variable) in the second operation mode is set opposite in sign to that in the first operation mode. This enables the CVT reversing operation to broaden the range in which the total gear ratio is permitted to be changed.

28) The power transmission device is equipped with a mechanical measure (i.e., the gears G2α, G2β, and G5) which compensates for a difference in speed between the carrier C and the ring gear R, thereby eliminating the instantaneous omission of transmission of torque to the driven wheels 14 upon the switching between the first operation mode and the second operation mode.

29) The power transmission device is equipped with the electronically-controlled clutch C3 to establish or block the transmission of torque between the engine starting rotor (i.e., the carrier q of the power split device 20 and the rotating shaft 12a of the engine 12, thereby avoiding an error in transmission of torque from the engine starting rotor to the engine 12 before the engine 12 is started, which minimizes consumption of energy or power in the power transmission device.

30) The power transmission device is also equipped with the one-way bearing 26 which establishes the transmission of torque from the power slit device 20 to the rotating shaft 12a of the engine 12 under the condition that the speed of the input of the one-way bearing 26 (i.e., the speed of the engine starting rotor) is not lower than that of the output of the one-way bearing 26 (i.e., the speed of the rotating shaft 12a of the engine 12), thereby avoiding the transmission of torque from the engine 12 to the engine starting rotor when the torque is produced upon start of combustion of fuel in a combustion chamber of the engine 12, so that the speed of the rotating shaft 12a of the engine 12 rises quickly. This is because when the speed of the output of the one-way bearing 26 (i.e., the speed of the rotating shaft 12a) is elevated above that of the input of the one-way bearing 26, the one-way bearing 26 blocks the transmission of torque from the output to the input of the one-way bearing 26. This avoids the transmission of torque pulsation to the operator of the vehicle.

31) The clutches C1 and C2 are, as illustrated in FIG. 22(b), coupled directly to the common shaft of the power transmission device, thus facilitating the ease of arranging the clutches C1 and C2 close to each other, which permits the size of the power transmission device to be reduced.

The power transmission device of the ninth embodiment will be described below which is identical in structure with the one of the eighth embodiment, but designed to avoid exertion of unwanted torque on the CVT 22 when the reliability in operation of the CVT 22 is determined to be degraded.

Figure 30:
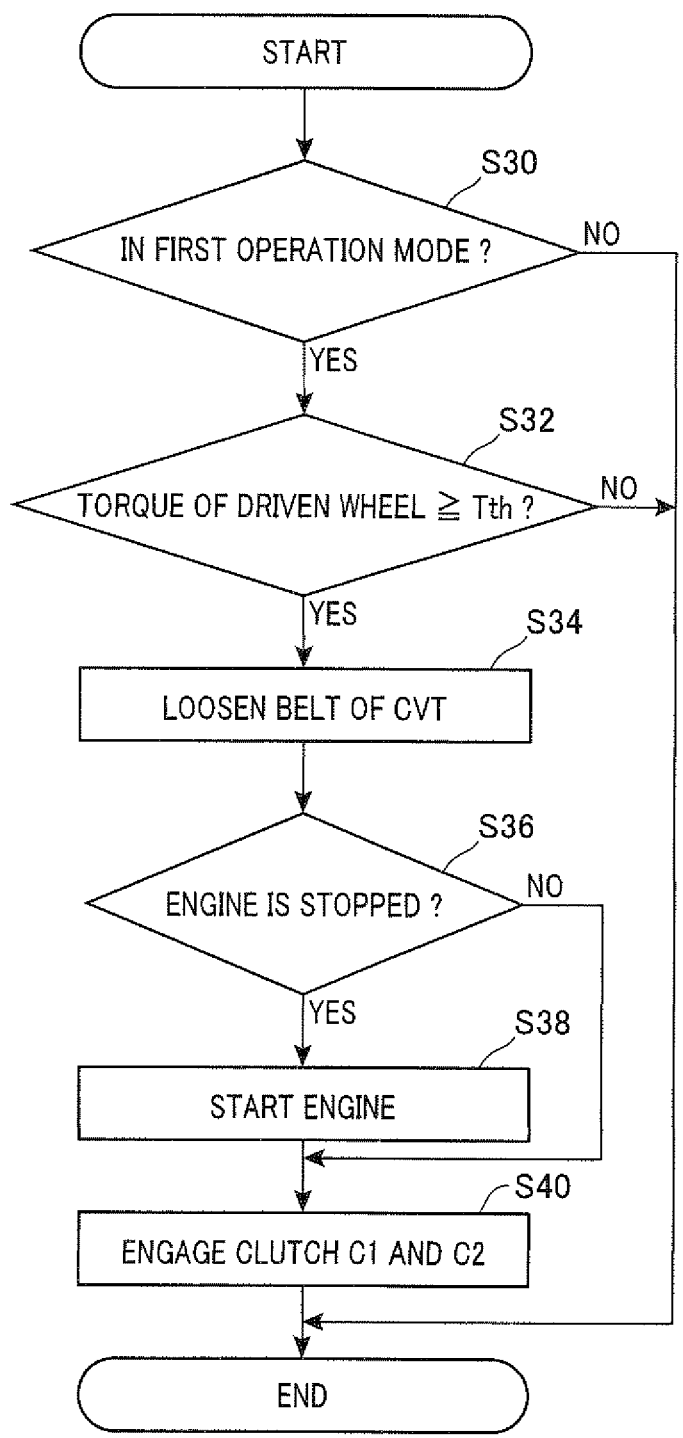
FIG. 30 is a flowchart of a fail-safe operation of the power transmission device of the ninth embodiment.

FIG. 30 is a flowchart of a program to be executed by the controller 40 of the ninth embodiment cyclically at regular intervals.

After entering the program, the routine proceeds to step S30 wherein it is determined whether the first operation mode is entered or not. This determination is made to determine whether a high degree of torque is to be exerted on the CVT 22 or not. When the gear ratio of the CVT 22 is a low-speed gear ratio, it will cause a great torque to be applied to the CVT 22. If a YES answer is obtained, then the routine proceeds to step S32 wherein it is determined whether the torque to be exerted on the driven wheels 14 is greater than a specified torque Tth or not. This is because the driven wheels 14 are mechanically connected to the CVT 22, so that the torque acting on the driven wheels 14 will be transmitted to the CVT 22. For example, such torque is calculated based on an angle of inclination of a road surface on which the vehicle is present. The angle of inclination may be calculated based on an output of an acceleration sensor which measures a degree of acceleration acting on the vehicle. Specifically, when the vehicle starts on a uphill, it will cause a high degree of torque to act on the driven wheels 14 (i.e., the CVT 22), which may lead to slippage of the belt 22c of the CVT 22. This results in a decrease in efficiency of the CVT 22 in transmitting the power therethrough. Additionally, when the vehicle driver depresses the accelerator pedal while depressing the brake pedal, it will also cause an undesirable high degree of torque to be exerted on the CVT 22, which may lead to slippage of the belt 22c. The torque Tth is selected to be smaller than or equal to a lower limit of a torque range which would affect the reliability in operation of the CVT 22 undesirably.

If a YES answer is obtained in step S32 meaning that the efficiency of the CVT 22 in transmitting the power therethrough would drop, then the routine proceeds to step S34 wherein the belt 22c of the CVT 22 is loosened. This is achieved by increasing the width of a belt-wound groove of each of the primary pulley 22a and the secondary pulley 22b.

The routine proceeds to step S36 wherein it is determined whether the engine 12 is stopped or not. If a YES answer is obtained meaning that the engine 12 is at rest, then the routine proceeds to step S38 wherein the engine 12 is started. This is accomplished by engaging the clutch C3 to apply the torque from the carrier C to the rotating shaft 12a of the engine 12.

After step S38 or if a NO answer is obtained in step S36, the routine proceeds to step S40 wherein the clutches C1 and C2 are engaged, thereby establishing the power transmission path, as illustrated in FIG. 29, through which the power is permitted to be transmitted from the engine 12 and the motor-generator 10 to the driven wheels 14.

After step S40 or if a NO answer is obtained in step S30 or S32, the routine terminates.

This embodiment also offers the following beneficial effect in addition to the effects 22) to 31).

32) When a great torque which would degrade the reliability in operation of the CVT 22 is expected to be exerted on the CVT 22, the controller 40 loosens the belt 22c of the CVT 22 to stop the power from being outputted through the CVT 22 and then engages the clutches C1 and C2 to enable the torque to be outputted from both the engine 12 and the motor-generator 10 directly to the driven wheels 14, thereby protecting the CVT 22 from the physical damage.

The tenth embodiment will be described below which is a modification of the ninth embodiment of FIG. 30.

FIG. 31 is a flowchart of a program to be executed at given intervals by the controller 40 in the tenth embodiment to protect the CVT from being damaged physically. The same step numbers as employed in FIG. 30 refer to the same operations.

After entering the program, the routine proceeds to step S30 wherein it is determined whether the first operation mode is entered or not. If a YES answer is obtained, then the routine proceeds to step S32 wherein it is determined whether the torque to be exerted on the driven wheels 14 is greater than the specified torque Tth or not. If a YES answer is obtained, then the routine proceeds to step S50 wherein the clutch C2 of the power transmission device of FIG. 22(a) is brought into partial engagement, in other words, speeds of rotation of the input and output of the clutch C2 are set to be different from each other to decrease the efficiency in transmitting the power therethrough to a middle value. This causes part of power flowing from the carrier C to the sun gear S through the clutch C1 to be applied to the driven wheels 14 through the clutch C2, thereby decreasing the torque to be exerted on the CVT 22.

It is advisable that a gear be disposed between the clutch C2 and the joint of the gears G5 and G6 to reduce the speed of rotation of the output of the clutch C2. This is because the efficiency in transmitting the power through the clutch C2 when placed in the partial engagement will become great as a difference in speed between the input and the output of the clutch C2 thereof decreases. The use of such a gear will result in a decrease in difference in speed between the motor-generator 10 and the driven wheels 14 during the low-speed rotation of the driven wheels 14 during which a great torque is expected to act on the CVT 22. This permits the difference in speed between the input and output of the clutch C2 when placed in the partial engagement to be decreased, which ensures the efficiency in transmitting the power through the clutch C2.

This embodiment also offers the following beneficial effect in addition to the effects 22) to 31).

33) When unwanted toque which would degrade the reliability in operation of the CVT 22 is determined to act on the CVT 22, the controller 40 engages the clutch C2 partially to protect the CVT 22 from being damaged mechanically.

Figure 32A:
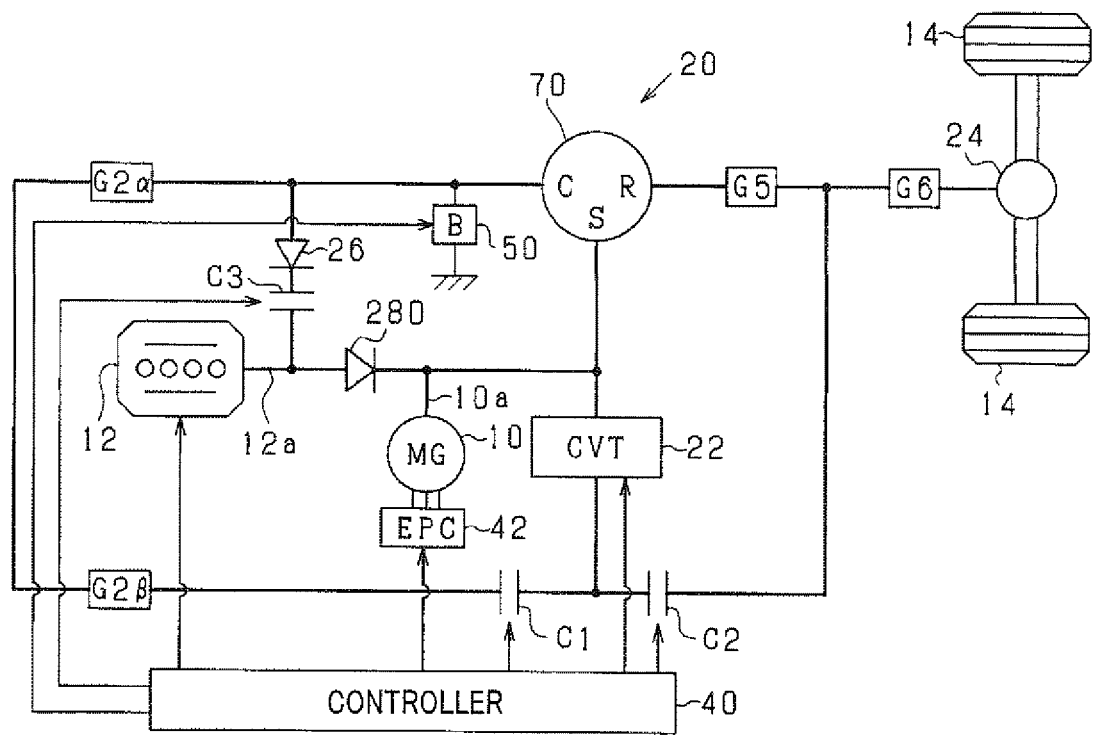
FIG. 32(a) is a block diagram which illustrates a power transmission device of the eleventh embodiment which is installed in a hybrid system for a vehicle.
Figure 32B:
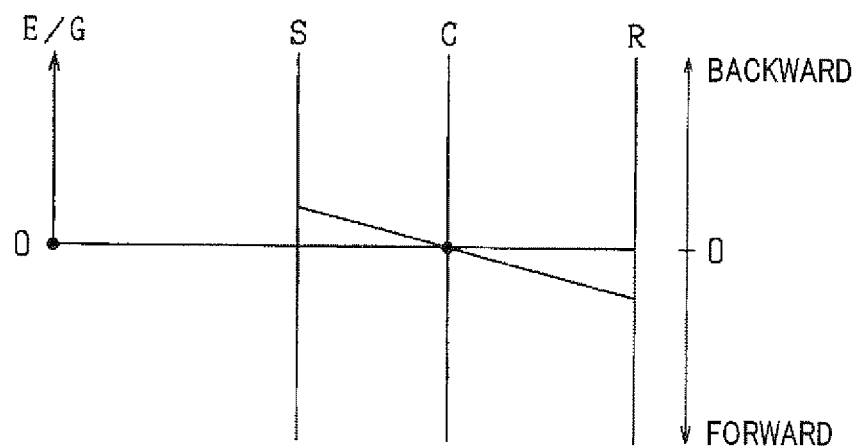
FIG. 32(b) is a nomographic chart which represents an operation of a power split device along with the speed of an internal combustion engine in the power transmission device of FIG. 32(a)

FIGS. 32(a) and 32(b) illustrate a power transmission device of the eleventh embodiment. The same reference numbers as employed in FIGS. 22(a) and 22(b) will refer to the same parts, and explanation thereof in detail will be omitted here.

The motor-generator 10 is connected between the CVT 22 and the sun gear S of the power split device 20. The power transmission device also includes a brake 50 which works to hold the carrier C of the power split device 20 from moving. When the CVT 22 has failed in operation to transmit the power therethrough, the controller 40 activates the brake 50 to stop the carrier C from rotating and disengages the clutches C1 and C2. The controller 40 then controls the speed of the sun gear S to regulate the speed of the driven wheels 14.

When it is required to reverse the driven wheels 14, the controller 40 uses only the motor-generator 10 to rotate the driven wheels 14 in the reverse direction. When it is required to start the engine 12, the controller 40 activates the motor-generator 10 to provide torque to the rotating shaft 12a of the engine 12.

Figure 12:
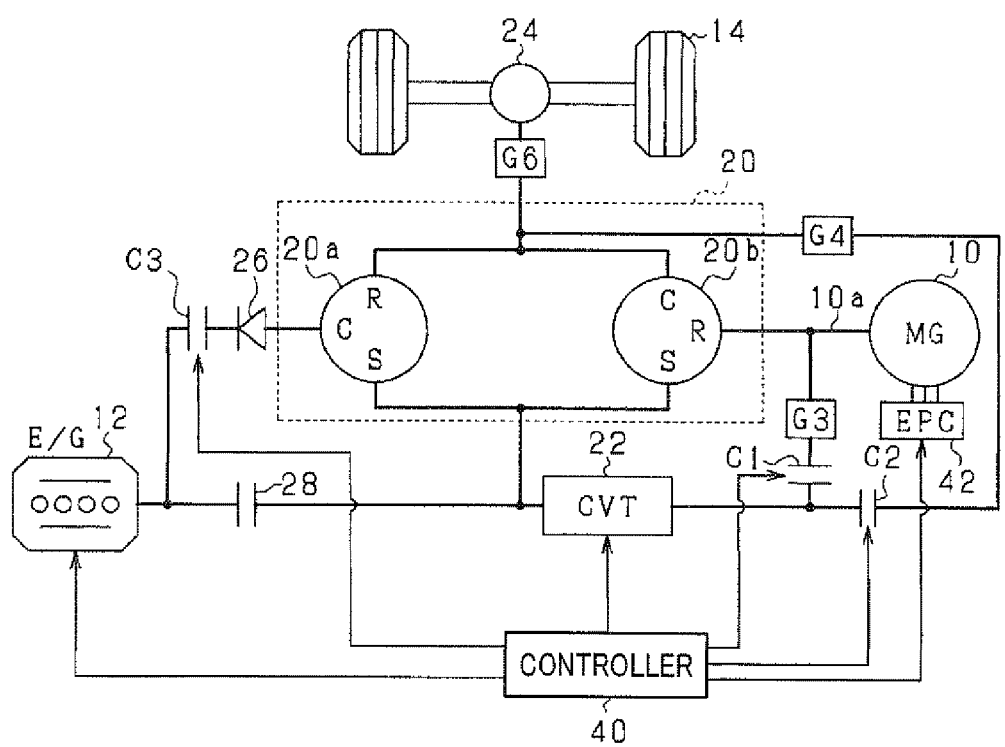
FIG. 12 is a block diagram which illustrates a power transmission device of the fifth embodiment which is installed in a hybrid system for a vehicle.
Figure 33:
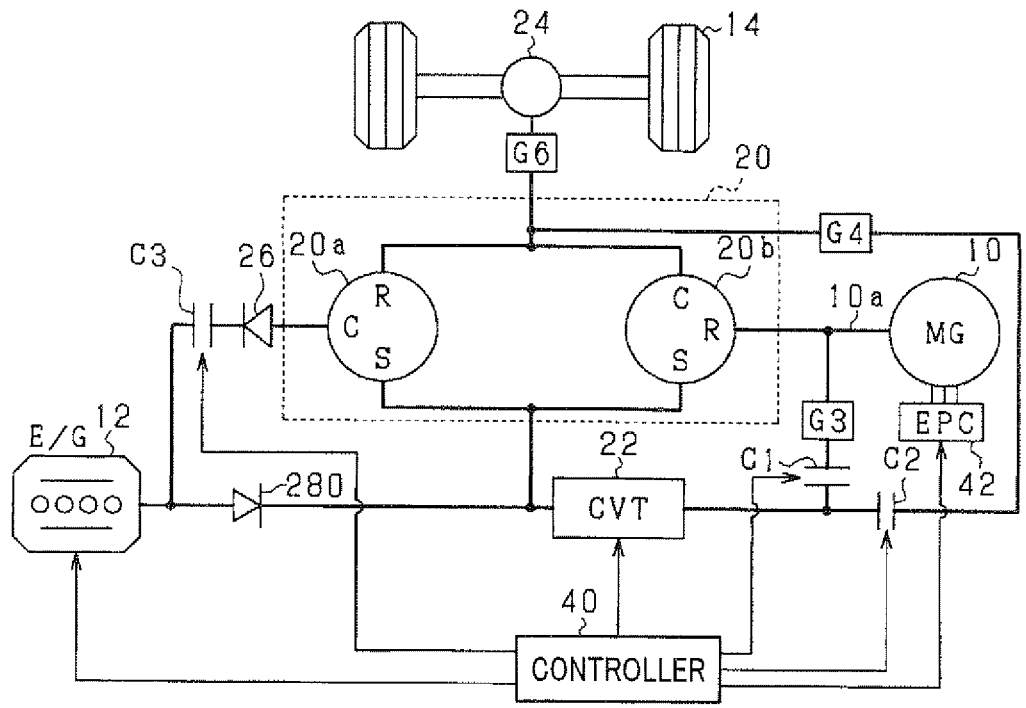
FIG. 33 is a block diagram which illustrates a power transmission device of the twelfth embodiment which is installed in a hybrid system for a vehicle.

FIG. 33 illustrates a power transmission device of the twelfth embodiment which is a modification of the one of the fifth embodiment, as illustrated in FIG. 12. The same reference numbers as employed in FIG. 12 refer to the same parts, and explanation thereof in detail will be omitted here.

The one-way bearing 280 is disposed between the joint of the sun gears S of the first and second planetary gear sets 20a and 20b and the rotating shaft 12a of the engine 12.

The power transmission device functions to achieve the circulation of power in the first operation mode where the clutch C1 is in the engaged state, while the clutch C2 is in the disengaged state. Specifically, in the first operation mode, the power, as outputted from the sun gear S of the second planetary gear set 20b, is inputted to the ring gear R of the second planetary gear set 20b through the CVT 22, the clutch C1, and the gear G3. This enables a high degree of torque to be applied to the driven wheels 14 when the carrier C of the second planetary gear set 20b is rotating at an extremely low speed. In the second operation mode where the clutch C1 is in the disengaged state, while the clutch C2 is in the engaged state, the total gear ratio may be increased without the circulation of power. The transmission of power through the first planetary gear set 20a is achieved only when the clutch C3 is in the engaged state.

When the possibility that the CVT 22 would fail to transmit the power therethrough is encountered, the controller 40 engages both the clutches C1 and C2 to fix a speed ratio of the ring gear R to the carrier C of the second planetary gear set 20b, thereby enabling the power of the engine 12 to be transmitted to the driven wheels 14 through the sun gear S.

Figure 13:
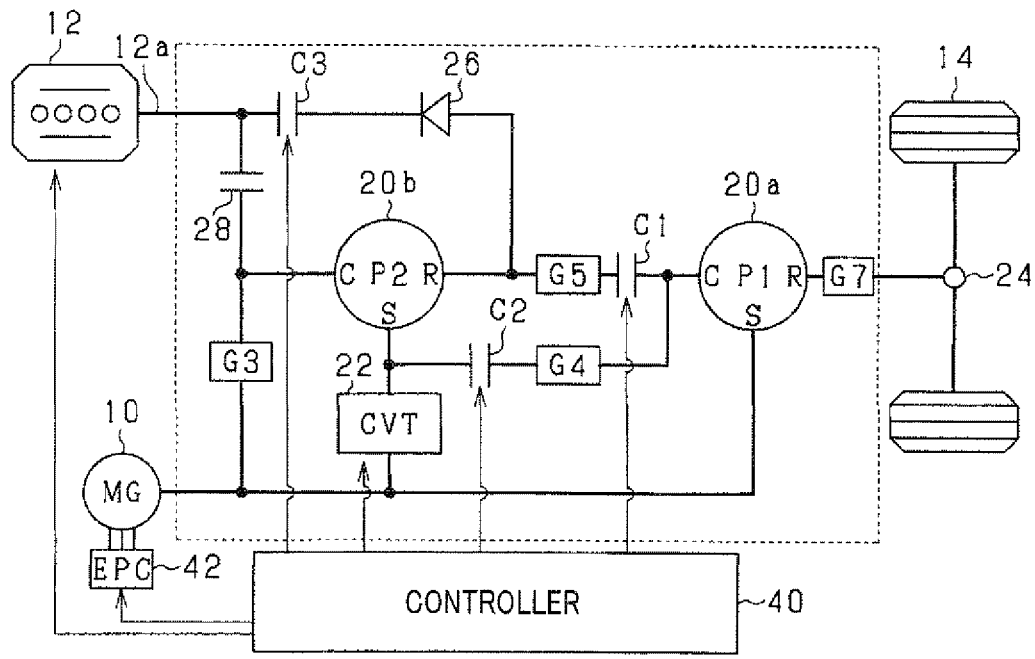
FIG. 13 is a block diagram which illustrates a power transmission device of the sixth embodiment which is installed in a hybrid system for a vehicle.
Figure 34:
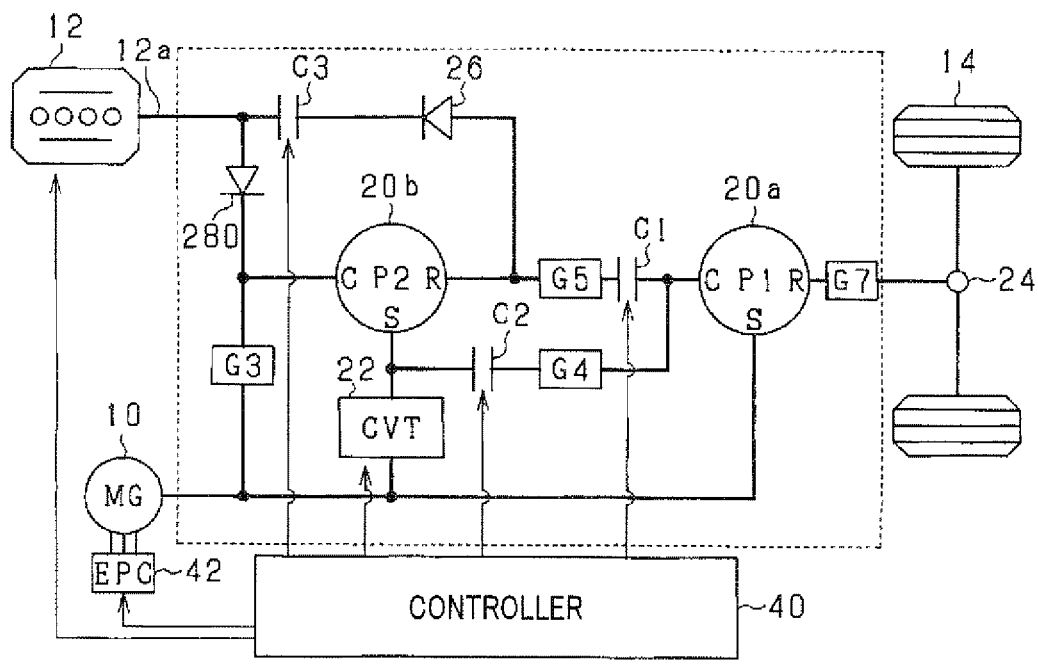
FIG. 34 is a block diagram which illustrates a power transmission device of the thirteenth embodiment which is installed in a hybrid system for a vehicle.

FIG. 34 illustrates a power transmission device of the thirteenth embodiment which is a modification of the one of the sixth embodiment, as illustrated in FIG. 13. The same reference numbers as employed in FIG. 13 refer to the same parts, and explanation thereof in detail will be omitted here.

The one-way bearing 280 is disposed between the rotating shaft 12a of the engine 12 and the carrier C of the second planetary gear set 22b.

The power transmission device of this embodiment is operable to achieve the circulation of power in the first operation mode where the clutch C1 is in the engaged state, while the clutch C2 is in the disengaged state. Specifically, in the first operation mode, the power, as outputted from the carrier C of the first planetary gear set 20a, is inputted to the sun gear S of the first planetary gear set 20a through the clutch C1, the ring gear R of the second planetary gear set 20b, the sun gear S of the second planetary gear set 20b, and the CVT 22. The second operation mode in which the circulation of power is not created is achieved by disengaging the clutch C1 and engaging the clutch C2.

When the possibility that the CVT 22 would fail to transmit the power therethrough is encountered, the controller 40 engages both the clutches C1 and C2 to fix a speed ratio of the ring gear R to the sun gear S of the second planetary gear set 20b. This causes the speed of the carrier C of the first planetary gear set 20a to be set as a function of speeds of the ring gear R and the sun gear S of the second planetary gear set 20b, thereby enabling the power of the engine 12 or the motor-generator 10 to be transmitted to the driven wheels 14 through the carrier C of the second planetary gear set 20b or the sun gear S of the first planetary gear set 20a.

Modifications of Eighth to Thirteenth Embodiment how to Detect Failure in Transmitting Power Through CVT 22

The breakage of the belt 22c of the CVT 22 is, as described above, detected to diagnose the operation of the CVT 22 by determining whether the speed of the primary pulley 22a or the secondary pulley 22b exceeds a set range, but may alternatively be determined using a speed sensor which measures the speed of the belt 22c. Specifically, when the speed of the belt 22c is lower than that of the primary pulley 22a or the secondary pulley 22b by a given value, the controller 40 may determine that the belt 22c is broken and that the failure has occurred in transmitting the power through the CVT 22.

When the output or the input shaft of the CVT 22 is broken, the controller 20 may also determine that the failure has occurred in transmitting the power through the CVT 22. The breakage of the output or input shaft may be found based on speeds of ends of the output or input shaft.

Condition to Loosen Belt of CVT 22

When it is required to move the driven wheels 14 in the second operation mode using only the power produced by the motor-generator 10, the controller 40 may loosen the belt 22c of the CVT 22. In such a travel mode of the vehicle, the power is not transmitted through the CVT 22 or the power split device 20 theoretically. However, a small amount of the power is actually consumed by the CVT 22 or the power split device 20. In order to eliminate such a power loss, the controller 40 may loosen the belt 22c to eliminate the consumption of the power in the CVT 22 or the power split device 20.

Power Transmission Path Through which Motor Power is Transmitted to Driven Wheel The power transmission device may be designed to place the clutch C2 in the fully engaged state and the clutch C1 in the partial engaged state to define an additional power transmission path through which the power of the motor-generator 10 is transmitted to the driven wheels 14 through the clutch C1. Alternatively, the clutch C2 is placed in the fully engaged state, while the clutch C1 is placed in the partial engaged state.

Engine Start Power Transmission Control Mechanism

The clutch C3 and the one-way bearing 26, as described above, work as an engine start power transmission control mechanism to selectively block or establish transmission of torque between the rotating shaft 12a of the engine 12 and the engine starting rotor of the power split device 20 (i.e., the carrier q when it is required to start the engine 12. The engine start power transmission control mechanism may, however, be designed to include only the clutch C3. In this case, unwanted transmission of torque which will be increased suddenly upon start of combustion of fuel in the engine 12 to the power split device 20 is avoided by disengaging the clutch C3 prior to the start of combustion of fuel in the engine 12 after an initial rotation is given to the rotating shaft 12a of the engine 12. The first torque transmission control mechanism may also be made by only the one-way bearing 26. The clutch C3 may alternatively be joined to the input of the one-way bearing 26.

Instead of the one-way bearing 26 which establishes the transmission of torque to the engine 12 under the condition that the speed of the input of the one-way bearing 26 is not lower than that of the output of the one-way bearing 26 (i.e., the rotating shaft 12a of the engine 12), a one-way clutch or another similar type one-way power transmission control mechanism working to have the rotating shaft 12a follow the rotation of the engine starting rotor with or without any slip may be used.

Driving Power Transmission Control Mechanism

The one-way bearing 280 works as a one-way transmission mechanism to transmit the torque from the engine 12 to the driven wheels 14 under the condition that the speed of the input of the one-way bearing 280 leading to the engine 1 is not lower than that of the output of the one-way bearing 280 leading to the power transmission rotor of the power split device 20, however, a one-way clutch or another type of mechanism whose output shaft rotates slightly following rotation of an input shaft thereof may be used instead.

The driving power transmission control mechanism may alternatively be equipped with a combination of a one-way transmission mechanism and a clutch or only a clutch.

Use of Power Circulation in First Operation Mode

The circulation of power, as described above, is used to changing the sign of the speed of the driven wheels 14 (i.e., the direction of rotation of the driven wheels 14) from the negative value to zero (0) and to the positive value or vice versa without reversing the direction of rotation of the power source (i.e., the motor-generator 10), however, may alternatively be used only in a range in which the sign of the speed of the driven wheels 14 is either positive or negative. In this case, the reversal of rotation of the driven wheels 14 is achieved by reversing the motor-generator 10 or changing the combination of mechanical connections among the power split rotors, the power source, and the driven wheels 14 without reversing the sign of sped of the motor-generator 10. This is achieved by installing a clutch between the sun gear S and the CVT 22 and a mechanical means to hold the sun gear S from moving in the structure of FIG. 22(a).

When the reversal of rotation of the driven wheels 14 is not achieved by changing the gear ratio of the CVT 22 in the above manner, it enables the range in which the total gear ratio is to change with a change in gear ratio of the CVT 22 in the first operation mode to be narrowed, thus allowing a required degree of durability of the CVT 22 to be decreased.

Type of Speed Variator

The CVT 22 needs not be of a belt-type. For example, a traction drive type or hydraulic continuously variable transmission may be used. Alternatively, a gear transmission may be used instead of the CVT 22. When the gear transmission is found to be malfunctioning, the controller 40 may engages the clutches C1 and C2.

Other Modifications

When it is determined in the tenth embodiment that only the power of the motor-generator 10 is insufficient to move the vehicle, the controller 40 may add the power of the engine 12 to run the driven wheels 14.

Automotive vehicles in which the power transmission device is to be installed may be electric vehicles equipped with only the motor-generator 10 as well as the hybrid vehicles, as described above, equipped with both the engine 12 and the motor-generator 10. In the structure, as illustrated in FIG. 32(a), in which the motor-generator 10 is connected between the one-way bearing 280 and the joint of the sun gear Sand the CVT 22, the controller 40 may engages the clutches C1 and C2 in the fail-safe mode. In the structure, as illustrated in FIG. 22(a), in which the generator-motor 10 is connected to the joint of the clutches C1 and C2, the controller 40 may place the clutch C2 in the partial engagement when the clutch C1 is in the engaged state in the fail-safe mode.

The power transmission device may be designed to allow the omission of transmission of torque to the driven wheels 14 upon switching between the first and second operation modes. This also offers the same advantage 21), as described in the first embodiment. Specifically, the controller 40 gradually increases the degree of engagement of one of the clutches C1 and C2 which is being switched from the disengaged state to the engaged state to establish the partial engagement of the one of the clutches C1 and C2. However, when, for example, the fail-safe mode is entered in which it is required to switch between the first and second operation modes quickly regardless of mechanical stock arising therefrom, the controller 40 may switch between the first and second operation modes forcibly at a gear ratio of the CVT 22 which develops values of the total gear ratio which are different between the first and second operation modes without creating the partial engagement of the one of the clutches C1 and C2.

Figure 35:
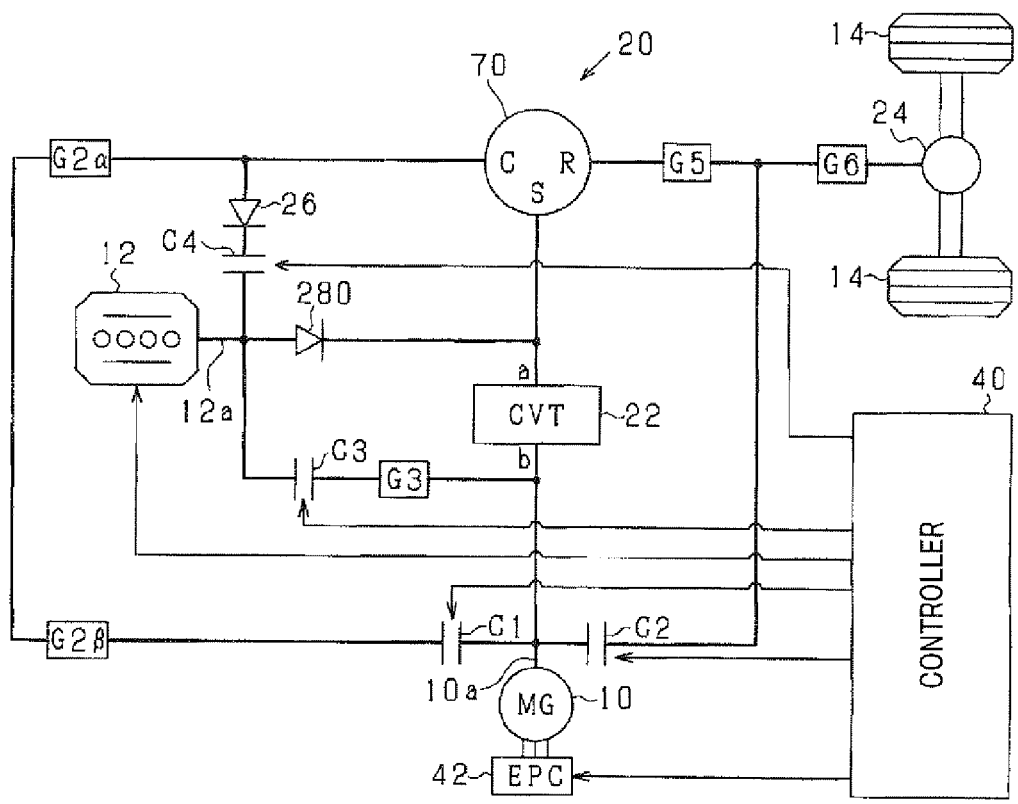
FIG. 35 is a block diagram which illustrates a power transmission device of the fourteenth embodiment which is installed in a hybrid system for a vehicle.

FIG. 35 shows a hybrid system equipped with a power transmission device of the fourteenth embodiment of the invention. The same reference numbers as employed in the above embodiments refer to the same parts, and explanation thereof in detail will be omitted here. Note that the power transmission device of embodiments, as described below, may be designed to have one or a combinations of the features, as described above.

The one-way bearing 280 is, like in the eighth embodiment, disposed between the rotating shaft 12a of the engine 12 and the sun gear S of the power split device 20. The one-way bearing 280 works as a one-way transmission mechanism to permit the transmission of power (torque) from the engine 12 to the sun gear S under the condition where the speed of the rotating shaft 12a (i.e. an input of the one-way bearing 280) is not lower than that of the sun gear S (i.e., an output of the one-way bearing 280). In other words, the output of the one-way bearing 280 is permitted to rotate following rotation of the input thereof unless the speed of the output is greater than that of the input. The engine 12 is to be coupled mechanically to the ring gear R through the one-way bearing 280, the CVT 22, the clutch C2, and the gear G5.

The rotating shaft 12a of the engine 12 is coupled mechanically to the carrier C of the power split device 20 through the one-way bearing 26 and the clutch C4. The one-way bearing 26 works as a one-way transmission mechanism to permit the transmission of power (torque) from the carrier C to the engine 12 under the condition that the rotational speed of the carrier C (i.e., an input of the one-way bearing 26) is not lower than that of the rotating shaft 12a (i.e., an output of the one-way bearing 26) of the engine 12. In other words, the one-way bearing 26 works to have the input follow the output thereof unless the speed of the output of the one-way bearing 26 is greater than that of the input of the one-way bearing 26. The clutch C4 works as a normally-open type of electronically controlled mechanical breaker to block the transmission of power (torque) between an input and an output thereof.

To the rotating shaft 12a of the engine 12, the sun gear S is also coupled mechanically through the clutch C3, the gear G3, and the CVT 22. The clutch C3 works as an electronically controlled-hydraulic fastener to switch between the engaged state and the disengaged state of an input and an output thereof. The clutches, as referred to in this disclosure, may be each designed as an electronically-controlled fastener which has a first axis and a second axis (i.e., an input and an output) and which works to selectively establish engagement and disengagement between the first and second axes. The gear G3 is a forward gear set (also called a normal rotation gear set) which works to change a ratio of rotational speed of an input to an output thereof by a fixed factor, but keeps the signs of speeds of the input and the output either of positive or negative.

The controller 40 works to actuate the clutches C1, C2, C3, C4, and the CVT 22 to control the mode of power transmission and determine a controlled variable of the engine 12.

The controller 40 switches the operation mode of the power transmission device among the first operation mode, the second operation mode, and the third operation mode. Specifically, the first operation mode, like in the above embodiments, is entered by engaging the clutch C1 and disengaging the clutch C2. The second operation mode is entered by disengaging the clutch C1 and engaging the clutch C2. The third operation mode is entered by disengaging the clutch C1 and engaging the clutches C2 and C3. The first operation mode, the second operation mode, the first-to-second operation mode switching, and the third operation mode will be described below in detail.

First Operation Mode

When it is required to start the vehicle, the starting mode is, like in the above embodiment, entered in the first operation mode. FIG. 36(a) shows a power transmission path when the vehicle is started by the motor-generator 10 in the first operation mode. FIGS. 36(b) and 36(c) are equivalent to FIGS. 2(b) and 2(c), and explanation thereof in detail will be omitted here.

The controller 40 disengages the clutch C4 and stops the internal combustion engine 12. The speeds of the rotors of the power split device 20 are dependent on the speed of the motor-generator 10 and the gear ratio of the CVT 22. In the nomographic chart of FIG. 36(b), the speeds of the sun gears S, the carrier C, and the ring gear S lie on the diagonal straight line. In other words, the sun gear S, the carrier C, and the ring gear R are so linked as to provide output rotational energies thereof which are arrayed straight in the nomogrpahic chart. The speed of the ring gear R is, therefore, set by determining the speed of the sun gear S and the carrier C.

In the first operation mode, the power is, like in the above embodiments, circulated between the sun gear S and the carrier C.

Second Operation Mode

Figure 37A:
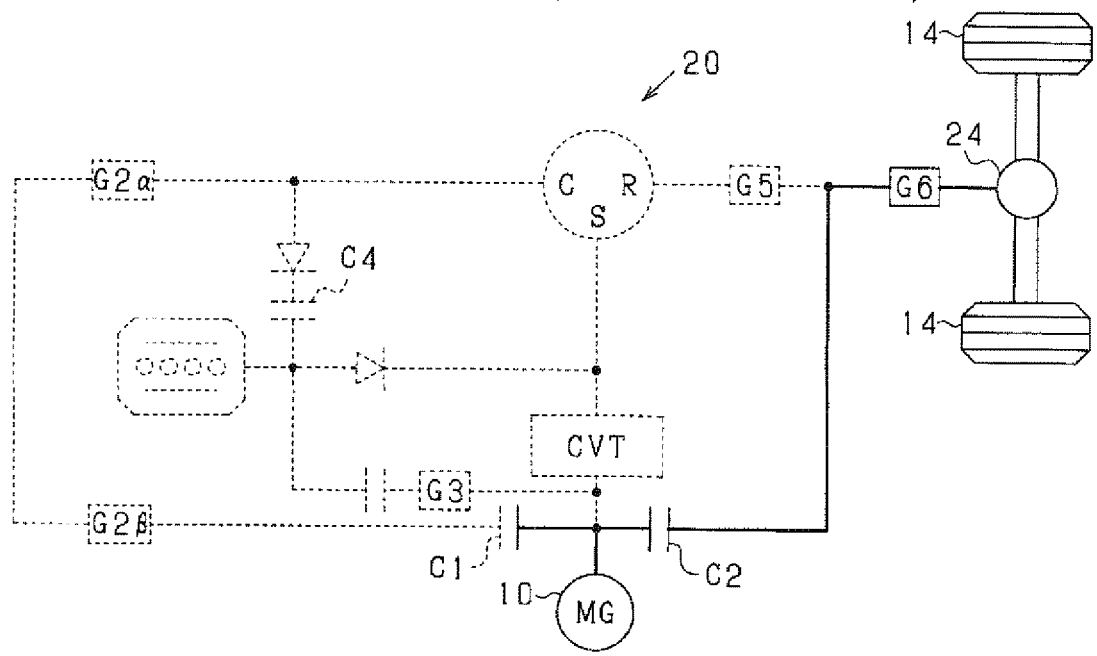
FIG. 37(a) is a schematic block diagram which shows a power transmission path of the power transmission device of FIG. 35 when a vehicle is run by a motor-generator in a second operation mode.
Figure 37B:
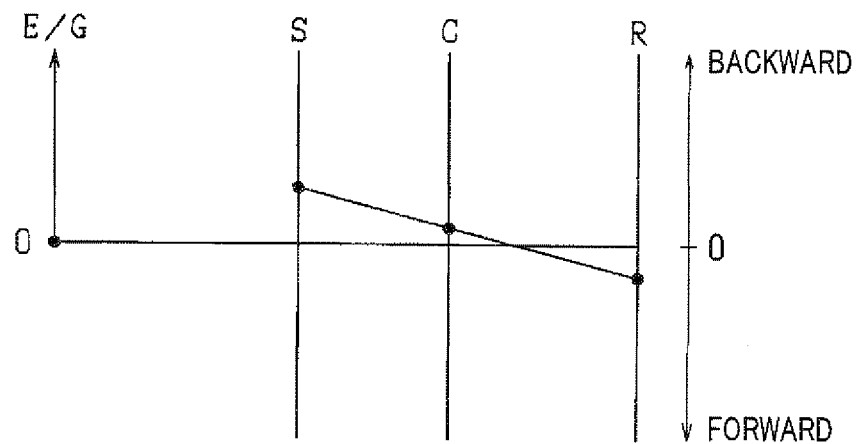
FIG. 37(b) is a nomographic chart which represents an operation of a power split device of FIG. 35 along with the speed of an internal combustion engine.

FIG. 37(a) shows a power transmission path when the vehicle is run only by the motor-generator 10 in the second operation mode. FIG. 37(b) is equivalent to FIG. 3(b), and explanation thereof in detail will be omitted here.

The clutch C4 is in the disengaged state. The power is transmitted from the motor-generator 10 to the driven wheels 14 through the clutch C2 and the gear G6 without passing through the power split device 20. This is because torques of the carrier C, the sun gear S, and the ring gear R are proportional to each other (see Eqs. (c1) and (c2)), so that the torque is not transmitted to either of the sun gear S and the ring gear R when the torque is not exerted on to the carrier C. The power, as produced by the motor-generator 10, is transmitted directly to the driven wheels 14 without passing through the CVT 22, thus resulting in a decrease in loss of the power.

FIG. 38(a) shows a power transmission path of the power transmission device when the engine 12 is started in the second operation mode. FIGS. 38(b) and 38(c) are equivalent to FIGS. 4(b) and 4(c), and explanation thereof in detail will be omitted here.

The clutch C4 is engaged, as shown in FIG. 38(a), to permit the torque to be transmitted to the engine 12 from the power split device 20. It is preferable that the clutch C4 is placed in the engaged state when the speed of the engine 12 is lower than or equal to a minimum value required to ensure the stability in running of the engine 12. When the speed of the engine 12 is above the minimum value, the controller 40 starts to burn fuel in the internal combustion engine 12 being running and control the burning of fuel in the combustion control mode.

Figure 39A:
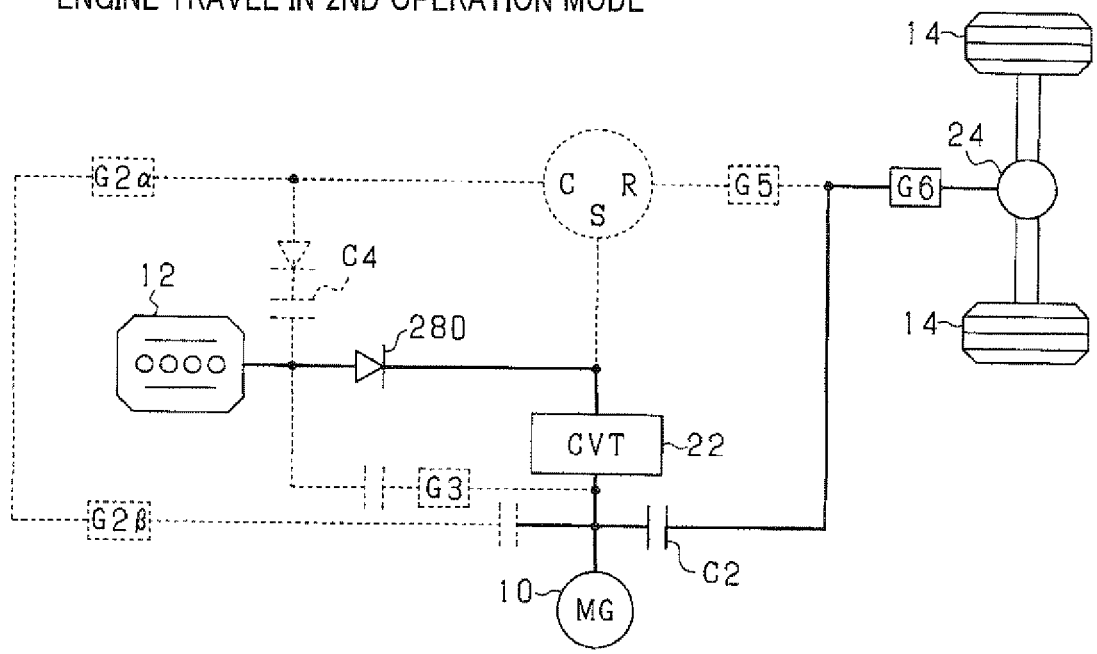
FIG. 39(a) is a schematic block diagram which shows a power transmission path of the power transmission device of FIG. 35 when a vehicle is driven by an internal combustion engine in a second operation mode.
Figure 39B:
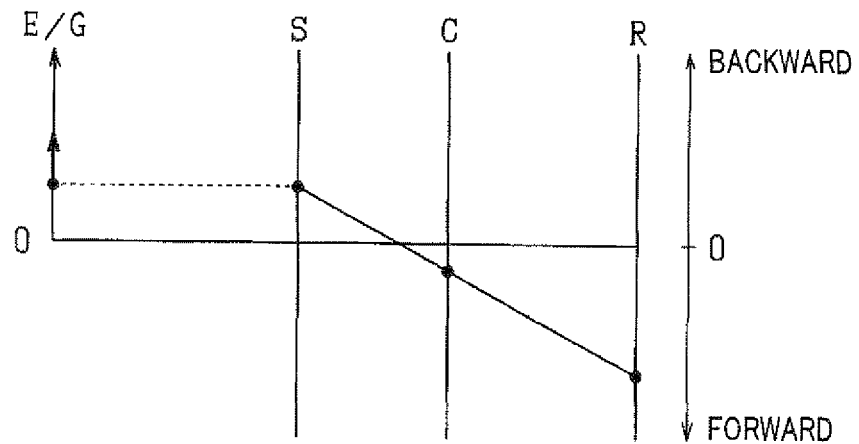
FIG. 39(b) is a nomographic chart which represents an operation of a power split device of the power transmission device of FIG. 35 along with the speed of an internal combustion engine.

FIG. 39(a) shows a power transmission path of the power transmission device to run the vehicle through the engine 12 in the second operation mode. FIG. 39(b) is equivalent to FIG. 5(b).

When the speed of the engine 12 is increased, and the speed of the input of the one-way bearing 280 reaches that of the output thereof, the power is transmitted from the engine 12 to the output of the one-way bearing 280. The transmission of torque between the motor-generator 10 and the driven wheels 14 or between the engine 12 and the driven wheels 14 without passing through the power split device 20 is achieved by disengaging the clutch C3. The output of the engine 12 is converted in speed by the CVT 22 and then transmitted to the driven wheels 14.

Switching from First Operation Mode to Second Operation Mode

The operation of the power transmission device when the first operation mode is switched to the second operation mode is the same as that in the eighth embodiment, as described with reference to FIGS. 27(a) to 27(c), and explanation thereof in detail will be omitted here.

Third Operation Mode

Figure 40A:
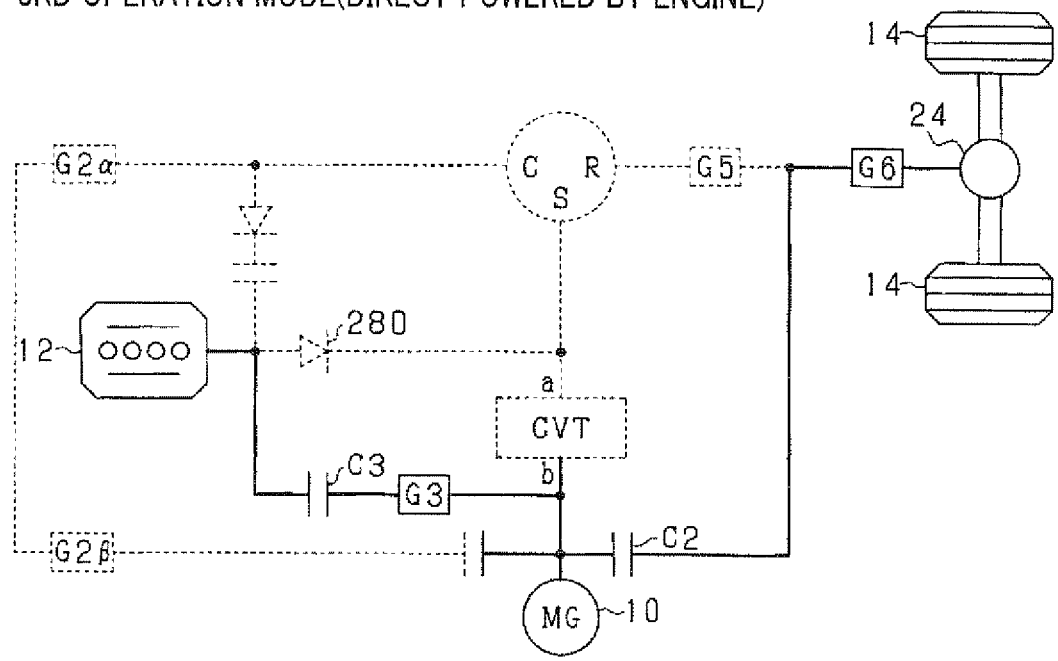
FIG. 40(a) is a schematic block diagram which shows a power transmission path of the power transmission device of FIG. 35 when a vehicle is driven by an internal combustion engine in a third operation mode.
Figure 40B:
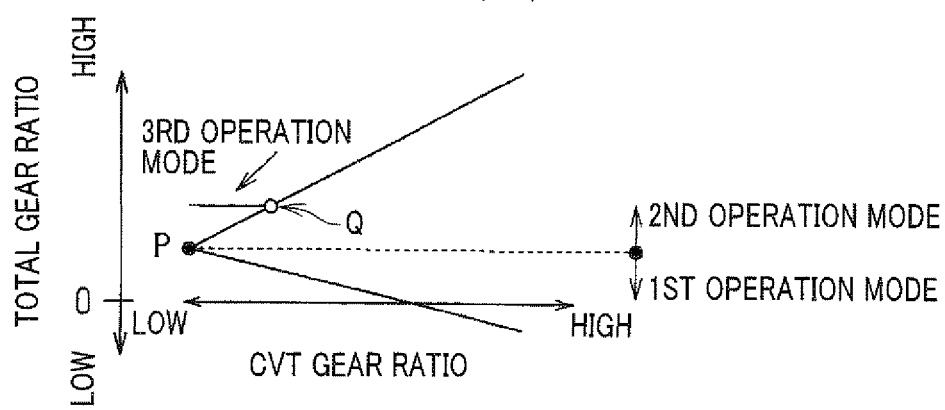
FIG. 40(b) is a graph which shows a relation between a total gear ratio of a power transmission device of the fourteenth embodiment and a gear ratio of a CVT.

FIG. 40(a) illustrates a power transmission path of the power transmission device to run the vehicle through the power of the engine 12 in the third operation mode. FIG. 40(b) illustrates a nomographic chart in such an engine-powered running mode.

In the second operation mode, the total gear ratio is so selected as to maximize the efficiency of use of energy, as produced by the engine 12. The total gear ratio in the power transmission path extending from the motor-generator 10 is kept constant in order to enhance the efficiency of use of energy, as produced by the motor-generator 10. Specifically, the efficiency of use of energy produced by the motor-generator 10 is changed depending upon an operating point that is determined in accordance with the torque and speed thereof. The rate of such a change is usually much smaller than that of the efficiency of use of energy produced by the engine 12 except for the extremely low-speed range. When the power is transmitted through the CVT 22, it will result in a loss of the power which is greater compared to typical gears. The transmission of power, as produced by the motor-generator 10, through the CVT 22 in order to optimize the total gear ratio will, therefore, result in a drop in efficiency of use of the energy at least in the second operation mode. In contrast, the efficiency of use of energy, as produced by the engine 12, is changed greatly depending upon the operating point. Accordingly, improvement of the efficiency of use of energy produced by the engine 12 over the loss of transmission of power through the CVT 22 is achieved by regulating the total gear ratio to optimize the operating point of the engine 12.

However, within a limited speed range of the engine 12, the efficiency of use of energy produced by the engine 12 when the power of the engine 12 is transmitted directly to the driven wheels 14 without passing through the CVT 22 is better than the motor-generator 10. For these reasons, the power transmission device is operated in the third operation mode, illustrated in FIG. 40(b).

The power of the engine 12 is, as can be seen from FIG. 40(a), transmitted to the driven wheels 14 through the clutch C3, the gear G3, the clutch C2, and the gear G6, thus eliminating the loss of power to be transmitted through the CVT 22. In this mode, the controller 40 regulates the gear ratio of the CVT 22 so that the speed of the output of the one-way bearing 280 becomes greater than that of the input thereof, thereby avoiding the transmission of power of the engine 12 through the one-way bearing 280. This is, as illustrated I FIG. 40(b), achieved by adjusting the gear ratio of the CVT 22 to less than a value that is the gear ratio of the CVT 22 in the second operation mode and equivalent to the total gear ratio in the third operation mode.

Figure 41:
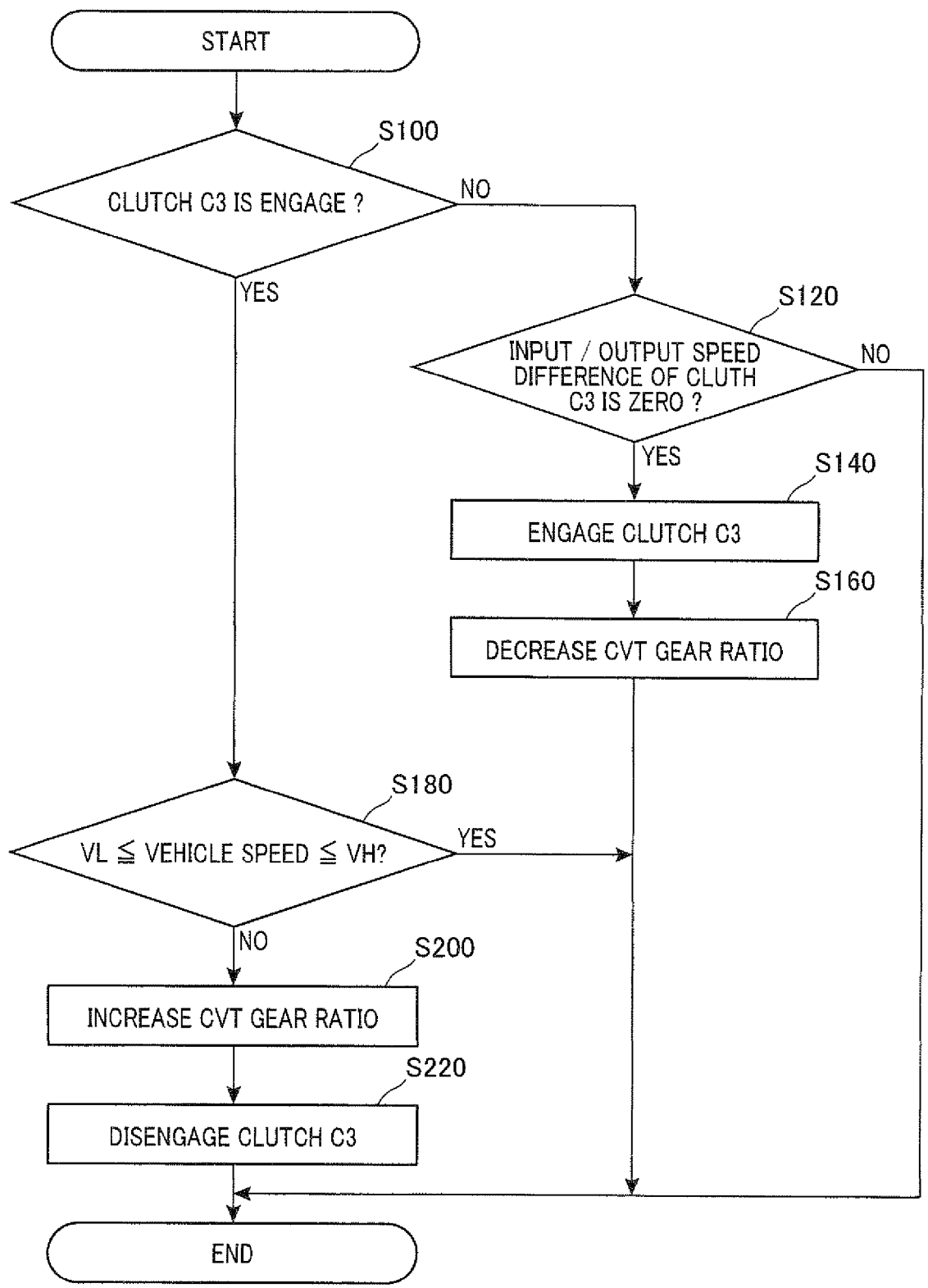
FIG. 41 is a flowchart of a program to switch to a third operation mode in a power transmission device of the fourteenth embodiment.

FIG. 41 is a flowchart of a third operation mode-switching program to be executed by the controller 40 at regular intervals.

After entering the program, the routine proceeds to step S100 wherein it is determined whether the clutch C3 is in the engaged state or not. This determination is made for determining whether the third operation mode is entered or not. If a NO answer is obtained, then the routine proceeds to step S120 wherein it is determined whether a difference in speed between the input and the output of the clutch C3 is zero (0) or not. This determination is made for determining whether a condition to engage the clutch C3 has been encountered or not. If a YES answer is obtained, it means that the gear ratio in the power transmission path extending from the engine 12 to the driven wheels 14, as established in the second operation mode, is identical with that in the third operation mode. This is achieved by controlling the CVT 22 based on the speed of the vehicle.

If a YES answer is obtained in step S120, then the routine proceeds to step S140 wherein the clutch C3 is engaged. The routine proceeds to step S160 wherein the gear ratio of the CVT 22 is decreased in order to avoid the transmission of power from the engine 12 to the CVT 22 through the one-way bearing 280.

Alternatively, if a YES answer is obtained in step S100, then the routine proceeds to step S180 wherein it is determined whether the speed V of the vehicle is lies within a third-mode speed range of a first speed VL to a second speed VH (VL≤V≤VH) or not. The third-mode speed range is a range in which the efficiency of use of energy produced by the engine 12 when the total gear ratio is set to a fixed value selected as being used in the third operation mode is thought of as being higher than that when the power transmission device is in the second operation mode. If a NO answer is obtained in step S180, then the routine proceeds to step S200 wherein the gear ratio of the CVT 22 is increased. The routine proceeds to step S220 wherein the clutch C3 is disengaged. This causes the operation mode of the power transmission device to be returned from the third operation mode to the second operation mode.

The total gear ratio in the third operation mode may be se to a desired value by selecting the gear ratio of the gear G3. It is advisable that the total gear ratio be so determined as to enhance the efficiency of use of energy from the engine 12 when the speed of the vehicle lies within a set range of, for example, 30 km/h to 80 km/h. For instance, when it is required to decrease the consumption of energy during running of the vehicle within a higher speed range, the third-mode speed range in which the third operation mode is to be entered is preferably set between 50 km/h to 70 km/h. Alternatively, when it is required to decrease the consumption of energy during running of the vehicle within an urban area, the third-mode speed range in which the third operation mode is to be entered is preferably set between 30 km/h to 50 km/h.

This embodiment offers the following advantages.

34) The use of the third operation mode in which the power is to be transmitted from the engine 12 directly to the driven wheels 14 without passing through the CVT 22, thus eliminating the loss of energy in the CVT 22.

35) The motor-generator 10 is connected mechanically between the clutches C1 and C2, thereby permitting the power of the motor-generator 10 to be transmitted to the driven wheels 14 without passing through the CVT 22 in the second operation mode.

36) The engine 12 is coupled mechanically to the driven wheels 14 through the clutch C3 without being connected to the CVT 22, thus enabling the third operation mode to be established by controlling the operation of the clutch C3.

37) After the clutch C3 is engaged, the gear ratio of the CVT 22 is decreased. This avoids the transmission of power from the engine 12 to the CVT 22 through the one-way bearing 280.

38) The one-way bearing 280 is disposed between the engine 12 and the sun gear S to establish the transmission of torque from the engine 12 to the sun gears S under the condition that the speed of the input of the one-way bearing 280 (i.e., the speed of the rotating shaft 12a of the engine 12) is not lower than that of the output of the one-way bearing 280 (i.e., the speed of the sun gear S), thus causing the torque to be transmitted from the engine 12 to the sun gear S when the speed of the input of the one-way bearing 280 reaches that of the output thereof. This facilitates the ease of starting to supply the torque of the engine 12 to the sun gear S.

39) The controller 40 switches the operation mode of the power transmission device between the first and second operation modes, thereby making mechanical connections among the motor-generator 10, the engine 12, and the driven wheels 14 suitable for operational conditions thereof.

40) The power transmission device is so designed that when the sign of the speed of the motor-generator 10 (or the engine 12) is fixed to be either plus or minus, the signs of power of the carrier C and the sun gear S will be opposite to each other in the first operation mode, while the powers of the sun gear S and the ring gear R will be zero (0) in the second operation mode. This causes the power to be circulated between the rotors of the power split device 20 other than connected mechanically to the driven wheels 14 in the first operation mode, thus permitting the geared neutral to be established desirably. The power is not circulated in the second operation mode, thus resulting in an increase in power transmission efficiency. No need also arises to reverse the motor-generator 12 (or the engine 10) upon the switching between the first and second operation modes.

41) The CVT 22 is operable both in the first and second operation modes, thus resulting in a decrease in part of the power transmission device.

42) A first order derivative value of a function, in which the gear ratio of the CVT 22 is expressed by an independent variable, and the total gear ratio in the power transmission path between the power source (i.e., the motor-generator 10 or the engine 12) and the driven wheels 14) is expressed by a dependent variable, with respect to the gear ratio of the CVT 22 (i.e., the independent variable) in the second operation mode is set opposite in sign to that in the first operation mode. This enables the CVT reversing operation to broaden the range in which the total gear ratio is permitted to be changed.

43) The power transmission device is equipped with a mechanical measure (i.e., the gears G2α, G2β, and G5) which compensates for a difference in speed between the carrier C and the ring gear R, thereby eliminating the instantaneous omission of transmission of torque to the driven wheels 14 upon the switching between the first operation mode and the second operation mode.

44) The power transmission device is equipped with the electronically-controlled clutch C3 to establish or block the transmission of torque between the engine starting rotor (i.e., the carrier q of the power split device 20 and the rotating shaft 12a of the engine 12, thereby avoiding an error in transmission of torque from the engine starting rotor to the engine 12 before the engine 12 is started, which minimizes consumption of energy or power in the power transmission device.

45) The power transmission device is also equipped with the one-way bearing 26 which establishes the transmission of torque from the power slit device 20 to the rotating shaft 12a of the engine 12 under the condition that the speed of the input of the one-way bearing 26 (i.e., the speed of the engine starting rotor) is not lower than that of the output of the one-way bearing 26 (i.e., the speed of the rotating shaft 12a of the engine 12), thereby avoiding the transmission of torque from the engine 12 to the engine starting rotor when the torque is produced upon start of combustion of fuel in a combustion chamber of the engine 12, so that the speed of the rotating shaft 12a of the engine 12 rises quickly. This is because when the speed of the output of the one-way bearing 26 (i.e., the speed of the rotating shaft 12a) is elevated above that of the input of the one-way bearing 26, the one-way bearing 26 blocks the transmission of torque from the output to the input of the one-way bearing 26. This avoids the transmission of torque pulsation to the operator of the vehicle.

46) The clutches C1 and C2 are coupled directly to the common shaft of the power transmission device, thus facilitating the ease of arranging the clutches C1 and C2 close to each other, which permits the size of the power transmission device to be reduced.

Figure 42A:
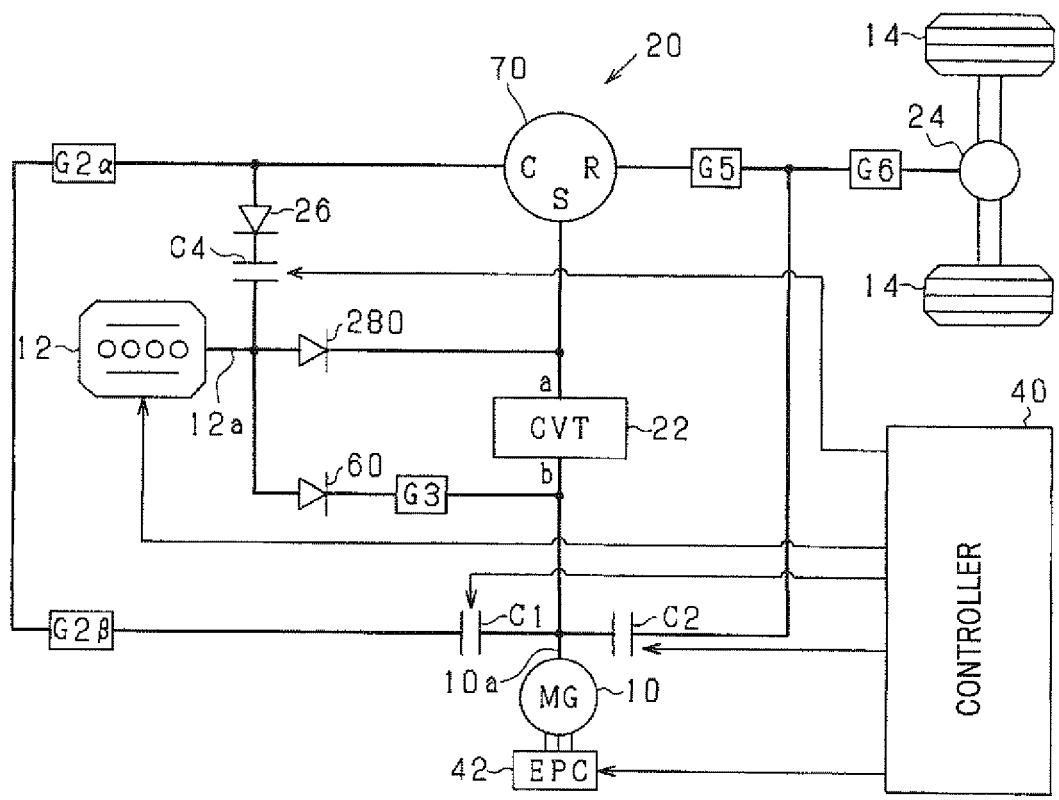
FIG. 42(a) is a block diagram which illustrates a power transmission device of the fifteenth embodiment which is installed in a hybrid system for a vehicle.
Figure 42B:
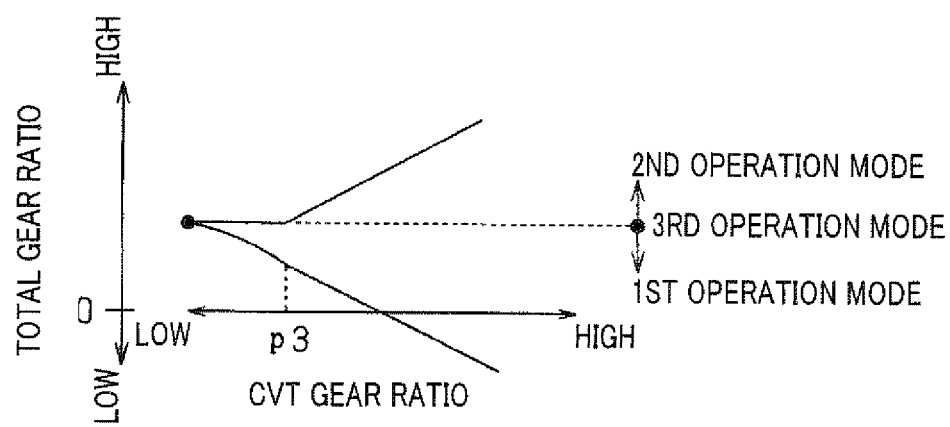
FIG. 42(b) is a graph which shows a relation between a total gear ratio of the power transmission device of FIG. 42(a) and a gear ratio of a CVT.

FIGS. 42(a) and 42(b) illustrate a power transmission device of the fifteenth embodiment of the invention. The same reference numbers as employed in the fourteenth embodiment refer to the same or similar parts, and explanation thereof in detail will be omitted here.

The power transmission device is equipped with a one-way bearing 60 instead of the clutch C3 of the fourteenth embodiment. This enables, as illustrated in FIG. 42(b), the switching to be achieved between the second operation mode and the third operation mode only by changing the gear ratio of the CVT 22.

Specifically, in the first operation mode where the clutch C1 is in the engaged state, while the clutch C2 is in the disengaged state, when the gear ratio of the CVT 22 is greater, the speed of the input of the one-way bearing 60 is lower than that of the output thereof, while the speed of the input of the one-way bearing 280 is not lower than that of the output thereof. This causes the power to be transmitted only through the one-way bearing 280. At the time when the gear ratio of the CVT 22 reaches a value p3 in the first operation mode, the speed of the input of the one-way bearing 60 becomes not lower than that of the output thereof, like the one-way bearing 280. The power is, thus, transmitted through both the one-way bearing 60 and the one-way bearing 280. Subsequently, when the gear ratio of the CVT is increased further, the speed of the input of the one-way bearing 60 is not lower than that of the output thereof, while the speed of the input of the one-way bearing 280 becomes lower than that of the output thereof. This causes the power to be transmitted only through the one-way bearing 60.

When the clutch C1 is the disengaged state, the clutch C2 is in the engaged state, and the gear ratio of the CVT 22 is lower than the value p3, the speed of the input of the one-way bearing 60 is not lower than that of the output thereof, while the speed of the input of the one-way bearing 280 is lower than that of the output thereof. The third operation mode is, therefore, entered so that the power will be transmitted only through the one-way bearing 60. When the gear ratio of the CVT 22 exceeds the value p3, the speed of the input of the one-way bearing 60 becomes lower than that of the output thereof, while the speed of the input of the one-way bearing 280 becomes not lower than that of the output thereof. The second operation mode is, therefore, entered so that the power will be transmitted only through the one-way bearing 280.

The power transmission device of this embodiment offers the following beneficial effect in addition to the effects 35), 36), and 38) to 46).

47) The power transmission device is equipped with the one-way bearing 60 which establishes the transmission of power therethrough in the condition that the speed of the input (i.e., the speed of the engine 12) is not lower than that of the output (i.e., between the CVT 22 and the clutch C2). When such a condition is satisfied, the third operation mode is entered.

Figure 43:
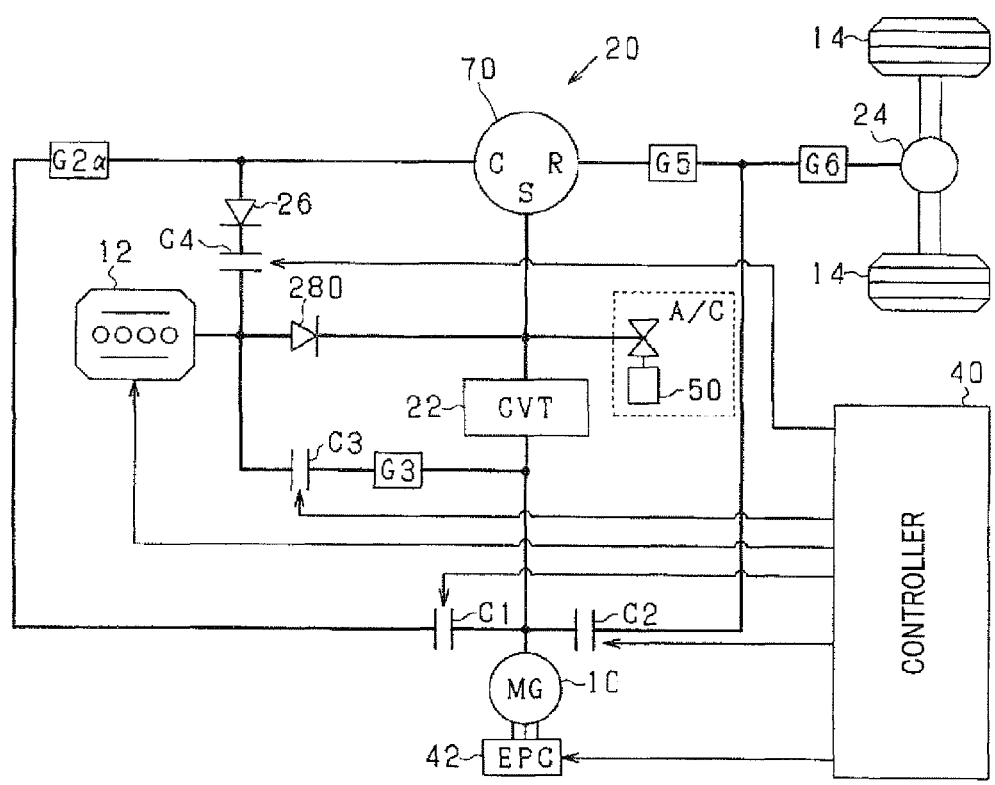
FIG. 43 is a block diagram which illustrates a power transmission device of the sixteenth embodiment which is installed in a hybrid system for a vehicle.

FIG. 43 illustrates a power transmission device of the sixteenth embodiment of the invention. The same reference numbers as employed in the fourteenth embodiment refer to the same or similar parts, and explanation thereof in detail will be omitted here.

The vehicle is equipped with an air conditioner. The air conditioner has the compressor 50 coupled mechanically to the sun gear S of the power split device 20. This eliminates the need for additional power source for the air conditioner.

When it is required to turn on the compressor 50 while the vehicle is being run by the motor-generator 10, the controller 40 may regulate the gear ratio of the CVT 11 to make the compressor 50 work as a variable displacement compressor. In the third operation mode, the controller 40 may make the compressor 50 operate as the variable displacement compressor in the condition that the gear ratio of the CVT 22 is smaller than a value at which the total gear ratio in the third operation mode is identical with that in the second operation mode.

Figure 44A:
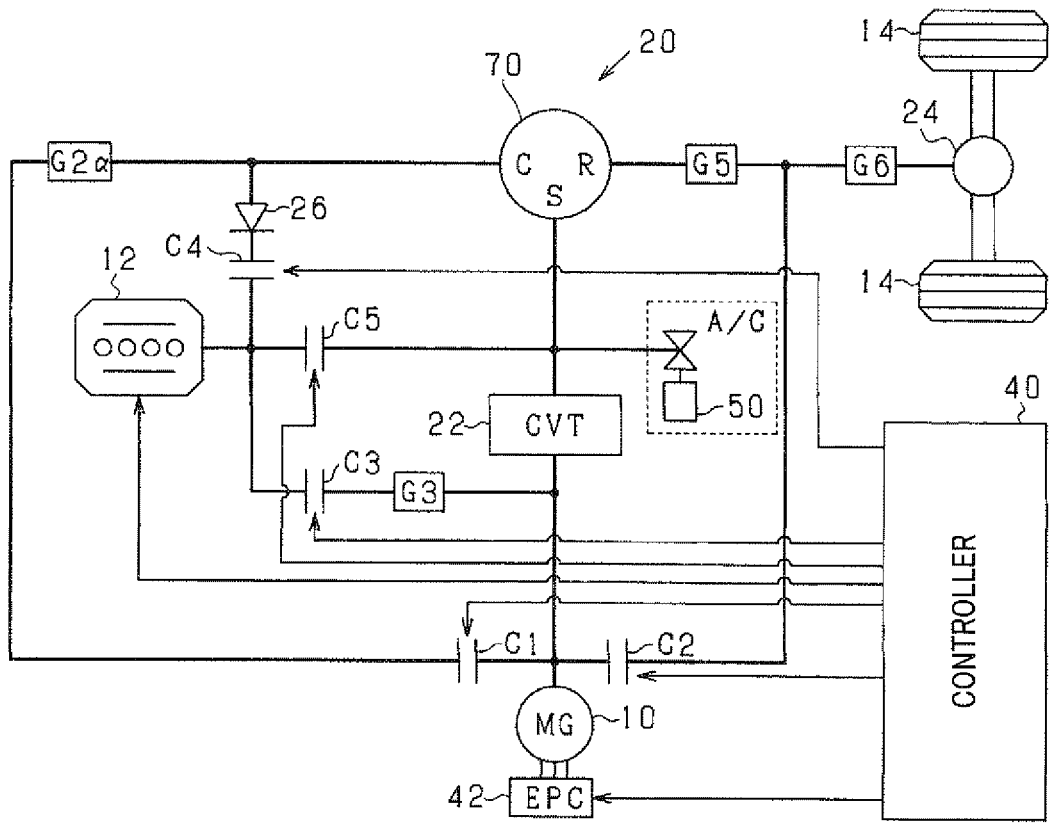
FIG. 44(a) is a block diagram which illustrates a power transmission device of the seventeenth embodiment which is installed in a hybrid system for a vehicle.

FIG. 44(a) illustrates a power transmission device of the seventeenth embodiment of the invention. The same reference numbers as employed in the sixteenth embodiment refer to the same or similar parts, and explanation thereof in detail will be omitted here.

Figure 44B:
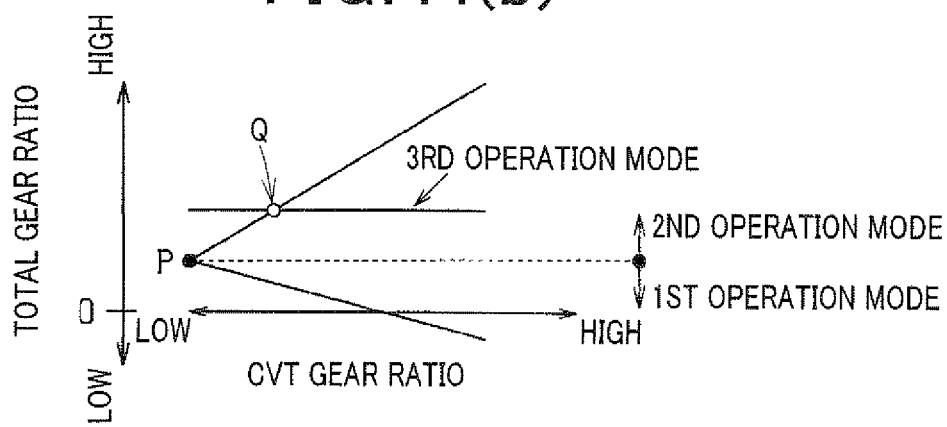
FIG. 44(b) is a graph which shows a relation between a total gear ratio of the power transmission device of FIG. 44(a) and a gear ratio of a CVT.

The power transmission device is equipped with the clutch C5 instead of the one-way bearing 280 in the sixteenth embodiment. The clutch C5 works as an electronically controlled-hydraulic fastener to switch between the engaged state and the disengaged state of the input and the output thereof. The controller 40 disengages the clutch C5 to widen, as illustrated in FIG. 44(b), a permissible range of the gear ratio of the CVT 22 in the third operation mode up to an overall operating range of the CVT 22. This enables the compressor 50 to work as the variable displacement compressor over an increased range.

Figure 45:
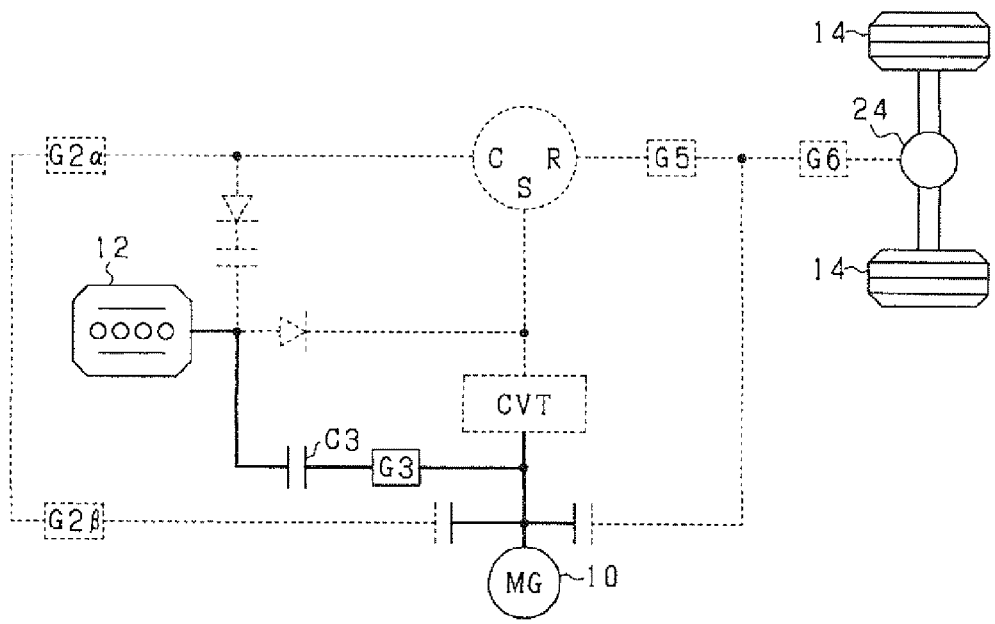
FIG. 45 is a schematic diagram which shows a power transmission path to generate electric power in the eighteenth embodiment.

FIG. 45 illustrates a power transmission device of the eighteenth embodiment of the invention. The same reference numbers as employed in the sixteenth embodiment refer to the same or similar parts, and explanation thereof in detail will be omitted here.

A power transmission path, as illustrated in the drawing, is used in an electric generating mode which is to be entered when the vehicle is stopped. When the driven wheels 14 are braked, the controller 40 disengages the clutches C1, C2, and C4 and engages the clutch C3 to make the motor-generator 10 work to convert the power from the engine 12 into electric power. The power transmission path does not include the CVT 22, thus eliminating the loss of transmission of the power in the CVT 22.

When it is required for the motor-generator 10 to generate the electric power within a range where the efficiency in operation of the engine 12 is high, the controller 40 also disengages the clutch C3 to transmit the power of the engine 12 to the motor-generator 10 through the one-way bearing 280 and the CVT 22.

This embodiment offers the following beneficial effect in addition to the effects 36) to 46).

48) The power transmission device is operable to provide the power from the engine 12 to the motor-generator 10 through the clutch C3 when the vehicle is stopped, thus resulting in an improvement in generating the electric power.

FIGS. 46(a) to 47(b) illustrate a power transmission device of the nineteenth embodiment of the invention. The same reference numbers as employed in the sixteenth embodiment refer to the same or similar parts, and explanation thereof in detail will be omitted here.

The power transmission device is designed to operate in any of first to fourth fail-safe modes, as illustrated in FIGS. 46(a) to 47(b), for example, when the belt 22c of the CVT 22, as illustrated in FIGS. 8(c) and 8(d), is broken, thus resulting in a failure in transmitting the power through the CVT 22. The breakage of the belt 22c may be detected by measuring a difference in speed between the primary pulley 22a and the secondary pulley 22b of the CVT 22. When such a speed difference is out of a range calculated based on a target gear ratio of the CVT 22 required by the controller 40, the controller 40 determines that the belt 22c is broken.

Figure 46A:
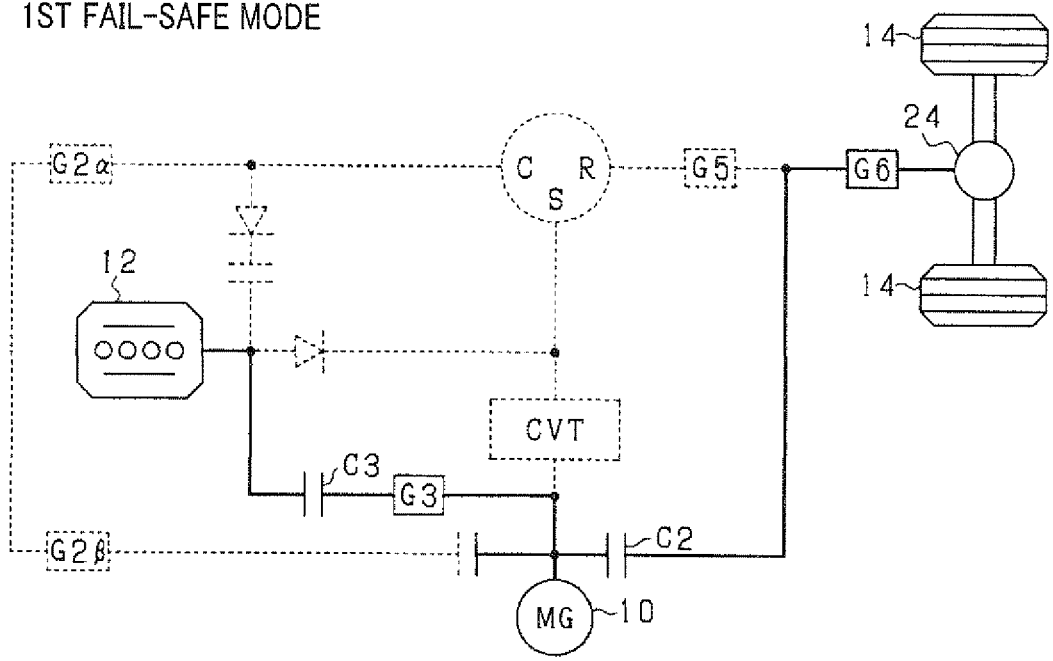
FIG. 46(a) is a schematic diagram which shows a power transmission path in a first fail-safe operation in the nineteenth embodiment.

FIG. 46(a) illustrates a power transmission path which establishes a first emergency running mode (i.e., a first fail-safe mode) to permit the vehicle to travel to safe areas (e.g., a service location) in the third operation mode. Both the engine 12 and the motor-generator 10 are connected directly to the driven wheels 14 without going through the CVT 22, thus permitting the power produced by both the engine 12 and the motor-generator 10 to be transmitted to the driven wheels 14. When it is required to start the engine 12 while the vehicle is being run by the motor-generator 10 in the first emergency running mode, the controller 40 engages the clutch C3 to given the power of the motor-generator 10 to the engine 12.

Figure 46B:
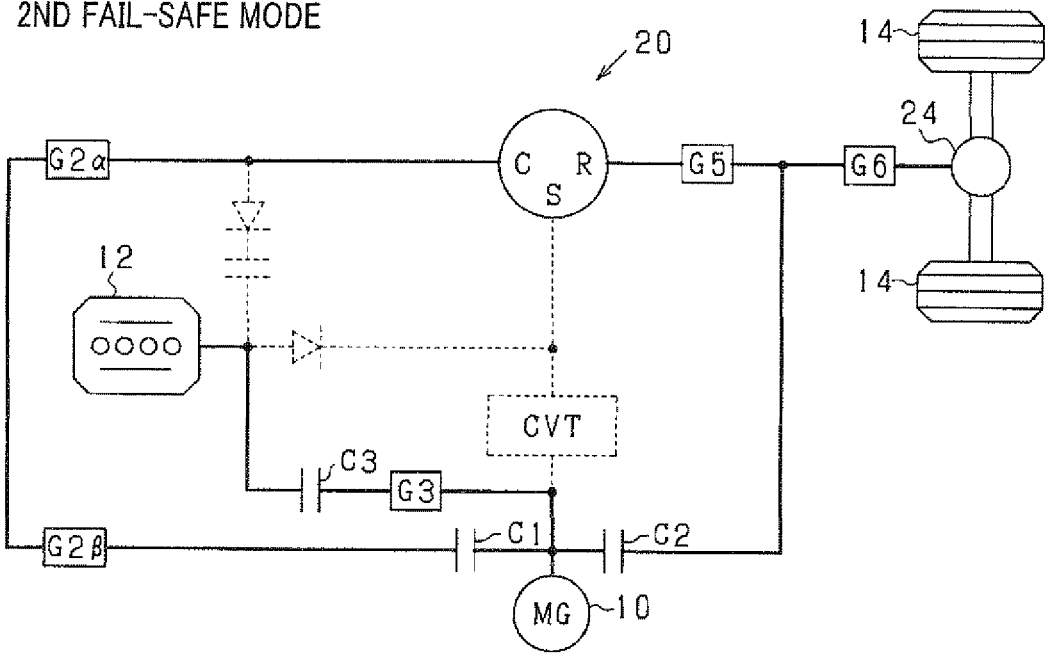
FIG. 46(*b*) is a schematic diagram which shows a power transmission path in a second fail-safe operation in the nineteenth embodiment.

FIG. 46(b) illustrates a power transmission path which establishes a second emergency running mode (i.e., a second fail-safe mode) in which the clutches C1 to C3 are engaged. The total gear ratio in the power transmission path from the engine 12 or the motor-generator 10 to the driven wheels 14 is the same as in FIG. 46(a). When it is required to start the engine 12 while the vehicle is being run by the motor-generator 10 in the second emergency running mode, the controller 40 may also engage the clutch C4 to given the power of the motor-generator 10 to the engine 12.

Figure 47A:
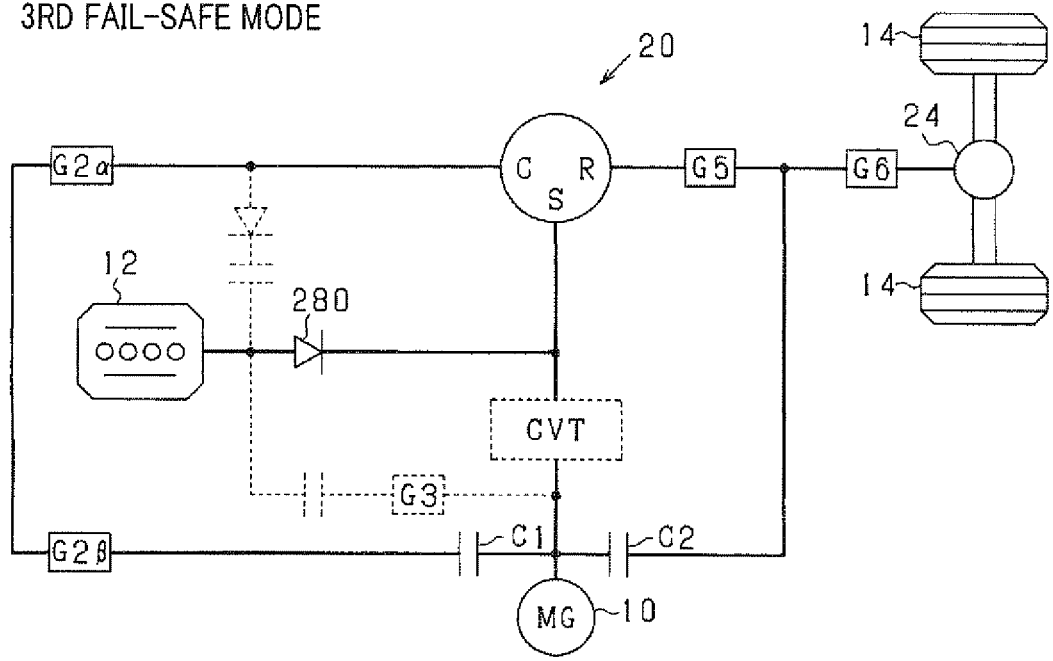
FIG. 47(*a*) is a schematic diagram which shows a power transmission path in a third fail-safe operation in the nineteenth embodiment.

FIG. 47(a) illustrates a power transmission path which establishes a third emergency running mode (i.e., a third fail-safe mode) in which the clutches C1 and C2 are engaged. The speed ratio among the sun gear S, the carrier C, and the ring gear R of the power split device 20 is fixed. The power is transmitted to the driven wheels 14 through the sun gear S. In the illustrated example, the power of the engine 12 is transmitted to the sun gear S through the one-way bearing 280. When it is required to start the engine 12 while the vehicle is being run by the motor-generator 10 in the third emergency running mode, the controller 40 engages either of the clutch C3 or C4 to given the power of the motor-generator 10 to the engine 12.

Figure 47B:
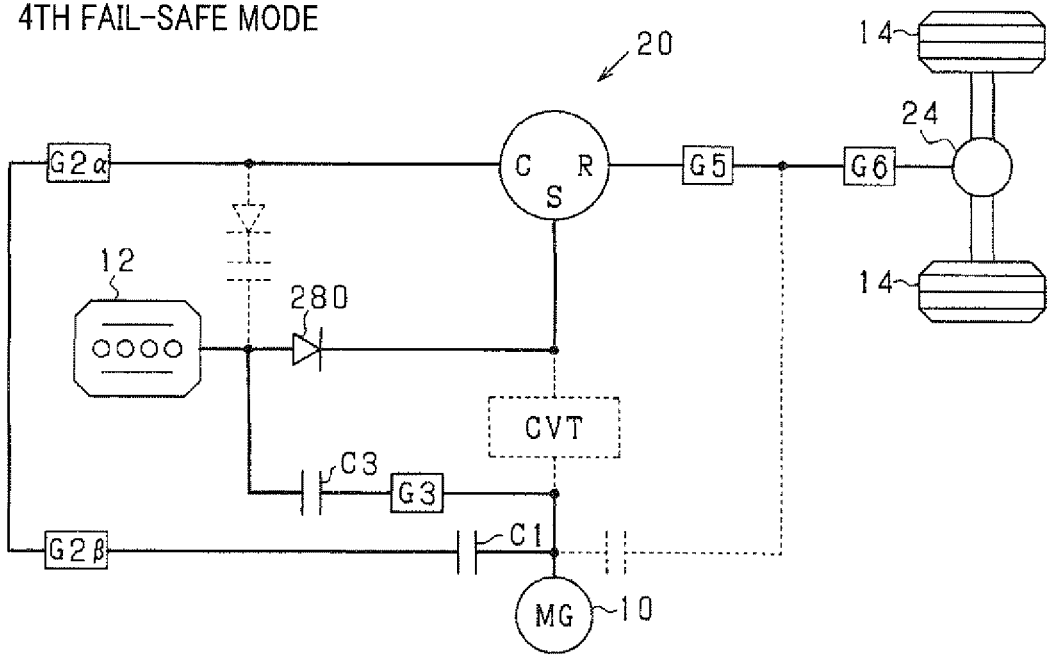

FIG. 47(b) illustrates a power transmission path which establishes a fourth emergency running mode (i.e., a fourth fail-safe mode) in which the clutches C1 and C3 are engaged. The power of the motor-generator 10 may also be transmitted to the driven wheels 14 (i.e. the sun gear S) through the one-way bearing 280. Other operations are identical with those in FIG. 46(b).

Figure 48A:
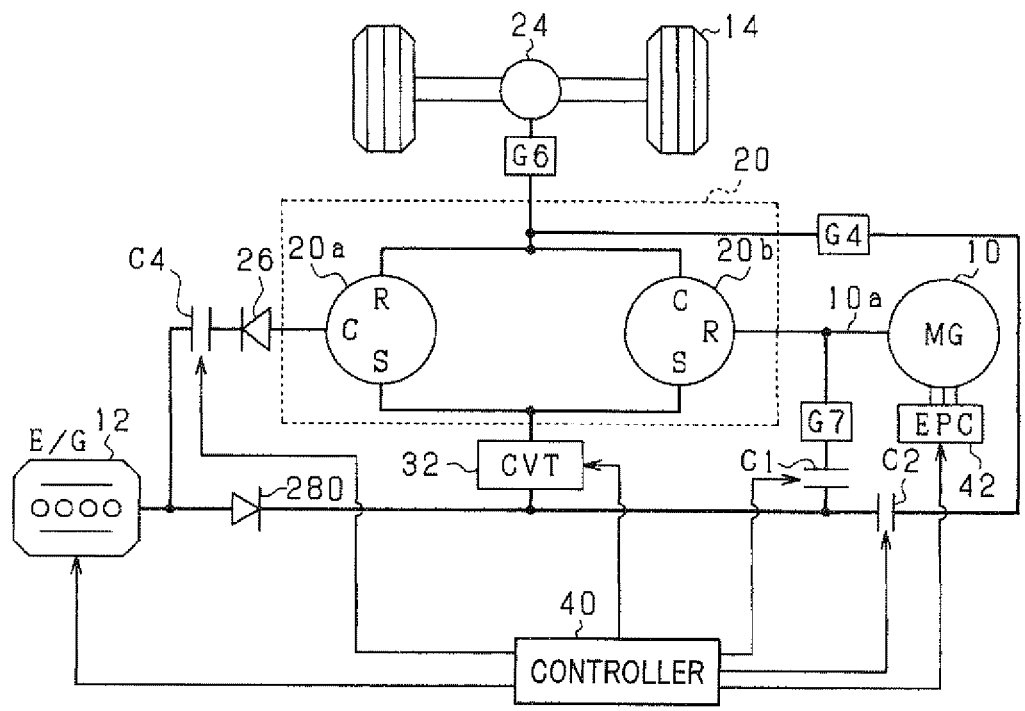
FIG. 48(*a*) is a block diagram which illustrates a power transmission device of the twentieth embodiment which is installed in a hybrid system for a vehicle.
Figure 48B:
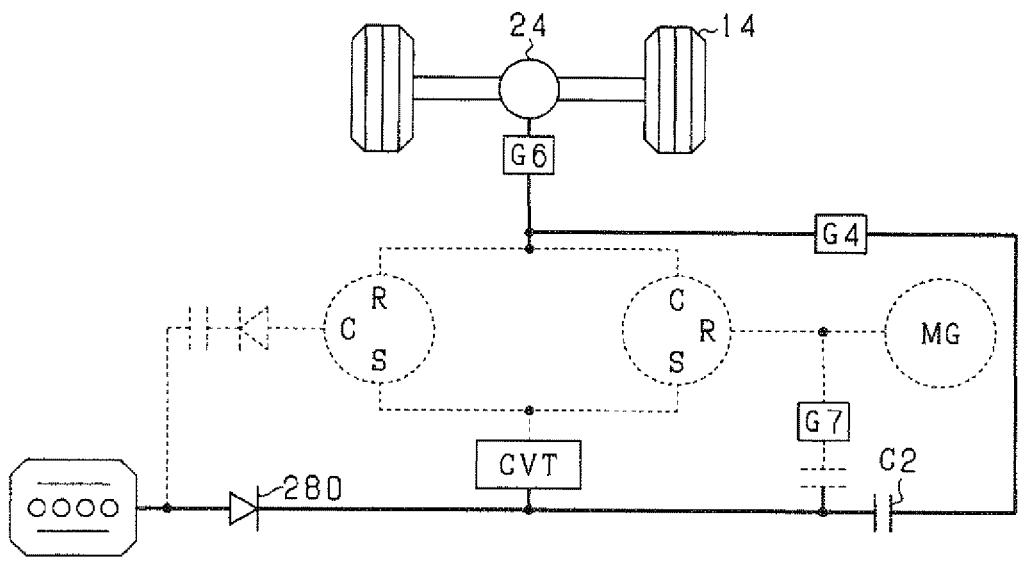

FIGS. 48(a) and 48(b) illustrate a power transmission device of the twentieth embodiment of the invention. The same reference numbers as employed in the fifth and fourteenth embodiments refer to the same or similar parts, and explanation thereof in detail will be omitted here.

The power split device 20 is equipped with the first planetary gear set 20a and the second planetary gear set 20b which work to split power or torque among the motor-generator 10, the internal combustion engine 12, and driven wheels 14 of the vehicle. Each of the first and second planetary gear sets 22 and 24 is made up of three power split rotors: the sun gear S, the carrier C, and the ring gear R. The power split device 20, thus, uses a total of six power split rotors to split the power among the motor-generator 10, the internal combustion engine 12, and the driven wheels 14. The ring gear R of the first planetary gear set 20a and the carrier C of the second planetary gear set 20b are joined mechanically together. The sun gears S of the first and second planetary gear sets 20a and 20b are coupled mechanically together. The rotating shaft 10a of the motor-generator 10 is coupled mechanically to the ring gear R of the second planetary gear set 20b. The driven wheels 14 are coupled mechanically to the ring gear R of the first planetary gear set 20a and the carrier C of the second planetary gear set 20b through the gear G6 and the differential gear 24.

The carrier C of the first planetary gear set 20a is to be coupled mechanically to the crankshaft (i.e., the rotating shaft 12a) of the engine 12 through the one-way bearing 26 and the clutch C4. The clutch 280 is disposed between the rotating shaft 12a of the engine 12 and a joint of the sun gear S and the first planetary gear set 20a and the sun gear S of the second planetary gear set 20b through the CVT 22. The sun gears S of the first and second planetary gear sets 20a and 20b are jointed mechanically to the rotating shaft 10a of the motor-generator 10 through the CVT 22, the clutch C1, and the gear G7. The gear G7 is a counter gear which works to change a ratio of rotational speed of an input to that of an output thereof by a fixed factor and reverse the direction of rotation of the input.

The sun gears S of the first and second planetary gear sets 20a and 20b are also coupled mechanically to the ring gear R of the first planetary gear set 20a and the carrier C of the second planetary gear set 20b through the CVT 22, the clutch C2, and the gear G4.

The circulation of power is achieved in the first operation mode by engaging the clutch C1 and disengaging the clutch C2. Specifically, the power, as outputted from the sun gear S of the second planetary gear set 20b, is inputted to the ring gear R of the second planetary gear set 20b through the CVT 22, the clutch C1, and the gear G7. The second operation mode in which the circulation of power is not created is achieved by disengaging the clutch C1 and engaging the clutch C2. The third operation mode, as illustrated in FIG. 48(b), in which the power of the engine 12 is transmitted to the driven wheels 14 without passing through the CVT 22 is also achieved by placing the motor-generator 10 in a no-load condition.

Figure 49:
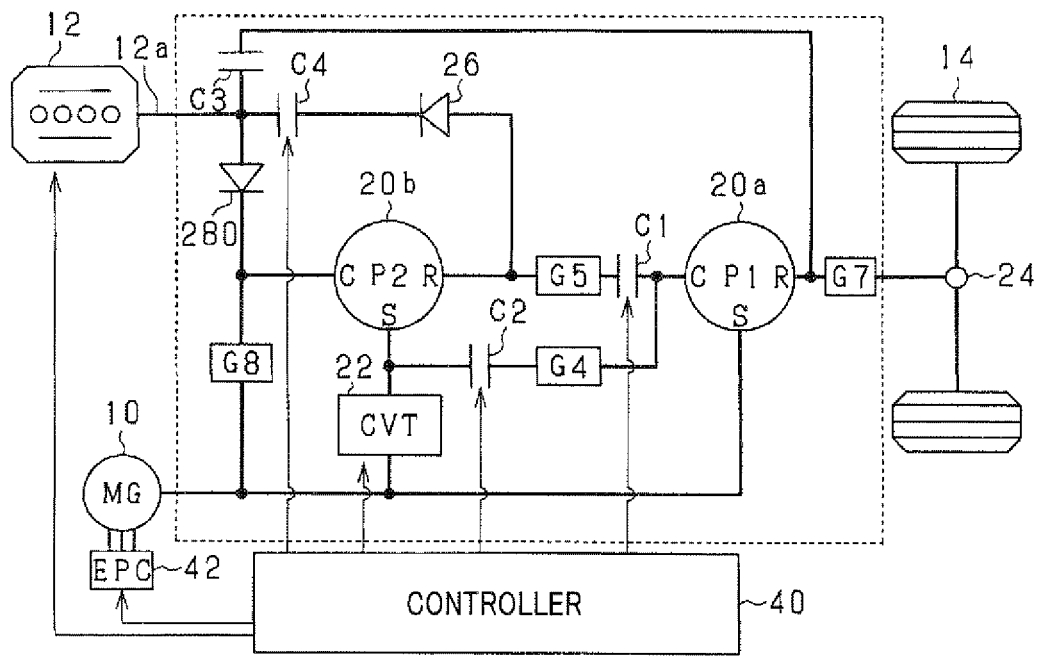
FIG. 49 is a block diagram which illustrates a power transmission device of the twenty-first embodiment which is installed in a hybrid system for a vehicle.

FIG. 49 illustrates a power transmission device of the twenty-first embodiment of the invention. The same reference numbers as employed in the sixth, the fourteenth, and twentieth embodiments refer to the same or similar parts, and explanation thereof in detail will be omitted here.

The power split device 20 is, like in the twentieth embodiment, equipped with the first planetary gear set 20a and the second planetary gear set 20b which work to split power or torque among the motor-generator 10, the internal combustion engine 12, and driven wheels 14 of the vehicle.

The motor-generator 10 is coupled mechanically to the sun gear S of the first planetary gear set 20a and also to the carrier C of the second planetary gear set 20b through the gear G8. The motor-generator 10 is also coupled mechanically to the sun gear S of the second planetary gear set 20b through the CVT 22. The gear G8 works to convert the speed of an input thereof at a fixed gear ratio into that of an output thereof and is implemented by a forward gear in which the speeds of the input and the output are identical in sign with each other, in other words, the rotational directions of the input and the output are identical with each other.

The driven wheels 14 are coupled mechanically to the ring gear R of the first planetary gear set 20a through the differential gear 24 and the gear G7. The gear G7 is implemented by a counter gear which works to change a ratio of rotational speed of an input to that of an output thereof by a fixed factor and reverse the direction of rotation of the input.

The carrier C of the first planetary gear set 20a and the ring gear R of the second planetary gear set 20b are joined mechanically together through the gear G5 and a clutch C1. The carrier C of the first planetary gear set 20a and the sun gear S of the second planetary gear set 20b are joined mechanically together through the gear G4 and the clutch C2. Each of the gears G4 and G5 is implemented by a counter gear which works to change a ratio of rotational speed of an input to that of an output thereof by a fixed factor and reverse the direction of rotation of the input.

The rotating shaft 12a of the engine 12 is coupled mechanically to the ring gear R of the second planetary gear set 20b through the one-way bearing 26 and the clutch C4. The rotating shaft 12a is also joined mechanically to the carrier C of the second planetary gear set 20b through the one-way bearing 280. The rotating shaft 12a is further connected mechanically to a joint of the ring gear R of the first planetary gear set 20a and the gear G7 through the clutch C3.

The power transmission device of this embodiment is operable to achieve the circulation of power in the first operation mode where the clutch C1 is in the engaged state, while the clutch C2 is in the disengaged state. Specifically, in the first operation mode, the power, as outputted from the carrier C of the first planetary gear set 20a, is inputted to the sun gear S of the first planetary gear set 20a through the clutch C1, the ring gear R of the second planetary gear set 20b, the sun gear S of the second planetary gear set 20b, and the CVT 22. The second operation mode in which the circulation of power is not created is achieved by disengaging the clutch C1 and engaging the clutch C2. The third operation mode in which the power of the engine 12 is transmitted to the driven wheels 14 without passing through the CVT 22 is also achieved by disengaging the clutches C1, C2, and C4 and engaging the clutch C3.

Figure 50:
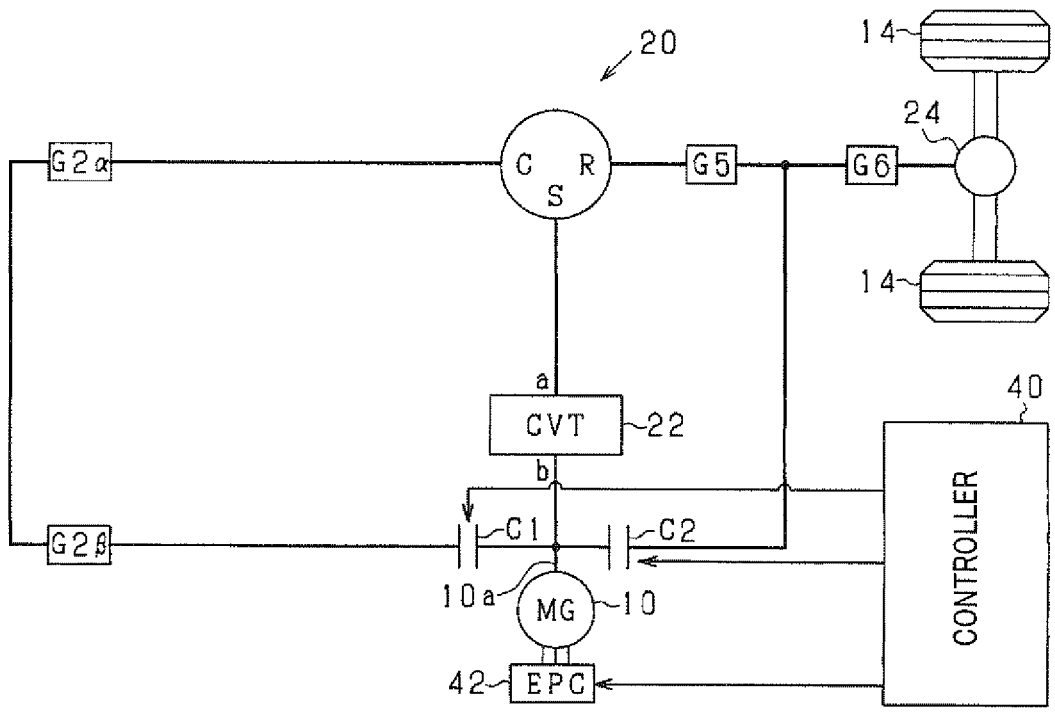
FIG. 50 is a block diagram which illustrates a power transmission device of the twenty-second embodiment which is installed in a hybrid system for a vehicle.

FIG. 50 illustrates a power transmission device of the twenty-second embodiment of the invention. The same reference numbers as employed in above embodiments refer to the same or similar parts, and explanation thereof in detail will be omitted here. The power transmission device is equipped with only the motor-generator 10 and employed in electric vehicles.

The power transmission device is capable of achieving the circulation of power in the first operation mode and transmitting the power of the motor-generator 10 directly to the driven wheels 14 without passing through the CVT 22 in the second operation mode. The power transmission device also minimizes the heat generated by the inverter 42 in the first operation mode while the driven wheels 14 are running at an extremely low speed or stopped. Usually, when the current to be supplied to the motor-generator 10 coupled directly to the driven wheels 14 is increased to produce a high degree of torque while the driven wheels 14 are running at an extremely low speed or stopped, it will cause a large current to continue to flow through switching devices for one of three-phases of the motor-generator 10, thus resulting in an increased amount of heat generated by the inverter 42, which may degrade the reliability in operation of the inverter 42. In order to avoid this problem, the power transmission device of this embodiment is capable of achieving the circulation of power to increase the speed of the motor-generator 10 when the vehicle is running at an extremely low speed or stopped.

Modifications of Fourteenth to Twenty-Second Embodiment
Condition to Switch to Third Operation Mode The switching to the third operation mode needs not be made based on the speed of the vehicle. For instance, when speeds of the input and the output of the clutch C3 become identical with each other, the controller 40 may switch the operation mode of the power transmission device to the third operation mode. Such a condition may also be eliminated by using the partial engagement of the clutch C3 when being switched from the disengaged state to the engaged state.

Gear Ratio Upon Switching to Third Operation Mode

Figure 51A:
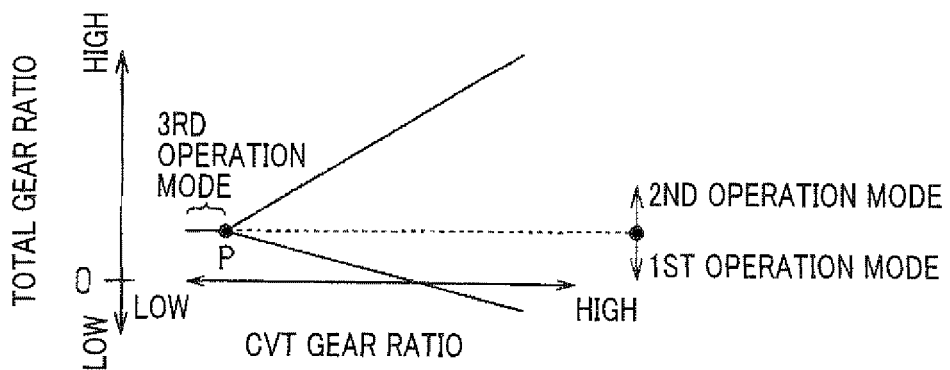
FIG. 51(*a*) is a graph which shows a relation between a total gear ratio of a modification of a power transmission device and a gear ratio of a CVT when an operation mode of the power transmission device is switched to a third operation mode.

The third operation mode may be entered, as illustrate in FIG. 51(a), at the time when values of the total gear ratio in the first and second operation modes become identical with each other. At this time, the clutches C1, C2, and C3 may be engaged simultaneously. This is because when the total gear ratio reaches the mode-switching point P, as demonstrated in FIG. 51(a), the speeds of the input and output of the clutch C1, the speeds of the input and output of the clutch C2, and the speeds of the input and output of the clutch C3 will be all identical with each other. The switching between the first and third operation modes is, therefore, achieved without the omission of transmission of torque to the driven wheels 14 as well as the switching between the second and third operation mode.

Figure 51B:
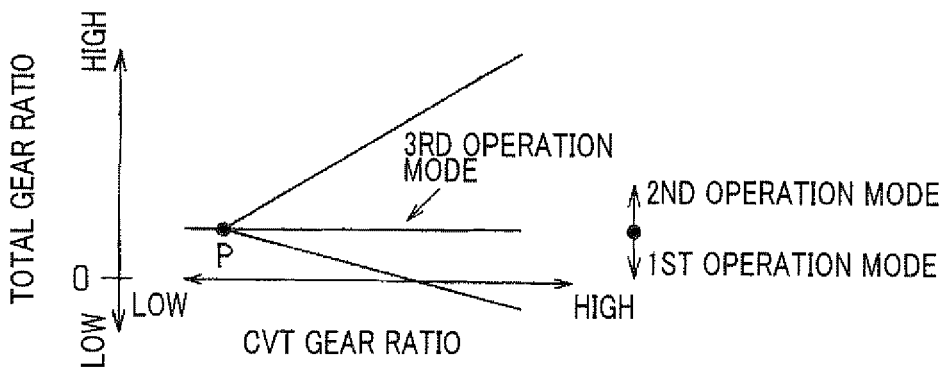
Figure 51C:
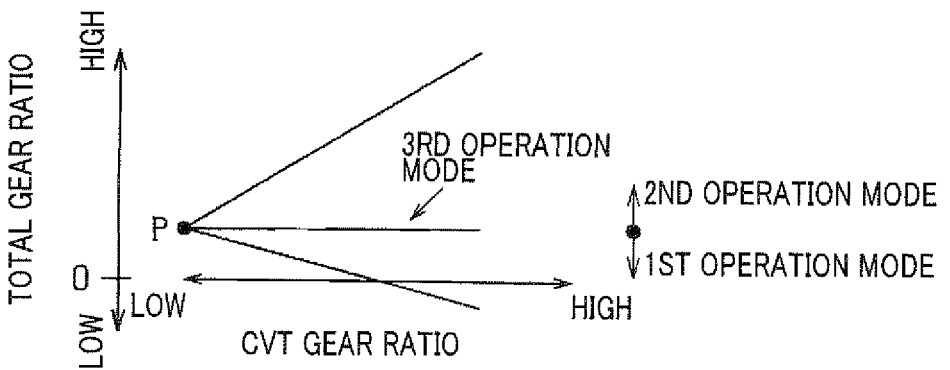

The use of the clutch C5, like in the seventeenth embodiment, instead of the one-way bearing 280 permits a permissible gear range of the CVT 22 in the third operation mode, as illustrated in FIG. 51(b), to be increased. It is, however, advisable that the mode-switching point P be set to either of the upper or lower limit of the gear range of the CVT 22 to increase the permissible rage of the total gear ratio.

Power Split Rotor Coupled Mechanically to Accessory

The power transmission device of FIG. 43 or 44(a) may be designed to have the compressor 50 connected between the motor-generator 10 and the CVT 22. This arrangement is superior to the one in FIG. 43 or 44(a), in terms of the improvement of efficiency in transmitting the power from the motor-generator 10 to the compressor 50. Usually, the transmission of the power through the CVT 22 results in a loss of the power. The above modified structure transmits the power from the motor-generator 10 directly to the compressor 50 without passing through the CVT 22, thus minimizing the loss of the power transmitted to the compressor 50.

Accessory Power by Torque of Power Split Rotor

A brake pump which applies a braking force to the driven wheels 14, a water pump which circulates water to cool the engine 12, or a cooling fan which dissipates heat from the water may also be powered by the power split device 20 instead of or in addition to the compressor 50.

Engine Start Power Transmission Control Mechanism

The clutch C4 and the one-way bearing 26, as described above, work as an engine start power transmission control mechanism to selectively block or establish transmission of torque between the rotating shaft 12a of the engine 12 and the engine starting rotor of the power split device 20 when it is required to start the engine 12. The engine start power transmission control mechanism may, however, be designed to include only the clutch C4. In this case, unwanted transmission of torque which will be increased suddenly upon start of combustion of fuel in the engine 12 to the power split device 20 is avoided by disengaging the clutch C4 prior to the start of combustion of fuel in the engine 12 after an initial rotation is given to the rotating shaft 12a of the engine 12. The first torque transmission control mechanism may also be made by only the one-way bearing 26.

The clutch C4 may alternatively be joined to the input of the one-way bearing 26.

Instead of the one-way bearing 26 which establishes the transmission of torque to the engine 12 under the condition that the speed of the input of the one-way bearing 26 is not lower than that of the output thereof, a one-way clutch or another similar type one-way power transmission control mechanism working to have the rotating shaft 12a follow the rotation of the engine starting rotor with or without any slip may be used.

The clutch C4 which selectively blocks the transmission of torque from the power split device 20 to the rotating shaft 12a of the engine 12 to start the engine 12 is of a normally open type, but may be of a normally closed type.

Driving Power Transmission Control Mechanism

The one-way bearing 280 works as a one-way transmission mechanism to transmit the torque from the engine 12 to the driven wheels 14 under the condition that the speed of the input of the one-way bearing 280 leading to the engine 1 is not lower than that of the output of the one-way bearing 280 leading to the power transmission rotor of the power split device 20, however, a one-way clutch or another type of mechanism whose output shaft rotates slightly following rotation of an input shaft thereof may be used instead.

The driving power transmission control mechanism may alternatively be equipped with a combination of a one-way transmission mechanism and the clutch C5.

Direct Power Transmission Control Mechanism

The one-way bearing 60, as illustrated in FIG. 42(a), is used as a direct power transmission control mechanism (i.e., a one-way transmission mechanism) which transmits the power of the engine 12 directly to the driven wheels 14 without any power passing through the CVT 22 in the condition that the speed of the input of the one-way bearing 60 is not lower than that of the output thereof, however, a one-way clutch or another type of mechanism whose output shaft rotates slightly following rotation of an input shaft thereof may be used instead. A combination of a one-way transmission mechanism and the clutch C4 may alternatively be used.

The one-way transmission mechanism may also be used in the structure of FIG. 49.

In the structure of the fifteenth embodiment, the one-way bearing 28 may be replaced with the clutch C5. The power transmission device of this embodiment enters the third operation mode immediately after the start-up of the engine 12. The one-way bearing 28 may, therefore, be not used only in order to avoid the transmission of torque, as produced when the fuel starts to burn in the engine 12, to the power split device 20.

The power transmission device of the fourteenth to twenty-second embodiments switches the third operation mode to the second operation mode, as illustrated in FIG. 40(b), at the time when the gear ratio of the CVT 22 increases and reaches the point Q, however, such switching may be made, as demonstrated in FIG. 44(b), at the time when the total gear ratio (i.e., the gear ratio of the CVT 22) decreases and reaches the point Q that is an intersection between a diagonal line representing the second operation mode and a horizontal line representing the third operation mode.

Use of Power Circulation in First Operation Mode

The circulation of power, as described above, is used to changing the sign of the speed of the driven wheels 14 (i.e., the direction of rotation of the driven wheels 14) from the negative value to zero (0) and to the positive value or vice versa without reversing the direction of rotation of the power source (i.e., the motor-generator 10), however, may alternatively be used only in a range in which the sign of the speed of the driven wheels 14 is either positive or negative. In this case, the reversal of rotation of the driven wheels 14 is achieved by reversing the motor-generator 10 or changing the combination of mechanical connections among the power split rotors, the power source, and the driven wheels 14 without reversing the sign of sped of the motor-generator 10. This is achieved by installing a clutch between the sun gear S and the CVT 22 and a mechanical means to hold the sun gear S from moving in the structure of FIG. 22(a).

When the reversal of rotation of the driven wheels 14 is not achieved by changing the gear ratio of the CVT 22 in the above manner, it enables the range in which the total gear ratio is to change with a change in gear ratio of the CVT 22 in the first operation mode to be narrowed, thus allowing a required degree of durability of the CVT 22 to be decreased.

Condition to Engage Clutch C1 to C3

Each of the clutches C1 to C3 may be engaged when a condition other than that as described above is encountered. For instance, when the vehicle is stopped or it is required to tow the vehicle, the controller 40 preferably disengages the clutches C1 to C3. This avoids the rotation of the CVT 22 following the towing of the vehicle, thereby minimizing the deterioration of the CVT 22 even equipped with a metal belt. For instance, in the structure of FIG. 35, when the controller 40 disengages both the clutches C1, C2, and C3, it causes the generator-motor 10 to hold the CVT 22 from rotating, and permits the clutches C1, C2, and C3 to idle.

The controller 40 may engages the clutches C1 and C2 and disengages the clutch C3 to bring the total gear ratio above a given high-speed gear ratio. The controller 40 may also regulate the gear ratio of the CVT 22 so that the value of the total gear ratio in the first operation mode is different from that in the second operation mode and engages the clutches C1 and C2, thereby holding the driven wheels 14 from rotating.

Condition to Engage Clutch C4

When the speed of the engine 12 is below a minimum value needed to ensure the stability in operation of the engine 12, and an engine starting request is made, the controller 40 engages the clutch C4 in the above embodiments, but may alternatively make such engagement when it is required to brake the vehicle. This is enabled in the structure of the above fourteenth to twenty-second embodiments designed to ensure the engine starting torque even when the motor-generator 10 is reduced in size. The reduction in size of the motor-generator 10 to a degree that generates up to several tens kW may result in a difficulty in increasing the braking force to be produced by a regenerative operation of the motor-generator 10 to a required level. However, the power transmission device of the fourteenth to twenty-second embodiments is enabled to engage the clutch C4 and exert a resistive load from the engine 12 to the power transmission device 20 to produce engine braking.

In order to eliminate the consumption of power of the motor-generator 10 when the engine 12 is restarted after the regenerative operation of the motor-generator 10, the controller 40 may alternatively engage the clutch C4 during the regenerative operation to keep the speed of the engine 12 greater than a lower limit above which sprayed fuel is to start to burn automatically in the engine 12.

Type of Speed Variator

The CVT 22 needs not be of a belt-type. For example, a traction drive type or hydraulic continuously variable transmission may be used. Alternatively, a gear transmission may be used instead of the CVT 22. In the case where the power is transmitted to the driven wheels 14 through the gear transmission, the efficiency of such power transmission is lower than that in the direct power transmission mode, as described above, to transmit the power directly to the driven wheels 14, the direct power transmission mode is thought of as being useful. The direction power transmission mode is, however, useful in the fail-safe mode regardless of a drop in efficiency of transmission of power to the driven wheels 14.

The one-way bearing 60, as illustrated in FIG. 42(a), is used as a direct power transmission control mechanism (i.e., a one-way transmission mechanism) which transmits the power of the engine 12 directly to the driven wheels 14 without any power passing through the CVT 22 in the condition that the speed of the input of the one-way bearing 60 is not lower than that of the output thereof, however, a one-way clutch or another type of mechanism whose output shaft rotates slightly following rotation of an input shaft thereof may be used instead. A combination of a one-way transmission mechanism and the clutch C4 may alternatively be used.

Other Modifications

Automotive vehicles in which the power transmission device is to be installed may be engine-powered vehicles equipped with only the engine 12 or electric vehicles equipped with only the motor-generator 10 as well as the hybrid vehicles, as described above, equipped with both the engine 12 and the motor-generator 10. For instance, the structure of FIG. 35 may be designed not include the motor-generator 10, the one-way bearing 26, and the clutch C4.

The power transmission device may be designed to allow the omission of transmission of torque to the driven wheels 14 upon switching between the first and second operation modes. This also offers the same advantage 1), as described in the first embodiment. Specifically, the controller 40 gradually increases the degree of engagement of one of the clutches C1 and C2 which is being switched from the disengaged state to the engaged state to establish the partial engagement of the one of the clutches C1 and C2. However, when a fail-safe mode is entered in which it is required to switch between the first and second operation modes quickly regardless of mechanical stock arising therefrom, the controller 40 may switch between the first and second operation modes forcibly at a gear ratio of the CVT 22 which develops values of the total gear ratio which are different between the first and second operation modes without creating the partial engagement of the one of the clutches C1 and C2.

The modifications, as described in the first to thirteenth embodiments, may be used in the fourteenth to twenty-second embodiments.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims. For example, the power transmission device of each of the embodiments may be designed to have one or some of the features of the other embodiments.

What is claimed is:

1. A power transmission apparatus for a vehicle comprising:

a power split device which includes a first, a second, and a third rotor which rotate in conjunction with each other to split power among the first, second, and third rotors, the third rotor being coupled mechanically to a driven wheel of a vehicle; and a speed variator joined mechanically to the power split device, wherein the power split device is placed in a power transmission mode in which power, as produced by a power source, is transmitted to the third rotor through the second rotor and then to the driven wheel as torque, wherein in the power transmission mode, the power split device is also placed in a power circulation mode wherein the power is circulated between the first and second rotors, and wherein a speed ratio of a speed of rotation of an output of the power source to a speed of rotation of the driven wheel in the power circulation mode is set to lie within one of a positive range in which a sign of the speed ratio is positive or a negative range in which a sign of the speed ratio is negative.

2. A power transmission apparatus as set forth in claim 1, further comprising a controller which controls the speed ratio to lie within one of the positive range and the negative range.

3. A power transmission apparatus as set forth in claim 2, wherein the power source is an electric rotating machine.

4. A power transmission apparatus as set forth in claim 3, wherein the controller works to switch rotation of the electric rotating machine in opposite directions.

5. A power transmission apparatus as set forth in claim 2, further comprising a reversing mechanism which changes between mechanical connections of at least one of the power source and the driven wheel to the first, second, and third rotors of the power split device to reverse a sign of the speed ratio.

6. A power transmission apparatus as set forth in claim 2, wherein the controller keeps an absolute value of a minimum value of the speed ratio above zero in the one of the positive and negative ranges.

7. A power transmission apparatus as set forth in claim 1, wherein the speed variator is a continuously variable transmission equipped with pulleys and a belt, and wherein the continuously variable transmission is designed such that an absolute value of a minimum value of the speed ratio is kept away from zero in the one of the positive and negative ranges for compensating for a change in the speed ratio arising from aging of the continuously variable transmission.

8. A power transmission apparatus as set forth in claim 1, wherein an absolute value of a minimum value of the speed ratio is determined so as to be away from zero by a given margin which is equivalent to a change in the speed ratio arising from aging of the speed variator.

9. A power transmission apparatus as set forth in claim 1, wherein the power source is an electric rotating machine, wherein the first rotor is coupled mechanically to an internal combustion engine working as a second power source, and further comprising a power transmission control mechanism which selectively establishes and blocks transmission of power between the first rotor and the internal combustion engine.

10. A power transmission apparatus as set forth in claim 9, wherein the power transmission control mechanism includes an electronically-controlled breaker which breaks the transmission of power between the third rotor and the internal combustion engine.

11. A power transmission apparatus as set forth in claim 10, wherein the power transmission control mechanism also includes a one-way transmission mechanism which achieves the transmission of power between the first rotor and the internal combustion engine in a condition that a speed of an input of the one-way transmission mechanism which leads to the first rotor is not lower than that of an output of the one-way transmission mechanism which leads to the internal combustion engine.

12. A power transmission apparatus as set forth in claim 9, wherein the power transmission control mechanism which selectively establishes and blocks the transmission of power between the first rotor and the internal combustion engine functions as a first power transmission control mechanism, further comprising a second power transmission control mechanism which selectively establishes and blocks transmission of power between the second rotor and the internal combustion.

13. A power transmission apparatus as set forth in claim 1, wherein the power split device includes a planetary gear set equipped with a sun gear, a carrier, and a ring gear which work as the first, second, and third rotors.

14. A power transmission apparatus as set forth in claim 1, further comprising a power transmission path in which the speed variator is disposed and through which the first and second rotors are so linked without the third rotor as to rotate in conjunction with each other, and wherein the power source is coupled mechanically to the power transmission path.

15. A power transmission apparatus as set forth in claim 14, wherein the power source which are coupled mechanically to the first and second rotors is an electric rotating machine, wherein an internal combustion engine working as a second power source is joined mechanically to one of the first and second rotors, and further comprising a first-to-second operation mode switching mechanism which switches between a first operation mode in which the speed variator is connected mechanically to both the first and second rotors and a second operation mode in which the speed variator is connected mechanically to the second and third rotors, and wherein a derivative value of a function, in which the speed ratio is expressed by a dependent variable, and a gear ratio of the speed variator is expressed by an independent variable, with respect to the independent variable in the second operation mode is opposite in sign to that in the first operation mode.

16. A power transmission apparatus as set forth in claim 1, wherein the speed ratio of the speed of rotation of the output of the power source to the speed of rotation of the driven wheel is changed by changing a speed ratio of the speed variator.

\* \* \* \* \*